United States Patent
Kitazato et al.

(10) Patent No.: US 9,980,003 B2
(45) Date of Patent: May 22, 2018

(54) RECEIVING DEVICE, RECEIVING METHOD, TRANSMITTING DEVICE, AND TRANSMITTING METHOD FOR CONTROLLING APPLICATIONS

(71) Applicant: Saturn Licensing LLC, New York, NY (US)

(72) Inventors: Naohisa Kitazato, Tokyo (JP); Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days. days.

(21) Appl. No.: 15/228,645

(22) Filed: Aug. 4, 2016

(65) Prior Publication Data

US 2016/0345064 A1  Nov. 24, 2016

Related U.S. Application Data

(63) Continuation of application No. 13/777,734, filed on Feb. 26, 2013, now Pat. No. 9,456,245.
(Continued)

(51) Int. Cl.
*H04N 7/173* (2011.01)
*H04N 21/45* (2011.01)
(Continued)

(52) U.S. Cl.
CPC ......... *H04N 21/4516* (2013.01); *H04N 7/025* (2013.01); *H04N 7/08* (2013.01);
(Continued)

(58) Field of Classification Search
CPC .................................................. H04N 21/4516
See application file for complete search history.

(56) References Cited

U.S. PATENT DOCUMENTS 8,896,755 B2 * 11/2014 Kitazato .............. H04N 5/4401
    348/43
9,414,002 B2 * 8/2016 Kitazato .................. H04N 5/44
(Continued)

FOREIGN PATENT DOCUMENTS

CN   1429452 A   7/2003
CN   102387400 A   3/2012
(Continued)

OTHER PUBLICATIONS

U.S. Appl. No. 61/664,150, filed Jun. 25, 2012.*
(Continued)

*Primary Examiner* — Junior Mendoza
(74) *Attorney, Agent, or Firm* — Oblon, McClelland, Maier & Neustadt, L.L.P.

(57) ABSTRACT

Disclosed herein is a receiving device including: a receiver configured to receive broadcast content; a trigger information acquirer configured to acquire trigger information for identifying a command to control an operation of an application program that is run in conjunction with the broadcast content and is delivered via a network; a correspondence table acquirer configured to acquire a correspondence table in which the command is associated with information for identifying the command; and a control section configured to control operations of a subject application program and another application program other than the subject application program in response to the command identified by the trigger information and the correspondence table.

18 Claims, 40 Drawing Sheets

Related U.S. Application Data

(60) Provisional application No. 61/668,117, filed on Jul. 5, 2012.

(51) Int. Cl.

| | | |
|---|---|---|
| *H04N 21/65* | (2011.01) | |
| *H04N 21/236* | (2011.01) | |
| *H04N 21/44* | (2011.01) | |
| *H04N 21/478* | (2011.01) | |
| *H04N 21/658* | (2011.01) | |
| *H04N 21/858* | (2011.01) | |
| *H04N 7/025* | (2006.01) | |
| *H04N 7/08* | (2006.01) | |
| *H04N 21/61* | (2011.01) | |

(52) U.S. Cl.
CPC . *H04N 21/23614* (2013.01); *H04N 21/44008* (2013.01); *H04N 21/478* (2013.01); *H04N 21/6125* (2013.01); *H04N 21/65* (2013.01); *H04N 21/6582* (2013.01); *H04N 21/8586* (2013.01)

(56) References Cited

U.S. PATENT DOCUMENTS

| | | | |
|---|---|---|---|
| 9,432,744 B2* | 8/2016 | Kitazato | H04N 21/8126 |
| 9,456,245 B2* | 9/2016 | Kitazato | H04N 21/4516 |
| 2003/0051252 A1 | 3/2003 | Miyaoku et al. | |
| 2009/0320064 A1 | 12/2009 | Soldan et al. | |
| 2011/0075990 A1 | 3/2011 | Eyer | |
| 2011/0088075 A1 | 4/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1* | 3/2012 | Dewa | H04N 21/23614 725/132 |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0189010 A1* | 7/2012 | Lee | H04L 65/4076 370/392 |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0191860 A1* | 7/2013 | Kitazato | H04N 21/4622 725/32 |
| 2013/0201399 A1 | 8/2013 | Kitazato et al. | |
| 2013/0215327 A1 | 8/2013 | Kitazato et al. | |
| 2013/0347030 A1* | 12/2013 | Oh | H04N 21/478 725/32 |
| 2014/0040965 A1 | 2/2014 | Kizazato et al. | |
| 2014/0043540 A1* | 2/2014 | Kitazato | H04N 5/44 348/723 |

FOREIGN PATENT DOCUMENTS

| | | |
|---|---|---|
| JP | 2002-209204 | 7/2002 |
| JP | 2007-116719 A | 5/2007 |
| JP | 2011-066556 | 3/2011 |
| JP | 2012-70351 | 4/2012 |
| JP | 2014-506415 A | 3/2014 |
| WO | WO 2012/039316 A1 | 3/2012 |

OTHER PUBLICATIONS

Extended European Search Report, dated May 3, 2016, in European Application Patent No. 13813140.4 (10 pages).

Combined Chinese Office Action and Search Report dated May 9, 2017 in Patent Application No. 201380034626.8 (with English language translation).

International Search Report dated Oct. 1, 2013, in International Application No. PCT/JP2013/067702 (with English translation).

"TV Without Borders", The Lifecycle of MHP Applications, www.tvwithoutborders.com, Jun. 25, 2012 (3 pages).

"TV Without Borders", Signalling MHP Applications, www.tvwithoutborders.com, Jun. 26, 2012 (12 pages).

"TV Without Borders", OCAP Applications in Detail, www.tvwithoutborders.com, Mar. 2, 2012 (9 pages).

Notification of Reasons for Refusal issued in Japanese Patent Application No. 2014-523705 dated Jun. 30, 2017 with English Translation.

* cited by examiner

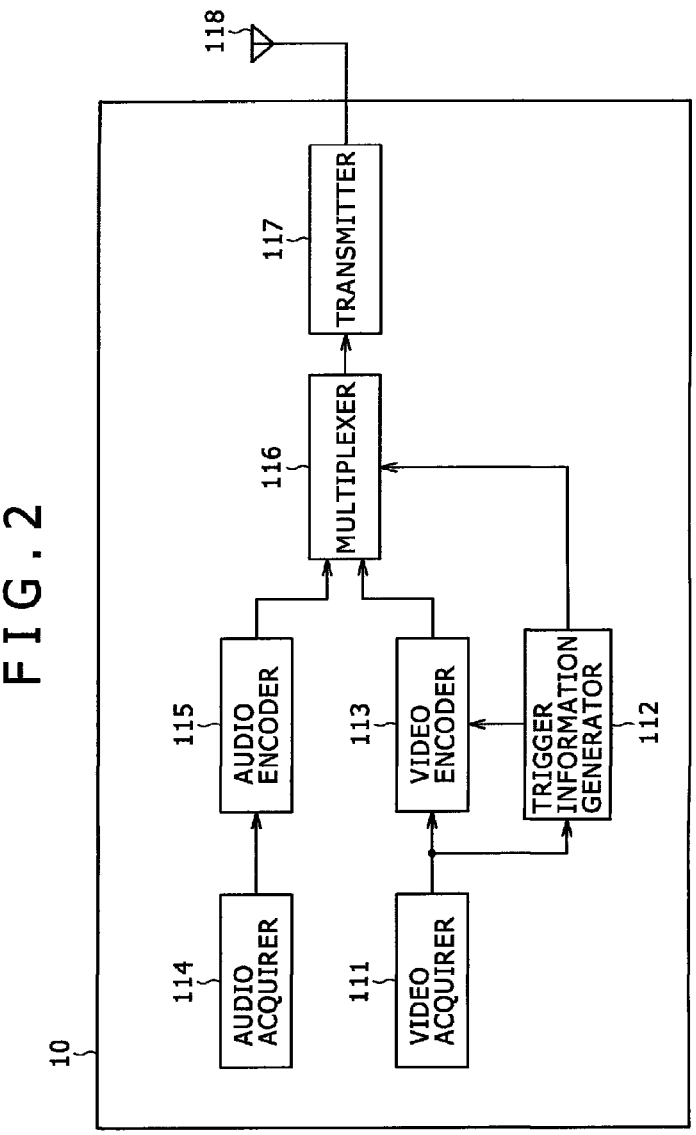

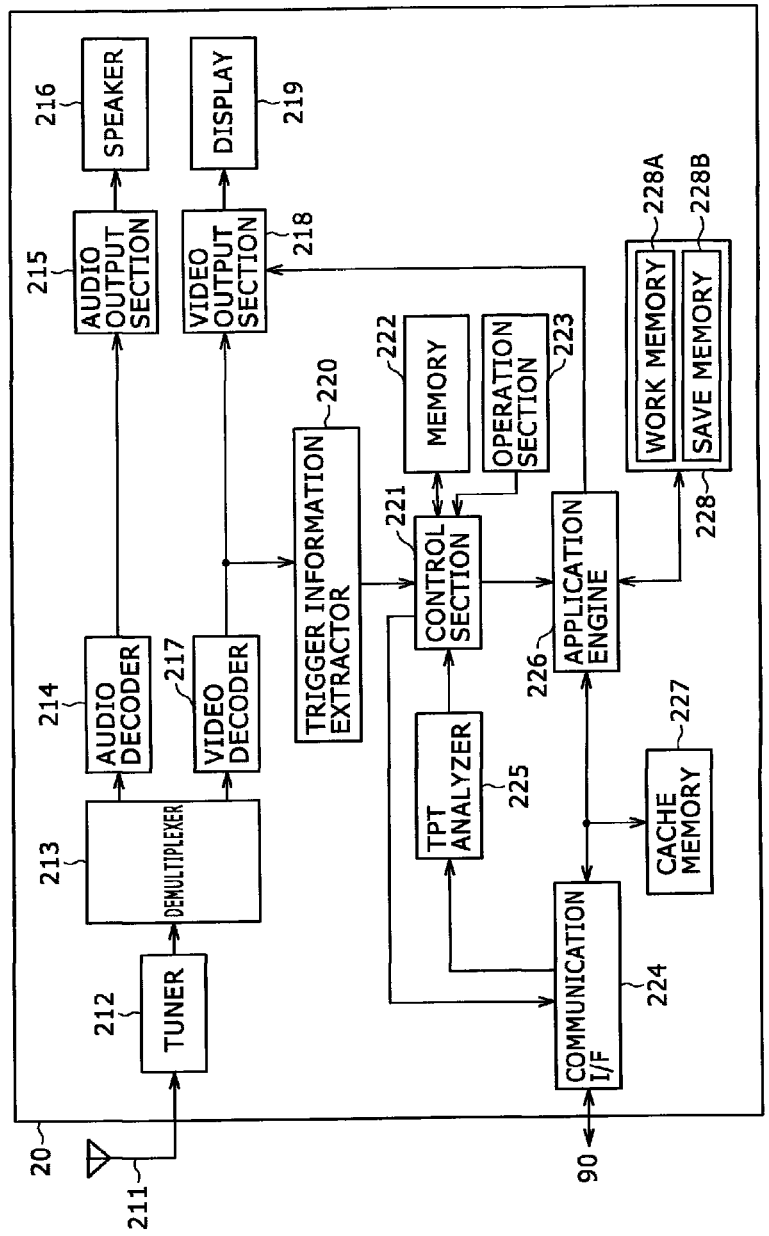

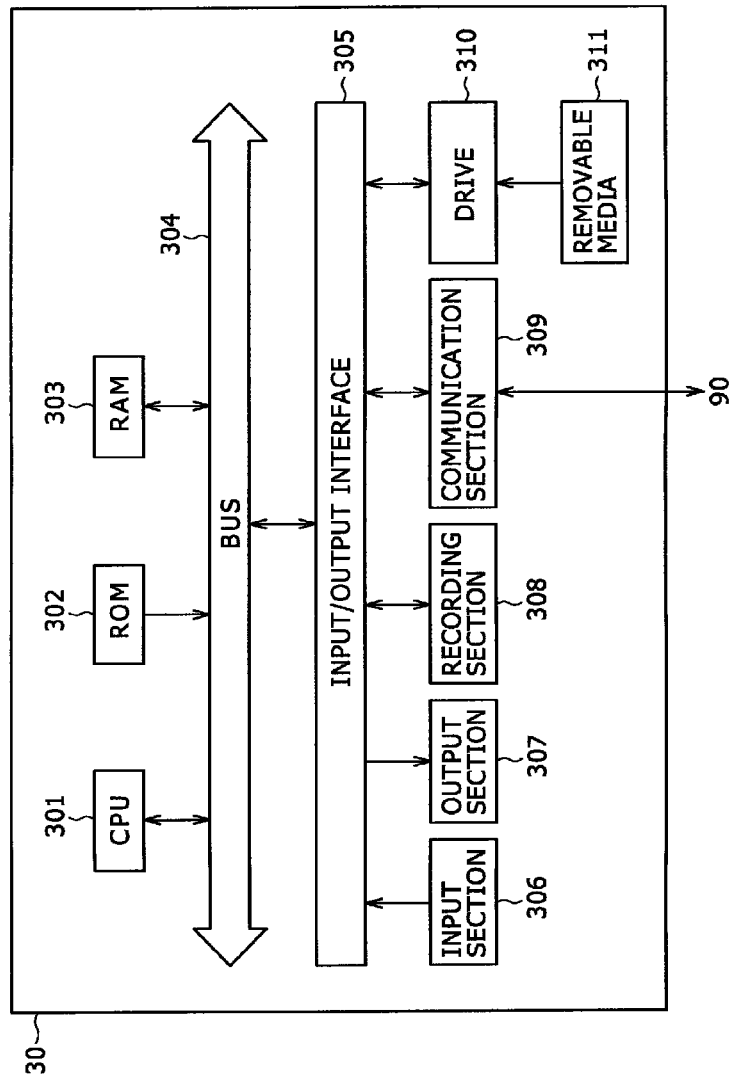

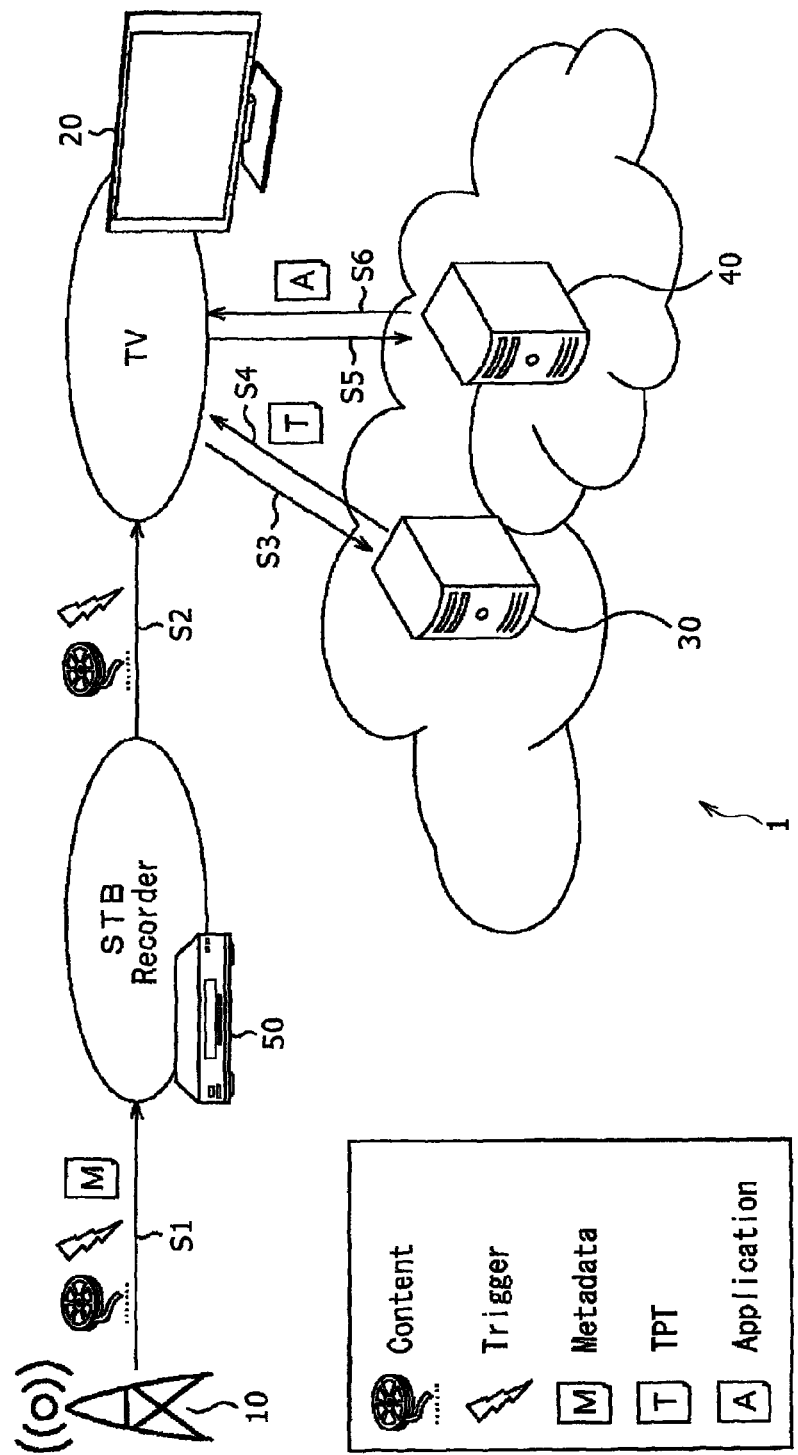

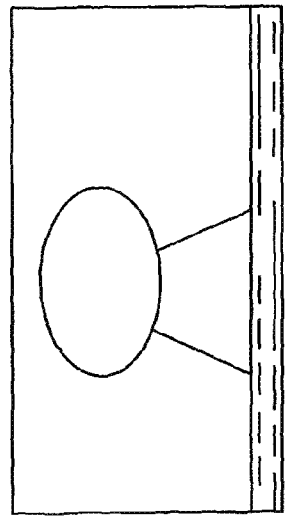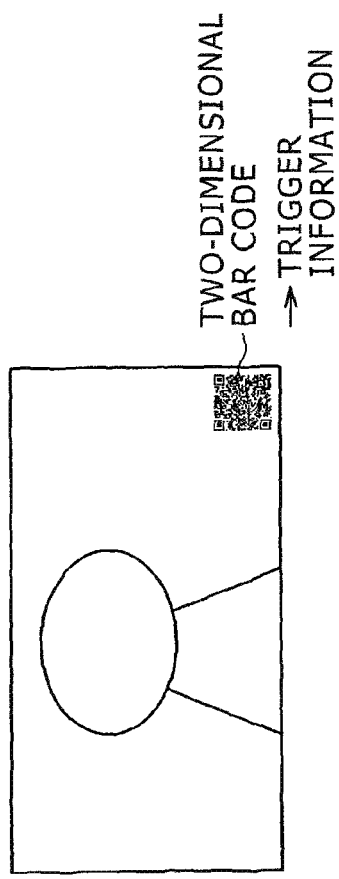

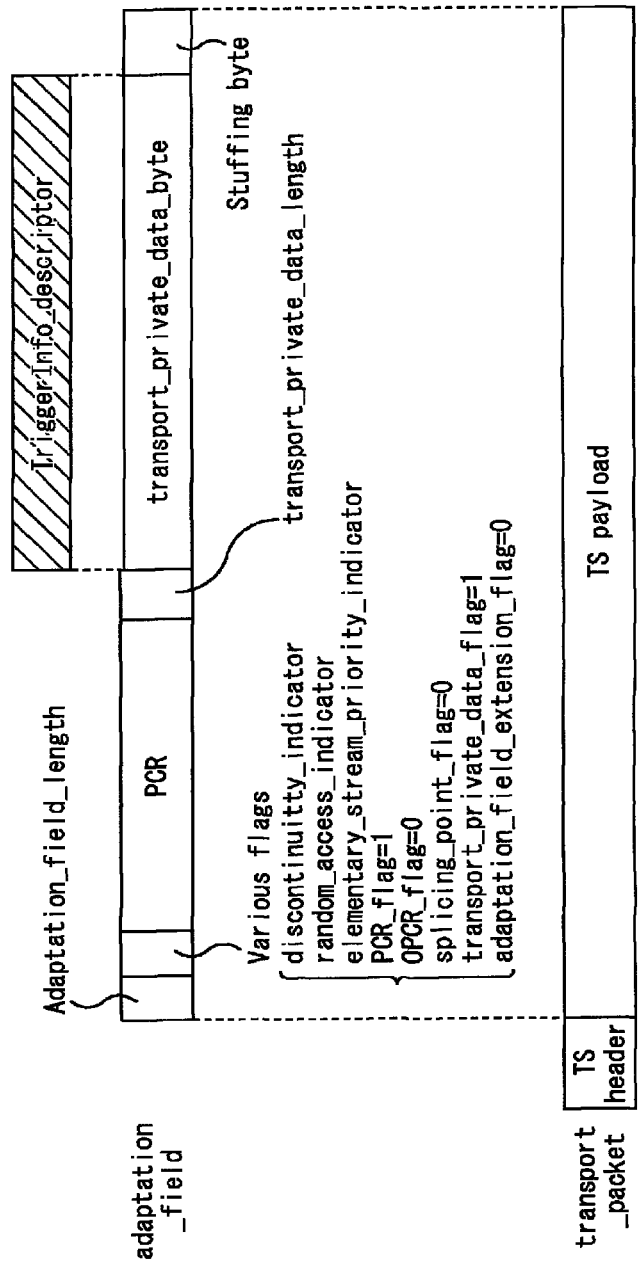

FIG. 9

| item | description |
|---|---|
| domain_name | The domain name of the provider's server (which TPT files are located) |
| segment_id | The unique name for the target segment. Provider can define it freely. |
| media_time | The time stamp of the target time position of the segment. |
| event_id | The ID for broadcast event related with any action for Application control. |
| event_time | The target time for the broadcast event measured by media_time |
| spread | Randomized diffusion range of trigger action timing |

FIG.10

```
<domain_name>/<segment_id>
<domain_name>/<segment_id>?m=<media_time>
<domain_name>/<segment_id>?m=<media_time>&s=<spread>
<domain_name>/<segment_id>?e=<event_id>
<domain_name>/<segment_id>?e=<event_id>&s=<spread>
<domain_name>/<segment_id>?e=<event_id>&t=<event_time>
<domain_name>/<segment_id>?e=<event_id>&t=<event_time>
   &s=<spread>
```

FIG. 11

| Element/Attribute(with @) | Number to be permitted | Description & Value |
|---|---|---|
| tpt | 1 | |
| @id | 1 | domain_name/Program_id=segment_id |
| @tptType | 1 | "static", "dynamic" |
| @majorVersion | 1 | Interactive protocol major version number |
| @minorVersion | 0..1 | Interactive protocol minor version number |
| @tptVersion | 1 | Version of this TPT instance |
| @updatingTime | 0..1 | Recommended TPT polling interval (for type="dynamic") |
| @endKt | 0..1 | The end time for TPT time scope |
| @expireDate | 0..1 | Expire date for caching TPT document. (only for type="static") |
| liveTrigger | 0..1 | optional specification of server providing live Triggers |
| @liveTriggerURL | 1 | URL of server providing updated live Triggers |
| @longPoll | 0..1 | true means use "long poll" protocol; false means reg. poll |
| @pollPeriod | 0..1 | polling period in seconds when regular polling is used |
| event | 1..N | |
| @eventID | 1 | event_id |
| @startTime | 0..1 | The start time of the command valid period |
| @endTime | 0..1 | The end time of the command valid period |
| @destination | 0..1 | Device type "receiver":receiver itself; "external_1":external device type1 "external_2":external device type2 |
| @action | 1 | Action "execute","register","terminate","suspend" |
| @previousApp | 0..1 | Previous executing Application treatment "terminate","suspend","hide" |
| @diffusion | 0..1 | Period for applying command diffusion |
| application | 1 | Description for target Application |
| @appID | 1 | Application ID |
| @appType | 1 | Application type |
| @url | 1 | Application URL |
| @priority | 0..1 | Priority to persist ::High 0:Normal |
| @expireDate | 0..1 | Expire date for caching the application |
| capability | 1..N | Receiver required capability for this application |
| streamEvent | 0..1 | Description for event |
| @streamID | 1 | Stream event ID |
| data | 0..1 | Embedded data |

FIG.12

```
<tpt id=xbc.com/1 tptType="static" expire_date="2011-01-21">
    <event eventId=1 start_time=0, end_time=600 destination="receiver" action="register" diffusion=60>
        <application appId="1" appType="html" url="xxx.com/yyy1" expire_date="2011-01-21"/>
    </event>
    <event eventId=2 start_time=600, end_time=3500 destination="receiver" action="execute">
        <application appId="1" appType="html" url="xxx.com/yyy1" expire_date="2011-01-21"/>
    </event>
    <event eventId=3 start_time=1800, end_time=2000 destination="receiver" action="execute">
        <application appId="1"/>
        <streamEvent streamId="event1">
            <data>zzzzzzz・・・・z</data>
        </streamEvent>
    </event>
    <event eventId=5 start_time=3500, end_time=3600, destination="receiver" action="terminate">
        <application appId="1"/>
    </event>
    <event eventId=12 start_time=2400, end_time=2520, destination="receiver" action="execute" previous_app="suspend">
        <application appId="2" appType="html" url="xxx.com/yyy2" expire_date="2011-01-22"/>
    </event>
    <event eventId=15 start_time=2520 end_time=3600 destination="receiver" action="terminate">
        <application appId="2"/>
    </event>
</tpt>
```

FIG. 13

| Element/Attribute(with @) | Number to be permitted | Description & Value |
|---|---|---|
| tpt | 1 | |
| @id | 1 | domain_name/Program_id=segment_id |
| @tptType | 1 | "static","dynamic" |
| @majorVersion | 1 | Interactive protocol major version number |
| @minorVersion | 0..1 | Interactive protocol minor version number |
| @tptVersion | 1 | Version of this TPT instance |
| @updatingTime | 0..1 | Recommended TPT polling interval(for type="dynamic") |
| @endUt | 0..1 | The end time for TPT time scope |
| @expireDate | 0..1 | Expire date for caching TPT document.(only for type="static") |
| liveTrigger | 0..1 | optional specification of server providing live Triggers |
| @liveTriggerURL | 1 | URL of server providing updated live Triggers |
| @longPoll | 0..1 | true means use "long poll" protocol;false means reg. poll |
| @pollPeriod | 0..1 | polling period in seconds when regular polling is used |
| event | 1..N | |
| @eventID | 1 | event_id |
| @startTime | 0..1 | The start time of the command valid period |
| @endTime | 0..1 | The end time of the command valid period |
| @destination | 0..1 | Device type<br>"receiver":receiver itself;<br>"external_1":external device type1<br>"external_2":external device type2 |
| @action | 1 | Action<br>"execute","terminate-execute","suspend-execute","register",<br>"terminate","suspend","hide-execute","hide" |
| @diffusion | 0..1 | Period for applying command diffusion |
| application | 1 | Description for target Application |
| @appID | 1 | Application ID |
| @appType | 1 | Application type |
| @url | 1 | Application URL |
| @priority | 0..1 | Priority to persist<br>1:High 0:Normal |
| @expireDate | 0..1 | Expire date for caching the application |
| capability | 1..N | Receiver required capability for this application |
| streamEvent | 0..1 | Description for event |
| @streamID | 1 | Stream event ID |
| data | 0..1 | Embedded data |

FIG.14

```
<tpt id=xbc.com/1 tptType="static" expire_date="2011-01-21">
  <event eventId=1 start_time=0, end_time=600 destination="receiver" action="register" diffusion=60>
    <application appId="1" appType="html" url="xxx.com/yyy1" expire_date="2011-01-21"/>
  </event>
  <event eventId=2 start_time=600, end_time=3500 destination="receiver" action="execute">
    <application appId="1" appType="html" url="xxx.com/yyy1" expire_date="2011-01-21"/>
  </event>
  <event eventId=3 start_time=1800, end_time=2000 destination="receiver" action="execute">
    <application appId="1"/>
    <streamEvent streamId="event1">
      <data>zzzzzzz・・・・z</data>
    </streamEvent>
  </event>
  <event eventId=5 start_time=3500, end_time=3600, destination="receiver" action="terminate">
    <application appId="1"/>
  </event>
  <event eventId=12 start_time=2400, end_time=2520, destination="receiver" action="suspend-execute">
    <application appId="2" appType="html" url="xxx.com/yyy2" expire_date="2011-01-22"/>
  </event>
  <event eventId=15 start_time=2520 end_time=3600 destination="receiver" action="terminate">
    <application appId="2"/>
  </event>
</tpt>
```

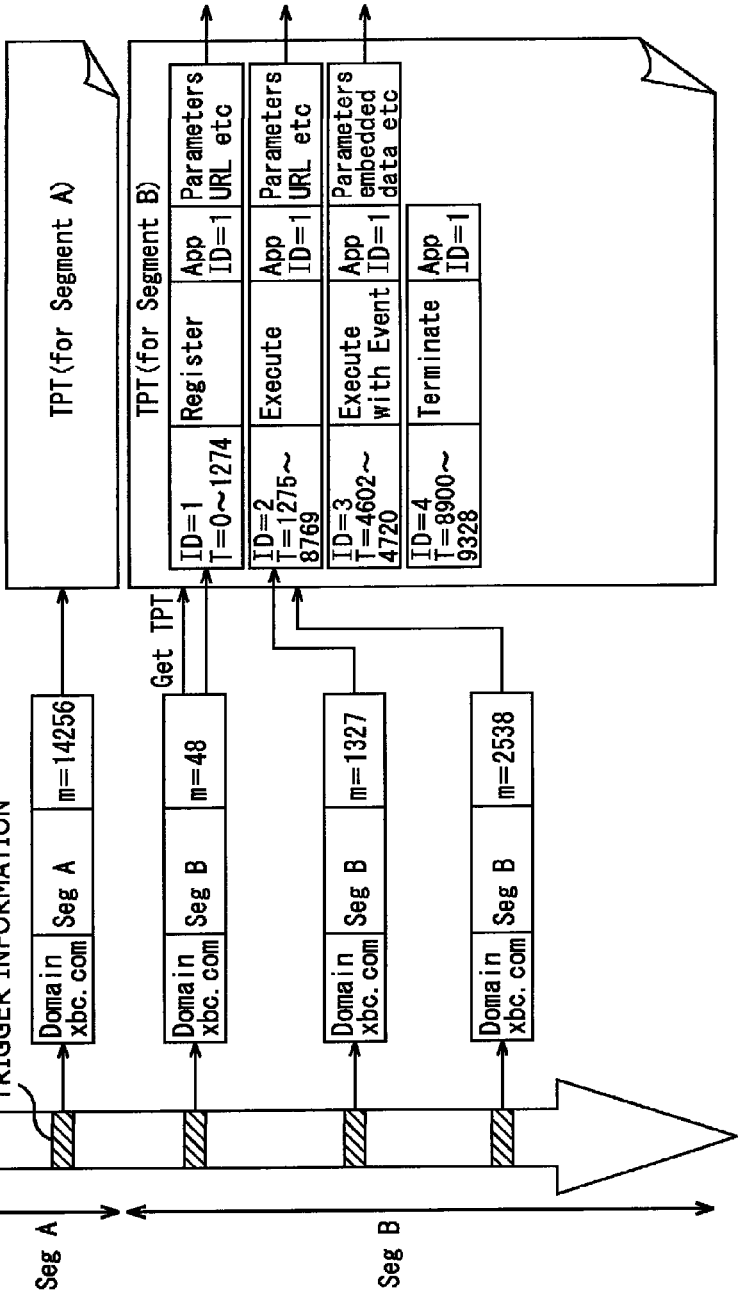

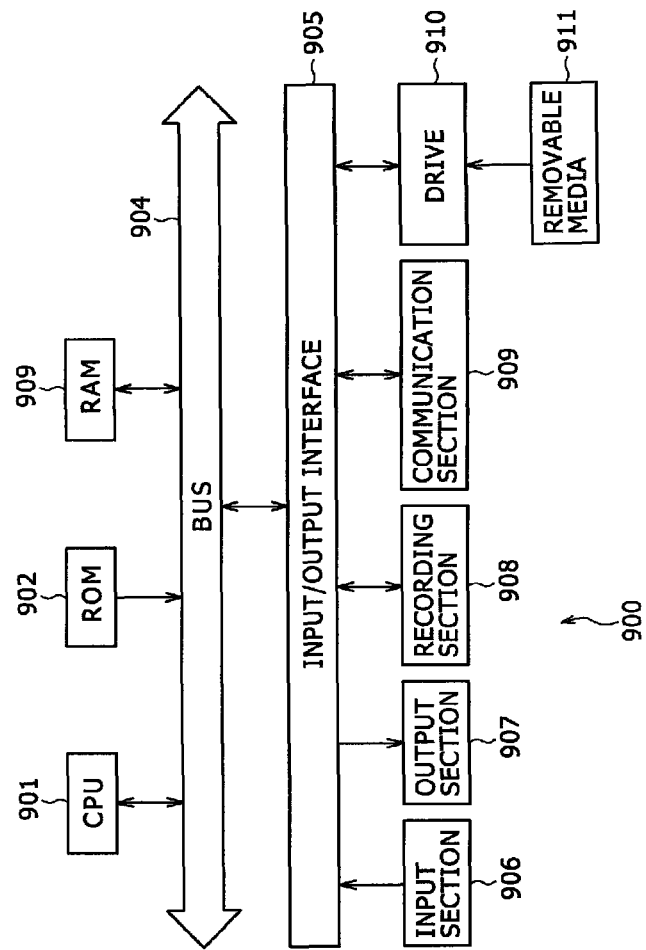

RECEIVING DEVICE, RECEIVING METHOD, TRANSMITTING DEVICE, AND TRANSMITTING METHOD FOR CONTROLLING APPLICATIONS

CROSS-REFERENCE TO RELATED APPLICATION

This application is a continuation of U.S. Ser. No. 13/777,734 filed Jan. 9, 2013 and claims the benefit of priority of Provisional Application Ser. No. 61/668,117, filed Jul. 5, 2012, the entire contents of which is incorporated herein by reference.

BACKGROUND

The present technique relates to a receiving device, a receiving method, a transmitting device, and a transmitting method and particularly to a receiving device, a receiving method, a transmitting device, and a transmitting method that are so configured as to allow provision of an application program run in conjunction with broadcast content.

A hybrid service of broadcast and communication for providing, via the Internet, an application program run in conjunction with broadcast content in a receiving device that receives the broadcast content broadcast by a digital television broadcast signal is expected to become widespread.

Therefore, in recent years, techniques for realizing such a hybrid service are being studied (refer to e.g. Japanese Patent Laid-open No. 2011-66556).

SUMMARY

In some cases, the receiving device does not directly receive the digital television broadcast signal but receives it via a broadcast transmission path such as a CATV (cable television) network or a satellite communication network. To realize the hybrid service in such a case, information relating to this hybrid service needs to be notified to the receiving device via the broadcast transmission path, a dedicated terminal, and so forth.

At this time, modification of facilities of the broadcast transmission path and the dedicated terminal is necessary. In addition, permission of a broadcaster that carries out the broadcast must be obtained. Thus, it is required to allow provision of the application program run in conjunction with broadcast content without involving such works.

However, presently, a technique system for providing the application program run in conjunction with broadcast content has not been established.

The present technique is devised in view of such circumstances, and it is desirable to provide an application program run in conjunction with broadcast content.

A receiving device of a first embodiment of the present technique includes: a receiver configured to receive broadcast content; a trigger information acquirer configured to acquire trigger information for identifying a command to control an operation of an application program that is run in conjunction with the broadcast content and is delivered via a network; a correspondence table acquirer configured to acquire a correspondence table in which the command is associated with information for identifying the command; and a control section configured to control operations of a subject application program and another application program other than the subject application program in response to the command identified by the trigger information and the correspondence table.

The receiving device may be an independent device or may be an internal block configuring one device.

A receiving method of the first embodiment of the present technique is a receiving method corresponding to the receiving device of the first embodiment of the present technique.

In the receiving device and the receiving method of the first embodiment of the present technique, the broadcast content is received and the trigger information for identifying the command to control the operation of the application program that is run in conjunction with the broadcast content and is delivered via a network is acquired. The correspondence table in which the command is associated with information for identifying the command is acquired and the operations of the subject application program and another application program other than the subject application program is controlled in response to the command identified by the trigger information and the correspondence table.

A transmitting device of a second embodiment of the present technique includes: a trigger information generator configured to generate trigger information for identifying a command to simultaneously control operations of a plurality of application programs that are run in conjunction with broadcast content and are delivered via a network; and a transmitter configured to transmit the trigger information together with the broadcast content.

The transmitting device may be an independent device or may be an internal block configuring one device.

A transmitting method of the second embodiment of the present technique is a transmitting method corresponding to the transmitting device of the second embodiment of the present technique.

In the transmitting device and the transmitting method of the second embodiment of the present technique, the trigger information for identifying the command to simultaneously control the operations of the plurality of application programs that are run in conjunction with the broadcast content and are delivered via a network is generated, and the trigger information is transmitted together with the broadcast content.

According to the first and second embodiments of the present technique, an application program run in conjunction with broadcast content can be provided.

BRIEF DESCRIPTION OF THE DRAWINGS

FIG. 2 is a diagram showing a configuration example of a transmitting device;

FIG. 3 is a diagram showing a configuration example of a receiving device;

FIG. 4 is a diagram showing a configuration example of a TPT (trigger parameters table) server and so forth;

FIG. 5 is a diagram for explaining an operation of each device configuring the broadcast-communication cooperative system;

FIGS. 6A and 6B are diagrams showing examples in which trigger information is embedded into a video signal;

FIG. 8 is a diagram showing specific deployment of the trigger information in the PCR packet;

FIG. 9 is a diagram showing one example of detailed specifications of the trigger information;

FIG. 10 is a diagram showing a description example of the trigger information;

FIG. 11 is a diagram showing one example of detailed specifications 1 of a TPT;

FIG. 12 is a diagram showing a description example 1 of the TPT;

FIG. 13 is a diagram showing one example of detailed specifications 2 of the TPT;

FIG. 14 is a diagram showing a description example 2 of the TPT;

FIG. 15 is a diagram showing an example of the correspondence relationship between the trigger information and a command;

FIG. 40 is a diagram showing a configuration example of a computer.

DETAILED DESCRIPTION OF THE PREFERRED EMBODIMENTS

Embodiments of the present technique will be described below with reference to the drawings.

First Embodiment

Configuration Example of
Broadcast-Communication Cooperative System

Figure 1:
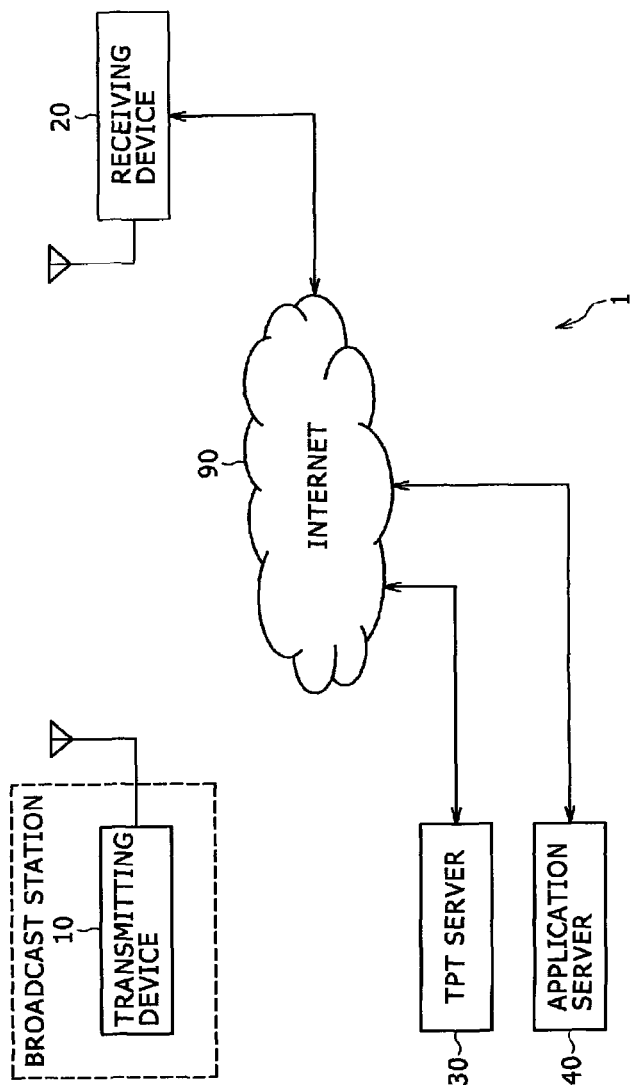
FIG. 1 is a diagram showing a configuration example of a broadcast-communication cooperative system.

FIG. 1 shows a broadcast-communication cooperative system 1 that is a first embodiment. This broadcast-communication cooperative system 1 is composed of a transmitting device 10, a receiving device 20, a TPT server 30, and an application server 40. Furthermore, the receiving device 20, the TPT server 30, and the application server 40 are connected to each other via the Internet 90.

The transmitting device 10 is so configured as to transmit broadcast content of television show, CM (commercial message), etc. by a digital television broadcast signal (hereinafter, referred to simply as the broadcast signal). The transmitting device 10 is provided by a broadcaster and is disposed in the broadcast station thereof for example.

The transmitting device 10 transmits trigger information for identifying a command to control the operation of a conjunction application run in conjunction with the broadcast content, with the trigger information included in the broadcast signal. Here, the conjunction application is an application program run in conjunction with broadcast content and is delivered via the Internet 90.

The trigger information is transmitted by being inserted in a video signal or an audio signal of the broadcast content or being disposed in a TS (transport stream) of the broadcast signal. Details of the trigger information will be described later with reference to FIG. 6A to FIG. 10.

The receiving device 20 receives the broadcast signal transmitted from the transmitting device 10 and acquires video and audio of the broadcast content. The receiving device 20 displays the acquired video on a display and outputs the audio from a speaker.

Hereinafter, the description will be made based on the assumption that the receiving device 20 is a television receiver. However, it may be included in electronic apparatus such as a video recorder by giving it a configuration that does not have display and speaker. The detailed configuration of the receiving device 20 will be described later with reference to FIG. 3.

In response to the trigger information from the transmitting device 10, the receiving device 20 accesses the TPT server 30 via the Internet 90 to acquire a TPT.

The TPT server 30 manages the TPT. Here, the TPT is a correspondence table in which a command for controlling the operation of a conjunction application and information for identifying the command, such as the valid period and valid time of this command, are associated with each other. The valid period and valid time of the command are decided in association with the progression of broadcast content.

The TPT server 30 provides the managed TPT to the receiving device 20 via the Internet 90 in response to a query from the receiving device 20. The TPT server 30 is provided by the producer, broadcaster, or another business operator of broadcast content.

The receiving device 20 identifies the command based on the trigger information from the transmitting device 10 and the TPT acquired from the TPT server 30. Then, the receiving device 20 controls the operation of a conjunction application in response to the identified command.

In response to the identified command, the receiving device 20 accesses the application server 40 via the Internet 90 and acquires a conjunction application.

The application server 40 manages the conjunction application. The application server 40 provides the managed conjunction application to the receiving device 20 via the Internet 90 in response to a query from the receiving device 20. The application server 40 is provided by the producer, broadcaster, or another business operator of broadcast content.

The broadcast-communication cooperative system 1 is configured as above.

Configuration Example of Transmitting Device

FIG. 2 shows a configuration example of the transmitting device 10 in FIG. 1.

As shown in FIG. 2, the transmitting device 10 is composed of a video acquirer 111, a trigger information generator 112, a video encoder 113, an audio acquirer 114, an audio encoder 115, a multiplexer 116, a transmitter 117, and an antenna 118.

The video acquirer 111 acquires a video signal of broadcast content from an external server, camera, recording medium, or so forth and supplies it to the trigger information generator 112 and the video encoder 113.

The trigger information generator 112 generates trigger information in association with the progression of the broadcast content corresponding to the video signal supplied from the video acquirer 111 and supplies it to the video encoder 113 or the multiplexer 116.

The video encoder 113 encodes the video signal supplied from the video acquirer 111 in accordance with an encoding system such as the MPEG (Moving Picture Experts Group) and supplies the encoded signal to the multiplexer 116. In performing the encoding, the video encoder 113 can embed the trigger information supplied from the trigger information generator 112 in the video signal and encode the video signal.

The audio acquirer 114 acquires an audio signal of broadcast content from an external server, microphone, recording medium, or so forth and supplies it to the audio encoder 115.

The audio encoder 115 encodes the audio signal supplied from the audio acquirer 114 in accordance with an encoding system such as the MPEG and supplies the encoded signal to the multiplexer 116.

To the multiplexer 116, the trigger information from the trigger information generator 112, the video stream from the video encoder 113, and the audio stream from the audio encoder 115 are supplied.

The multiplexer 116 multiplexes the video stream and the audio stream and supplies the TS obtained as the result to the transmitter 117. The multiplexer 116 can multiplex the video stream, the audio stream, and the trigger information and supply the TS obtained as the result to the transmitter 117.

The transmitter 117 transmits the TS supplied from the multiplexer 116 as a broadcast signal via the antenna 118.

In the description of FIG. 2, the case in which the trigger information is embedded in the video signal and the case in which it is multiplexed into the TS will be explained. However, the trigger information may be disposed by another method such as a method in which the trigger information is embedded in the audio signal for example.

The transmitting device 10 is configured in the above-described manner.

Configuration Example of Receiving Device

FIG. 3 shows a configuration example of the receiving device 20 in FIG. 1.

As shown in FIG. 3, the receiving device 20 is composed of an antenna 211, a tuner 212, a demultiplexer 213, an audio decoder 214, an audio output section 215, a speaker 216, a video decoder 217, a video output section 218, a display 219, a trigger information extractor 220, a control section 221, a memory 222, an operation section 223, a communication I/F 224, a TPT analyzer 225, an application engine 226, a cache memory 227, and an application memory 228.

The tuner 212 demodulates a broadcast signal received via the antenna 211 and supplies the TS obtained as the result to the demultiplexer 213.

The demultiplexer 213 separates the TS supplied from the tuner 212 into an audio stream and a video stream and supplies each of them to the audio decoder 214 and the video decoder 217.

The audio decoder 214 decodes the audio stream supplied from the demultiplexer 213 by a decoding system corresponding to the encoding system by the audio encoder 115 (FIG. 2) and supplies an audio signal obtained as the result to the audio output section 215.

The audio output section 215 supplies, to the speaker 216, the audio signal supplied from the audio decoder 214. The speaker 216 outputs audio corresponding to the audio signal supplied from the audio output section 215.

The video decoder 217 decodes the video stream supplied from the demultiplexer 213 by a decoding system corresponding to the encoding system by the video encoder 113 (FIG. 2) and supplies a video signal obtained as the result to the video output section 218 and the trigger information extractor 220.

The video output section 218 supplies, to the display 219, the video signal supplied from the video decoder 217. The display 219 displays video corresponding to the video signal supplied from the video output section 218.

The trigger information extractor 220 always monitors the video signal supplied from the video decoder 217. The trigger information extractor 220 extracts and acquires the trigger information embedded in the video signal and supplies it to the control section 221.

If the trigger information is disposed in the TS, the trigger information extractor 220 monitors a PCR packet including the trigger information separated by the demultiplexer 213 and extracts the trigger information therefrom. Furthermore, if the trigger information is embedded in the audio signal, the trigger information extractor 220 always monitors the audio signal decoded by the audio decoder 214 to thereby extract the trigger information embedded in the audio signal.

The control section 221 runs a control program stored in the memory 222 in advance to thereby control the operation of the respective sections of the receiving device 20.

In the memory 222, the control program run by the control section 221 is stored in advance. This control program can be accordingly updated based on update data acquired via the broadcast signal or the Internet 90. The operation section 223 accepts various kinds of operation from the user and notifies the control section 221 of an operation signal corresponding thereto.

In response to the trigger information supplied from the trigger information extractor 220, the control section 221 controls the communication I/F 224 to access the TPT server 30 via the Internet 90 and request a TPT. The communication I/F 224 receives the TPT transmitted from the TPT server 30 via the Internet 90 and supplies it to the TPT analyzer 225 in accordance with control from the control section 221.

The TPT analyzer 225 acquires the TPT supplied from the communication I/F 224. The TPT analyzer 225 analyzes the acquired TPT and retains the analysis result in a memory (not shown) included inside. The TPT analyzer 225 supplies the analysis result of the TPT retained in the memory in response to a request from the control section 221.

The control section 221 sets an internal clock for timing the time indicating the progression of broadcast content based on the trigger information from the trigger information extractor 220. Based on the analysis result of the TPT from the TPT analyzer 225, if the time timed by this internal clock satisfies a predetermined valid condition based on the valid period and so forth, the control section 221 identifies the command associated with this valid period and so forth. In response to the identified command, the control section 221 controls the application engine 226 to control acquisition or registration, acquisition or activation, event firing, pause or resumption, hiding or displaying, stop, or so forth of a conjunction application.

The application engine 226 controls the communication I/F 224 to access the application server 40 via the Internet 90 and request a conjunction application in accordance with control from the control section 221. The communication I/F 224 receives the conjunction application transmitted from the application server 40 via the Internet 90 and makes it be retained in the cache memory 227.

The application engine 226 reads out the conjunction application retained in the cache memory 227 and runs it in accordance with control from the control section 221. The video signal of the running conjunction application is supplied to the video output section 218.

The video output section 218 combines the video signal supplied from the application engine 226 with the video signal supplied from the video decoder 217 and makes the display 219 display video obtained by it.

The application memory 228 is composed of a work memory 228A and a save memory 228B. The application engine 226 records data relating to the running conjunction application (specifically, including the hierarchy of displayed information and so forth) in the work memory 228A.

When causing the running conjunction application to pause, the application engine 226 moves the data in the work memory 228A of the application memory 228 to the save memory 228B. Then, when resuming the conjunction application in the pause, the application engine 226 moves the data in the save memory 228B to the work memory 228A to restore the state before the pause.

The receiving device 20 is configured in the above-described manner.

Configuration Example of TPT Server

FIG. 4 shows a configuration example of the TPT server 30 in FIG. 1.

The TPT server 30 is configured as shown in FIG. 4 for example. It executes various kinds of processing in accordance with a program recorded in a CPU (Central Processing Unit) 301, a ROM (Read Only Memory) 302, or a recording section 308. The program run by the CPU 301, data, and so forth are accordingly recorded in a RAM (Random Access Memory) 303. These CPU 301, ROM 302, and RAM 303 are connected to each other by a bus 304.

An input/output interface 305 is connected to the CPU 301 via the bus 304. An input section 306 and an output section 307 are connected to the input/output interface 305. The CPU 301 executes various kinds of processing in response to an order input to the input section 306. Then, the CPU 301 outputs information obtained as the result of this processing to the output section 307.

The recording section 308 connected to the input/output interface 305 is configured by e.g. a hard disc or so forth and records the program run by the CPU 301 and various kinds of data (e.g. TPT). A communication section 309 communicates with an external device (e.g. receiving device 20) via the Internet 90.

Furthermore, when removable media 311 such as optical disc and semiconductor memory are loaded in a drive 310 connected to the input/output interface 305, the drive 310 drives them and acquires program, data, etc. recorded therein. The acquired program and data are transferred to the recording section 308 and recorded according to need.

The TPT server 30 is configured in the above-described manner.

The application server 40 in FIG. 1 is configured similarly to the TPT server 30 of FIG. 4 and therefore description thereof is omitted.

Operation of Respective Devices of
Broadcast-Communication Cooperative System

Next, with reference to FIG. 5, the outline of the operation of the respective devices configuring the broadcast-communication cooperative system 1 of FIG. 1 will be described.

In the broadcast-communication cooperative system 1 of FIG. 5, a broadcast signal of broadcast content ("Content" in the diagram) is transmitted, including trigger information ("Trigger" in the diagram), by the transmitting device 10 (S1). Metadata relating to this broadcast content ("Metadata" in the diagram) is included in the broadcast signal.

In the case of receiving the broadcast signal from the transmitting device 10 via a CATV network, a satellite communication network, or so forth, the receiving device 20 ("TV" in the diagram) receives a signal resulting from conversion by a dedicated terminal such as a set-top box 50 ("STB Recorder" in the diagram) via an HDMI (High Definition Multimedia Interface) (S2). In this case, the output from the set-top box 50 is only the broadcast content and the trigger information and the metadata cannot be utilized in the receiving device 20.

Besides the case of directly receiving the broadcast signal (S1), also in the case of receiving it via the set-top box 50 (S2), the receiving device 20 can extract the trigger information transmitted together with the broadcast signal. The receiving device 20 determines whether or not to acquire a TPT depending on the extracted trigger information. If determining to acquire a TPT, the receiving device 20 accesses the TPT server 30 via the Internet 90 and requests a TPT (S3).

In response to the query from the receiving device 20, the TPT server 30 identifies the TPT and transmits the identified TPT ("TPT" in the diagram) to the receiving device 20 via the Internet 90 (S4). The receiving device 20 receives the TPT from the TPT server 30 via the Internet 90 and retains it.

Then, when extracting the trigger information from the transmitting device 10, the receiving device 20 refers to the retained TPT. For example, if the time indicated by the internal clock is in the valid period of a command or has elapsed the valid start time, the receiving device 20 identifies the valid command corresponding to it.

In accordance with the identification result of the command, the receiving device 20 accesses the application server 40 via the Internet 90 and requests the conjunction application to be run in conjunction with the broadcast content currently selected (S5).

In response to the query from the receiving device 20, the application server 40 transmits the conjunction application ("Application" in the diagram) to the receiving device 20 via the Internet 90 (S6). The receiving device 20 acquires the conjunction application from the application server 40 via the Internet 90 and activates it.

In the receiving device 20, if the time indicated by the internal clock is in the valid period of a command, the command corresponding to this valid period is identified by the TPT. Then, the conjunction application carries out operation of event firing, pause or resumption, hiding or displaying, stop, or so forth depending on the identified command.

In the above-described manner, in the broadcast-communication cooperative system 1, the receiving device 20 carries out cooperative operation with the TPT server 30 and the application server 40 in response to the trigger information from the transmitting device 10. Thereby, the conjunction application to be run in conjunction with the broadcast content currently selected is acquired and run in the receiving device 20.

The trigger information from the transmitting device 10 is notified to the receiving device 20 also via a dedicated terminal such as the set-top box 50. Therefore, in the broadcast-communication cooperative system 1, the conjunction application can be provided without involving works of modifying the facilities of the broadcast transmission path such as a CATV network and the dedicated terminal and obtaining permission of the broadcaster that carries out the broadcast.

Details of Trigger Information (Method for Transmitting Trigger Information)

Next, a method for transmitting trigger information will be described.

FIGS. 6A and 6B show two kinds of examples of the case in which trigger information is embedded in the video signal of broadcast content.

FIG. 6A shows an example in which trigger information is turned to a two-dimensional bar code and is so combined as to be superimposed onto a predetermined position (in the case of FIG. 6A, lower right corner) of the image of the video signal. FIG. 6B shows an example in which trigger information is turned to a video code and combined with several lines at the lower part of the image of the video signal. The trigger information in FIG. 6A and FIG. 6B is extracted by the trigger information extractor 220 of the receiving device 20.

In either example of FIG. 6A or FIG. 6B, the trigger information is disposed on the video of broadcast content and thus the trigger information can be notified also to the receiving device utilizing a CATV network or a satellite communication network (e.g. receiving device 20 in FIG. 5) for example.

In either example of FIG. 6A or FIG. 6B, possibly the trigger information (two-dimensional bar code or video code) on the video is visually recognized by the user of the receiving device 20. If this is not preferable, it is preferable to display the video after masking the trigger information on the video by the same pixels as those around the trigger information.

Although examples in which trigger information is embedded in the video signal of broadcast content are shown in FIGS. 6A and 6B, the storage position and transmitting method of the trigger information are not limited thereto as described above. For example, as another method, trigger information may be stored in a PCR of a TS.

Figure 7:
FIG. 7 is a diagram showing a concept in which the trigger information is so transmitted as to be included in a PCR (program clock reference) packet of a TS (transport stream)

FIG. 7 shows the concept of the case in which trigger information is disposed in a PCR packet of the TS of a broadcast signal to be transmitted.

As shown in FIG. 7, the trigger information is not stored in all PCR packets but stored in a PCR packet only at the proper timing for conjunction with broadcast content. In general, the PCR packet passes through a PID (packet identifier) filter of a CATV retransmission device and thus the trigger information can be notified also to the receiving device utilizing a CATV network or a satellite communication network (e.g. receiving device 20 in FIG. 5). The trigger information may be disposed in a user data area on a video stream or an audio stream.

As the trigger information, information of the same contents is transmitted plural times successively in consideration of radio interference and acquisition imperfection (reception miss) in the receiving device 20.

FIG. 8 shows the position at which the trigger information is stored in the PCR packet. The PCR packet is a packet obtained by storing a PCR in adaptation_field of a TS packet. The trigger information (Trigger Info_descriptor) is stored in transport_private_data_byte following the PCR. If the trigger information is stored, transport_private_data_flag of Various_flags provided before the PCR is set to 1.

(Detailed Specification of Trigger Information)

Next, details of the trigger information will be described. FIG. 9 is a diagram showing one example of the detailed specification of the trigger information.

domain_name is information for identifying the TPT server 30 and information indicating the domain name of the TPT server 30 is specified for example. That is, because the TPT server 30 is provided by business operators such as a broadcaster that carries out the broadcast of broadcast content by the transmitting device 10, domain_name differs for each of these business operators.

segment_id is an ID for identifying the segment of the broadcast content. The business operator can set an arbitrary ID.

media_time is information indicating a specific time position on the progression time axis of the broadcast content. For example, a specific time such as the start time on the progression time axis of the broadcast content or midnight (0:00) is employed as the basis, and the time from this basis time is specified in media_time. The time specified in media_time is in units of seconds or milliseconds for example.

event_id is an ID for identifying the command described in a TPT. event_time is information indicating the time when the command described in a TPT is executed.

In spread, information for stochastically dispersing the timing at which the trigger information is applied is specified.

(Description Examples of Trigger Information)

FIG. 10 is a diagram showing description examples of the trigger information.

In FIG. 10, plural description examples of the trigger information are shown. The trigger information is formed of a character string obtained by linking values for specifying domain_name, segment_id, media_time, event_id, event_time, and spread and predetermined characters such as "/," "? =," and "&."

For example, if domain_name is "xbc.com," segment_id is "SegA," and media_time is "1000," the character string indicating the trigger information is "xbc.com/SegA?m=1000."

That is, if "http://" is added to the beginning of this character string, a character string of "http://xbc.com/SegA?m=1000" indicating the URL (Uniform Resource Locator) for access to the TPT server 30 is obtained. Because a query character string of m=<media_time> is added at the ending of this URL, the TPT server 30 can acquire the parameter by utilizing the GET method of the HTTP (HyperText Transfer Protocol).

By addition of character strings of e=<event_id>, t=<event_time>, and s=<spread>, the values of event_id, event_time, and spread can be acquired in the receiving device 20.

The description method of the trigger information is arbitrary and is not limited to the description examples of FIG. 10.

The trigger information is configured in the above-described manner.

Details of TPT (Detailed Specification 1 of TPT)

Next, details of the TPT will be described. FIG. 11 is a diagram showing one example of the detailed specification of the TPT.

As shown in FIG. 11, the TPT is composed of a tpt element. In the tpt element, pieces of information such as a command for controlling the operation of a conjunction application and the valid period of this command are described.

The tpt element includes an id attribute, a tptType attribute, a majorVersion attribute, a minorVersion attribute, a tptVersion attribute, an updatingTime attribute, an endMt attribute, an expireDate attribute, a liveTrigger element, and an event element.

In the id attribute, an ID for identifying this TPT is specified. For example, in the id attribute, a character string obtained by linking domain_name and program_id by "/" is specified. program_id corresponds to segment_id and is an ID for identifying the broadcast content.

In the tptType attribute, "static" or "dynamic" is specified as the attribute value thereof. "static" is specified in the case of updating the TPT only when segment_id included in trigger information is changed. "dynamic" is specified in the case of updating the TPT even when segment_id included in trigger information is the same.

In the majorVersion attribute, information indicating the major version of the interactive protocol is specified. In the minorVersion attribute, information indicating the minor version of the interactive protocol is specified.

In the tptVersion attribute, information indicating the version of this TPT is specified.

In the updatingTime attribute, information indicating the update period of the TPT is specified. The updatingTime attribute is specified only when the tptType attribute is "dynamic."

In the endMt attribute, information indicating the time when media_time of the broadcast content corresponding to this TPT ends is specified.

In the expireDate attribute, information indicating the expiration date of this TPT is specified. The expireDate attribute is specified only when the tptType attribute is "static."

In the liveTrigger element, information relating to the trigger information necessary in the case of live broadcast of broadcast content (hereinafter, referred to as the live trigger information) is described. The liveTrigger element includes a liveTriggerURL attribute, a longPoll attribute, and a pollPeriod attribute.

In the liveTriggerURL attribute, the URL for access to a server that provides the live trigger information (trigger server 80 in FIG. 34 to be described later) is specified.

In the longPoll attribute, information relating to the protocol of long polling is specified. In the pollPeriod attribute, information indicating the interval of inquiry to the server about the live trigger information is specified.

In the event element, information for controlling the operation of a conjunction application is described. The event element includes an eventID attribute, a startTime attribute, an endTime attribute, a destination attribute, an action attribute, a previousApp attribute, a diffusion attribute, an application element, and a streamEvent element.

In the eventID attribute, an ID for identifying the command is specified.

In the startTime attribute, information indicating the start time of the valid period of the command identified by the eventID attribute is specified. In the endTime attribute, information indicating the end time of the valid period of the command identified by the eventID attribute is specified.

That is, the valid period of the command is defined by the startTime attribute and the endTime attribute, which indicate two points on the progression time axis of the corresponding broadcast content. For example, when the progression timing of the broadcast content timed by the internal clock of the receiving device 20 elapses the valid start time indicated by the startTime attribute, the command corresponding to this valid start time is deemed to be valid. In this case, only the startTime attribute may be specified without specifying the endTime attribute.

The following configuration may be employed. Specifically, when the progression timing of the broadcast content timed by the internal clock of the receiving device 20 is in the valid period, the command corresponding to this valid period is deemed to be valid. When the progression timing of the broadcast content does not reach the valid period or has passed it, the command corresponding to this valid period is deemed to be invalid. That is, in the receiving device 20, when the time timed by the internal clock satisfies a predetermined valid condition based on the valid period and so forth, the command corresponding to this valid period is deemed to be valid.

In the destination attribute, the apparatus as the control subject of a conjunction application by the relevant command is specified. Here, besides the receiving device main body (receiving device 20), an external device (not shown) is specified as the subject apparatus of the command if this external device is connected to the receiving device 20.

For example, in the destination attribute, "receiver" is specified if the subject apparatus of the command is the receiving device 20. If the subject apparatus of the command is an external device, "external 1" or "external 2" is specified. If the destination attribute is not specified, it is deemed that "receiver" is specified.

In the action attribute, any of "execute," "register," "suspend," and "terminate" is specified as the relevant command.

The execute is the command for ordering acquisition or activation of a conjunction application.

If the specified conjunction application is in a pause, the execute command resumes execution of this conjunction application. If the specified conjunction application is hidden, the execute command makes this conjunction application be displayed.

The register is a command for ordering acquisition or registration of a conjunction application. Here, the registration of a conjunction application means that the priority and expiration date of the acquired conjunction application are stored in association with the acquired conjunction application.

The suspend is a command for suspending the running conjunction application to make it pause.

The terminate is a command for stopping the running conjunction application.

That is, in the action attribute, "register" is specified in the case of ordering acquisition or registration of a conjunction application, and "execute" is specified in the case of ordering activation of a registered conjunction application. "suspend" is specified in the case of ordering a pause of the running conjunction application and "terminate" is specified in the case of ordering stop of a conjunction application.

In the previousApp attribute, additional information for controlling the operation of another conjunction application other than the subject conjunction application (e.g. conjunction application that is activated earlier than the subject conjunction application and is running) is described if the relevant command is the execute command. As this relevant information, any of "terminate," "suspend," and "hide" is specified.

The terminate is specified in the case of stopping another conjunction application that is running.

The suspend is specified in the case of suspending another conjunction application that is running to make it pause.

The hide is specified in the case of setting the display state of another conjunction application that is running to the non-displayed state.

For convenience of explanation, hereinafter the description will be made in such a manner that the execute commands for which the terminate, the suspend, and the hide are specified as the additional information are referred to as the execute-with-terminate command (execute with terminate), the execute-with-suspend command (execute with suspend), and the execute-with-hide command (execute with hide), respectively.

In the diffusion attribute, information for stochastically dispersing the timing at which the command is applied in the receiving device 20 is specified. Due to the setting of this value, when the plural receiving devices 20 acquire a conjunction application from the application server 40, the access thereof can be dispersed without concentrating on one time.

In the application element, information relating to the conjunction application is described. The application element includes an appID attribute, an appType attribute, a url attribute, a priority attribute, an expireDate attribute, and a capability element.

In the appID attribute, an application ID for identifying the relevant conjunction application is specified. In the appType attribute, the application type indicating information relating to the file attribute of the relevant conjunction application and so forth is specified.

In the url attribute, the application URL indicating the acquisition source of the relevant conjunction application is specified if the relevant command is the execute command or the register command. That is, the URL of the application server 40 is specified in the url attribute.

In the priority attribute, information indicating the priority when the conjunction application corresponding to the relevant command is acquired and retained is specified. In the expireDate attribute, information indicating the expiration date of the conjunction application is specified. If the conjunction application is registered, the expiration date and retention priority of this conjunction application are stored, and the conjunction application is managed in accordance with these expiration date and priority.

The url attribute and the expireDate attribute are essential items if the command is the execute command or the register command. Furthermore, in the priority attribute, normally "0" is specified and "1" is specified if the priority is set high.

In the capability element, information indicating the function required of the receiving device 20 in execution of the conjunction application is specified. That is, the receiving device 20 determines that it can execute the relevant conjunction application if it has the function specified by the capability element.

In the streamEvent element, additional information (event information) relating to an event is described when the relevant command is the execute command and event firing for the subject conjunction application is carried out. The streamEvent element includes a streamID attribute and a data element.

In the streamID attribute, an event ID for identifying the event that should be fired in the conjunction application specified by the application ID is specified. In the data element, data referenced when the event is fired is described.

Hereinafter, the description will be made in such a manner that the execute command to which the event information is added is referred to as the execute-with-event command (execute with event).

(Description Example 1 of TPT)

FIG. 12 is a diagram showing a description example of the TPT of FIG. 11.

In the example of FIG. 12, "xbc.com/1" is specified in the id attribute of the tpt element. That is, this means that this TPT is one for broadcast content (program_id=1) to be broadcast by the xbc broadcast station (domain_name="xbc.com") for example.

In the tpt element, "static" is specified in the tptType attribute. Thus, the TPT is updated only when program_id (segment_id) is changed. Moreover, because "2011-01-21" is specified in the expireDate attribute, the expiration date of this TPT is Jan. 21, 2011.

Six event elements are described in this tpt element although all are not described for simplification of explanation.

In the first event element, "1" as the eventID attribute, "0" as the startTime attribute, "600" as the endTime attribute, "receiver" as the destination attribute, "register" as the action attribute, and "60" as the diffusion attribute are each specified. That is, the relevant command (eventID=1) is the register command for the receiving device 20, executed when the time timed by the internal clock becomes zero seconds. However, because the diffusion attribute is described, the receiving device 20 accesses the application server 40 at predetermined timing.

The application element is described between the start tag and end tag of the event element. In the application element, "1" as the appID attribute, "html" as the appType attribute, "xxx.com/yyy1" as the url attribute, and "2011-01-21" as the expireDate attribute are each specified.

That is, this application element means that a conjunction application (appID=1) described by the HTML (Hyper Text Markup Language) can be acquired from the application server 40 specified by the URL of "xxx.com/yyy1." In addition, the expiration date of this conjunction application is Jan. 21, 2011.

Similarly, the second event element indicates that the relevant command (eventID=2) is the execute command for the receiving device 20 executed when the time timed by the internal clock becomes 600 seconds. It means that the conjunction application (appID=1) acquired in response to the execute command can be acquired from the application server 40 of the URL of "xxx.com/yyy1."

The third event element indicates that the relevant command is the execute command executed when the time timed by the internal clock becomes 1800 seconds. The application element and the streamEvent element are described between the start tag and end tag of this event element. In the application element, "1" is specified as the appID attribute. In the streamEvent element, "event1" is specified as the streamID attribute and "zzzzzzz . . . z" is described as the data element.

That is, the relevant command (eventID=3) is the execute-with-event command and means event firing for the conjunction application (appID=1) run by the receiving device 20. With this command, the data of "zzzzzzz . . . z" is utilized by the conjunction application in association with the event firing.

The fourth event element indicates that the relevant command (eventID=5) is the terminate command that is executed when the time timed by the internal clock becomes 3500 seconds and is for the conjunction application (appID=1) run by the receiving device 20.

The fifth event element indicates that the relevant command (eventID=12) is the execute command for the receiving device 20 executed when the time timed by the internal clock becomes 2400 seconds. In this event element, "suspend" is specified as the previousApp attribute. In the application element between the start tag and end tag of the event element, "2" is specified as the appid attribute, "html" is specified as the apptype attribute, "xxx.com/yyy2" is specified as the url attribute, and "2011-01-22" is specified as the expireDate attribute.

That is, this event element means that the relevant command is the execute-with-suspend command and the subject conjunction application (appID=2) can be acquired from the application server 40 specified by the URL of "xxx.com/yyy2." By the additional information (suspend), another conjunction application (appID=1) that is already running is suspended to pause.

Similarly, the sixth event element indicates that the relevant command (eventID=15) is the terminate command that is executed when the time timed by the internal clock is 2520 seconds and is for the conjunction application (appID=2) run by the receiving device 20.

The TPT of FIG. 11 is described in the above-described manner.

(Detailed Specification 2 of TPT)

The specification of the TPT explained with reference to FIG. 11 and FIG. 12 is one example and another specification can be employed. FIG. 13 is a diagram showing another example of the detailed specification of the TPT.

The tpt element in FIG. 13 is different from the tpt element in FIG. 11 in that the previousApp attribute of the event element is not included. However, the other elements and attributes have the same configuration. The tpt element in FIG. 13 is different also in that any of "execute," "register," "suspend," "suspend-execute," "terminate," "terminate-execute," "hide," and "hide-execute" is specified as the relevant command in the action attribute of the event element.

The execute is a command for ordering acquisition or activation of a conjunction application.

If the specified conjunction application is in a pause, the execute command resumes execution of this conjunction application. If the specified conjunction application is hidden, the execute command makes this conjunction application be displayed.

The register is a command for ordering acquisition or registration of a conjunction application.

The suspend is a command for suspending the running conjunction application to make it pause.

The suspend-execute is a composite command arising from integration of the execute command for the subject conjunction application and the suspend command for another conjunction application. That is, "suspend-execute" is specified in the action attribute in the case of ordering acquisition or activation of the subject conjunction application and a pause of another conjunction application other than it.

The terminate is a command for stopping the running conjunction application.

The terminate-execute is a composite command arising from integration of the execute command for the subject conjunction application and the terminate command for another conjunction application. That is, "terminate-execute" is specified in the action attribute in the case of ordering acquisition or activation of the subject conjunction application and stop of another conjunction application other than it.

The hide is a command for setting the display state of the running conjunction application to the non-displayed state.

The hide-execute is a composite command arising from integration of the execute command for the subject conjunction application and the hide command for another conjunction application. "hide-execute" is specified in the action attribute in the case of ordering acquisition or activation of the subject conjunction application and hiding of another conjunction application other than it.

As above, in the TPT of FIG. 11, the operation of another conjunction application is controlled by adding the previousApp attribute to the command specified by the action attribute. In the TPT of FIG. 13, the operation of another conjunction application is controlled by inclusion of a command for controlling the operation of another conjunction application in the command specified by the action attribute.

(Description Example 2 of TPT)

FIG. 14 is a diagram showing a description example of the TPT of FIG. 13.

In the TPT of FIG. 14, six event elements are described in the tpt element similarly to the description of the TPT of FIG. 12. Among these event elements, the event elements of eventID=1, 2, 3, 5, and 15 are the same as those in the description of the TPT of FIG. 12 and therefore description thereof is omitted.

The event element of eventID=12 indicates that the relevant command is the suspend-execute command for the receiving device 20 executed when the time timed by the internal clock becomes 2400 seconds. In the application element between the start tag and end tag of the event element, "2" is specified as the appid attribute, "html" is specified as the appType attribute, "xxx.com/yyy2" is specified as the url attribute, and "2011-01-22" is specified as the expireDate attribute.

Specifically, this means that the subject conjunction application (appID=2) can be acquired from the application server 40 specified by the URL of "xxx.com/yyy2" in response to the suspend-execute command. Another conjunction application that is already running is suspended to pause in response to this command.

The TPT of FIG. 13 is described in the above-described manner.

The description method of the TPT is arbitrary and is not limited to the description examples of FIG. 12 and FIG. 14.

Correspondence Relationship Between Trigger Information and Command

Next, an example of processing of identifying the command associated with the trigger information by the TPT will be described. FIG. 15 is a diagram showing an example of the correspondence relationship between the trigger information and the command. The TPT in FIG. 15 corresponds to the above-described TPT of FIG. 11 or FIG. 13.

As shown in FIG. 15, in the receiving device 20, when trigger information is extracted from a video signal obtained from a TS, whether or not to acquire a TPT from the TPT server 30 is determined based on domain_name and segment_id included in the trigger information.

For example, if a TPT (for Segment A) for Segment A (segment_id="SegA") broadcast by an xbc broadcast station (domain_name="xbc.com") is retained in the receiving device 20, when trigger information of "xbc.com/SegB?m=48" is extracted from the TS, the receiving device 20 determines to acquire a TPT because the value of segment_id has changed.

Then, the receiving device 20 accesses the TPT server 30 specified by the URL ("http://xbc.com/SegB?m=48") obtained by adding "http://" to the beginning of the trigger information and acquires the TPT. Thereby, the TPT (for Segment B) in the diagram is retained in the receiving device 20.

However, although the TPT in FIG. 15 corresponds to the above-described TPT of FIG. 11 or FIG. 13, here only the eventID attribute, the startTime attribute, the endTime attribute, and the action attribute of the event element, the appID attribute of the application element, and parameters such as the URL are shown for simplification of explanation.

In the receiving device 20, the internal clock is set by media_time (m=XX) included in the trigger information. For example, if the first trigger information ("xbc.com/SegB?m=48") is extracted, the internal clock is set to 48 based on media_time (m=48). Thereafter, the internal clock ticks the time in units of seconds. However, if the second trigger information ("xbc.com/SegB?m=1327") is extracted, the internal clock is calibrated to 1327 based on media_time (m=1327). In this manner, such an internal clock as to accurately correspond with the time indicated by media_time included in the trigger information is held in the receiving device 20. The receiving device 20 sequentially executes the respective commands described in the TPT based on this internal clock. In the example of FIG. 15, the internal clock has passed through the valid start time in the valid period of 0 to 1274 and thus the register command (eventID=1) is specified by the TPT. Then, the receiving device 20 acquires and registers the conjunction application whose application ID is "1" in response to the register command.

In the receiving device 20, the execute command (eventID=2) is specified by the TPT when the internal clock indicates 1275. Then, the receiving device 20 activates the conjunction application that has been acquired in response to the execute command.

From then on, although not shown in FIG. 15, in the receiving device 20, the operation of the conjunction application is controlled in response to the corresponding command at the time of the first reaching to the valid period of the command described in the TPT based on the internal clock set and calibrated by media_time included in the extracted trigger information.

For example, the execute command (eventID=3) is specified when the internal clock becomes 4602. The streamEvent element is described in this execute command and thus the command is the execute-with-event command. Therefore, an event for the running conjunction application (appID=1) is fired in the receiving device 20. For example, when the internal clock becomes 8900, the terminate command (eventID=4) is specified and the running conjunction application (appID=1) is stopped.

As described above, in the receiving device 20, a command is identified at the time of the first reaching to the valid period of the command described in a TPT by the internal clock operating based on media_time when trigger information is extracted from a broadcast signal and the operation of a conjunction application is controlled in response to the identified command.

State Transition of Conjunction Application

Figure 16:
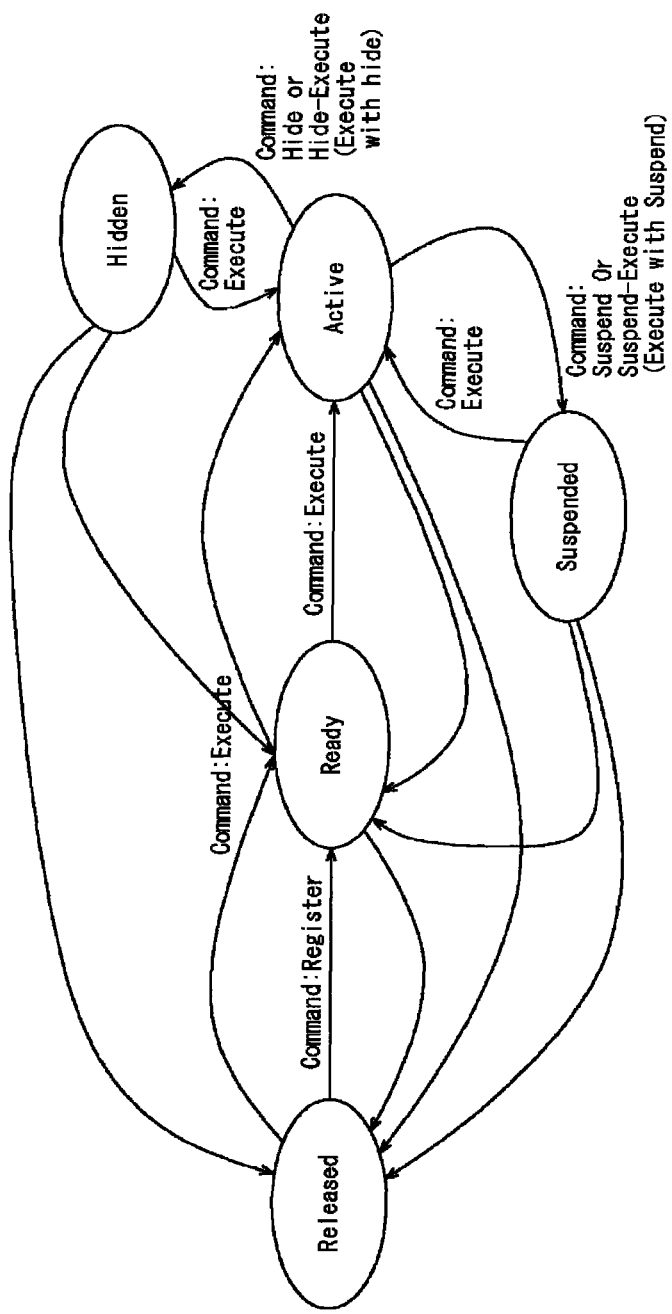
FIG. 16 is a diagram showing state transition of a conjunction application.

FIG. 16 is a state transition diagram of a conjunction application that operates in the receiving device 20 in response to the respective commands of register, execute, suspend, hide, and terminate. As shown in FIG. 16, it is defined that the state of the conjunction application has transitioned to any of five kinds of states, i.e. released state (Released), ready state (Ready), running state (Active), pause state (Suspended), or hidden state (Hidden).

The released state refers to the state in which the conjunction application has not yet been acquired into the receiving device 20. The ready state refers to the state in which the conjunction application has been registered into the receiving device 20 and is not activated. The running state refers to the state in which the conjunction application is activated and running. The pause state refers to the state in which the execution of the conjunction application is suspended and information indicating the state of the suspension timing is retained in the save memory 228B. The hidden state refers to the state in which data relating to the conjunction application is retained in the work memory 228A and the display state is the non-displayed state.

When the conjunction application has transitioned to the released state (has not yet been acquired into the receiving device 20), transition to the ready state occurs if the register command is specified and this conjunction application is acquired (registered) in response to the register command.

When the conjunction application is in the ready state, transition to the running state occurs if the execute command is specified and this conjunction application is activated in response to the execute command.

When the conjunction application has transitioned to the released state (has not yet been acquired into the receiving device 20), transition to the running state occurs if the execute command is specified and this conjunction application is acquired and activated in response to the execute command.

When the conjunction application has transitioned to the running state, transition to the pause state occurs if the suspend command is specified and the running conjunction application is suspended in response to the suspend command.

If there is running another conjunction application, transition to the pause state occurs when the suspend-execute command is specified and another conjunction application is suspended. Similarly, if the execute-with-suspend command is specified, another conjunction application is suspended to transition to the pause state.

When the conjunction application has transitioned to the pause state, transition to the running state occurs if the execute command is specified and the suspended conjunction application is resumed in response to the execute command.

When the conjunction application has transitioned to the running state, transition to the hidden state occurs if the hide command is specified and the display state of the running conjunction application becomes the non-displayed state in response to the hide command.

If there is running another conjunction application, transition to the hidden state occurs if the hide-execute command is specified and the display state of another conjunction application becomes the non-displayed state. Similarly, if the execute-with-hide command is specified, another conjunction application is hidden to transition to the hidden state.

When the conjunction application has transitioned to the hidden state, transition to the running state occurs if the execute command is specified and the hidden conjunction application is displayed in response to the execute command.

When the conjunction application has transitioned to the running state, the pause state, or the hidden state, transition to the ready state occurs if the terminate command is specified and the running conjunction application is stopped in response to the terminate command.

When the conjunction application has transitioned to the ready state, the running state, the pause state, or the hidden state, transition to the released state occurs when the expiration date of the conjunction application passes.

Figure 17:
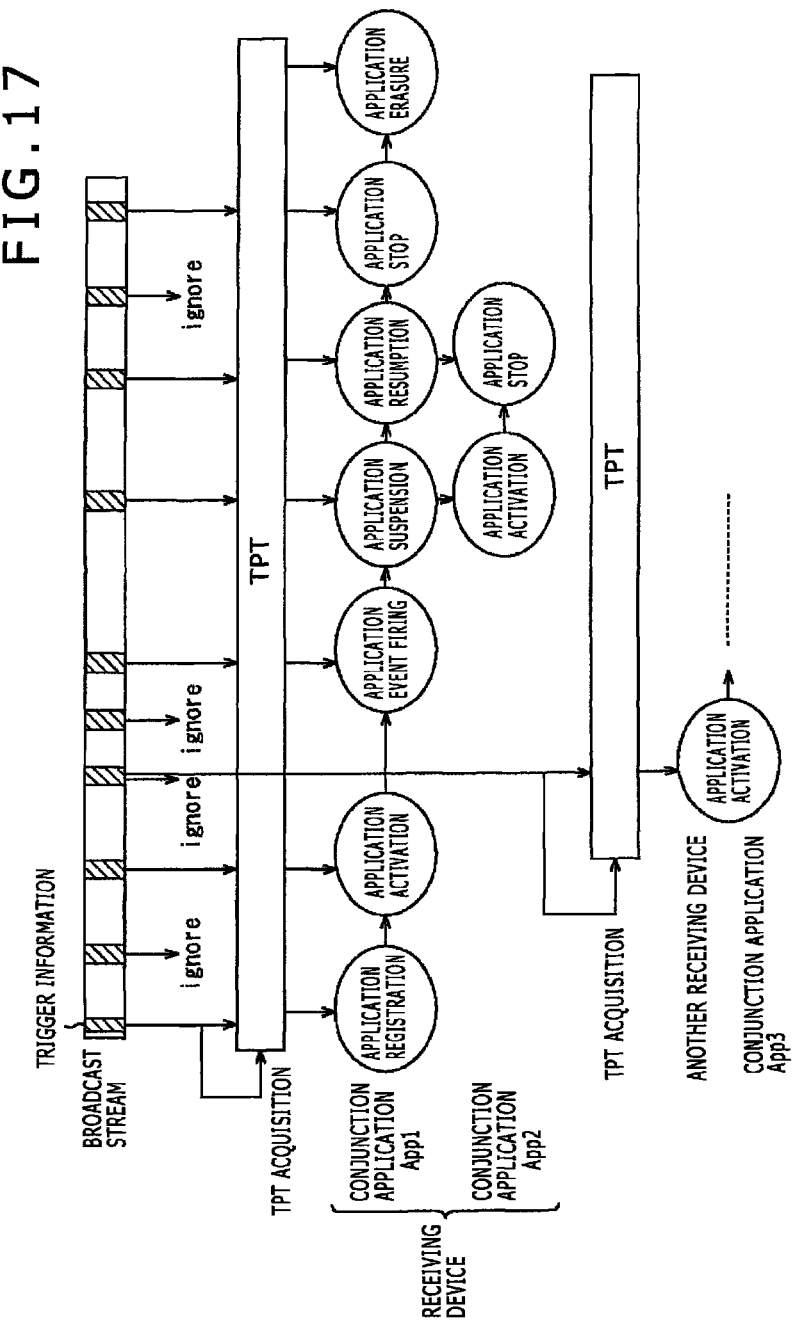
FIG. 17 is a diagram showing a relationship between respective commands and the state transition.

FIG. 17 shows the relationship between the respective commands and the state transition.

FIG. 17 schematically shows the flow of operation of identifying the command corresponding to the trigger information that is so transmitted as to be included in the broadcast signal of broadcast content by the TPT and controlling the operation of the conjunction application in response to the identified command in the receiving device 20.

In the receiving device 20 of FIG. 17, two conjunction applications with different application IDs are run. Therefore, they will be distinguished by calling them a conjunction application App1 and a conjunction application App2. A conjunction application run by another device such as an external device connected to the receiving device 20 will be called a conjunction application App3. The receiving device 20 does not respond to all extracted pieces of trigger information and ignores the trigger information that has been already handled ("ignore" in the diagram).

In the receiving device 20, when the conjunction application App1 has transitioned to the released state (has not yet been acquired into the receiving device 20), the conjunction application App1 transitions to the ready state if the conjunction application App1 is acquired to be retained and registered in response to the register command.

In the receiving device 20, when the conjunction application App1 is in the ready state, the conjunction application App1 transitions to the running state if the conjunction application App1 is activated in response to the execute command.

In another device, when the conjunction application App3 has transitioned to the released state (has not yet been acquired into another receiving device), the conjunction application App3 transitions to the running state if the conjunction application App3 is acquired and activated in response to the execute command.

In the receiving device 20, when the conjunction application App1 has transitioned to the running state, the state of the conjunction application App1 remains the running state if an event is fired in the running conjunction application App1 in response to the execute-with-event command.

In the receiving device 20, when the conjunction application App1 has transitioned to the running state, the conjunction application App1 transitions to the pause state if the running conjunction application App1 is suspended in response to the suspend-execute command or the execute-with-suspend command. In the receiving device 20, if a conjunction application App2 different from the conjunction application App1 that has transitioned to the pause state is activated, the conjunction application App2 transitions to the running state.

Specifically, for example, supposing the case in which a CM is inserted in the middle of a television show, the conjunction application App2 for the CM is run when the conjunction application App1 for the television show is suspended.

Then, in the receiving device 20, when the conjunction application App1 has transitioned to the pause state, the conjunction application App1 transitions to the running state if the suspended conjunction application App1 is resumed in response to the terminate-execute command or the execute-with-terminate command. In the receiving device 20, when the conjunction application App2 has transitioned to the running state, the conjunction application App2 transitions to the ready state if the running conjunction application App2 is stopped in response to this command.

Specifically, for example, supposing the above-described CM insertion case again, the television show is resumed when the CM inserted in the middle of the television show ends. In association with this, the conjunction application App2 for the CM is stopped and the suspended conjunction application App1 for the television show is resumed.

In the receiving device 20, when the conjunction application App1 has transitioned to the running state, the conjunction application App1 transitions to the ready state if the running conjunction application App1 is stopped in response to the terminate command.

When the conjunction application App1 has transitioned to the ready state, the running state, the pause state, or the hidden state, if the expiration date of this conjunction application passes, this conjunction application is erased from the cache memory 227 and the registration is deleted, so that the conjunction application App1 transitions to the released state.

The state transition of the conjunction application is explained above.

Operation Scenario

Figure 18:
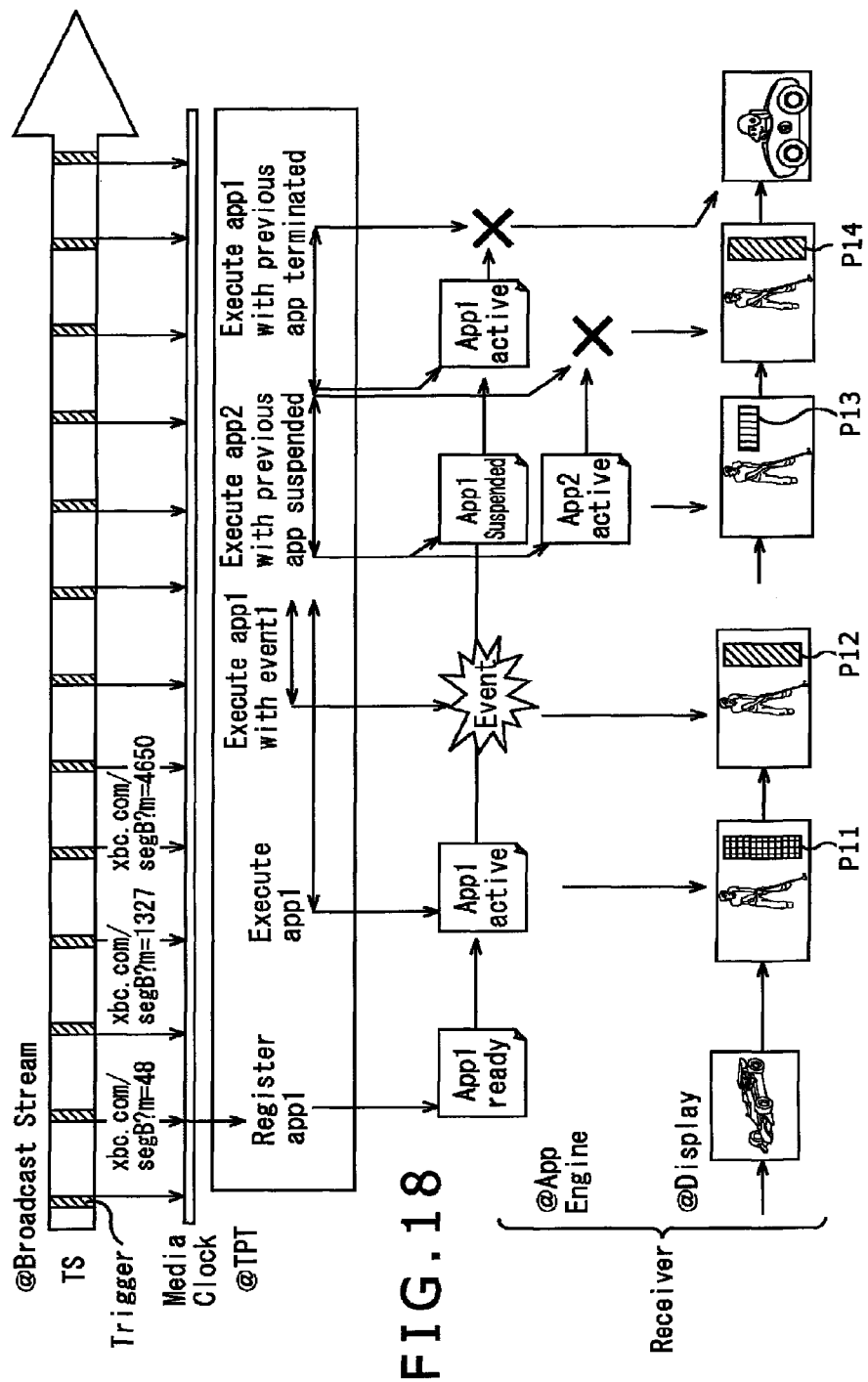
FIG. 18 is a diagram showing an example of an operation scenario 1.
Figure 19:
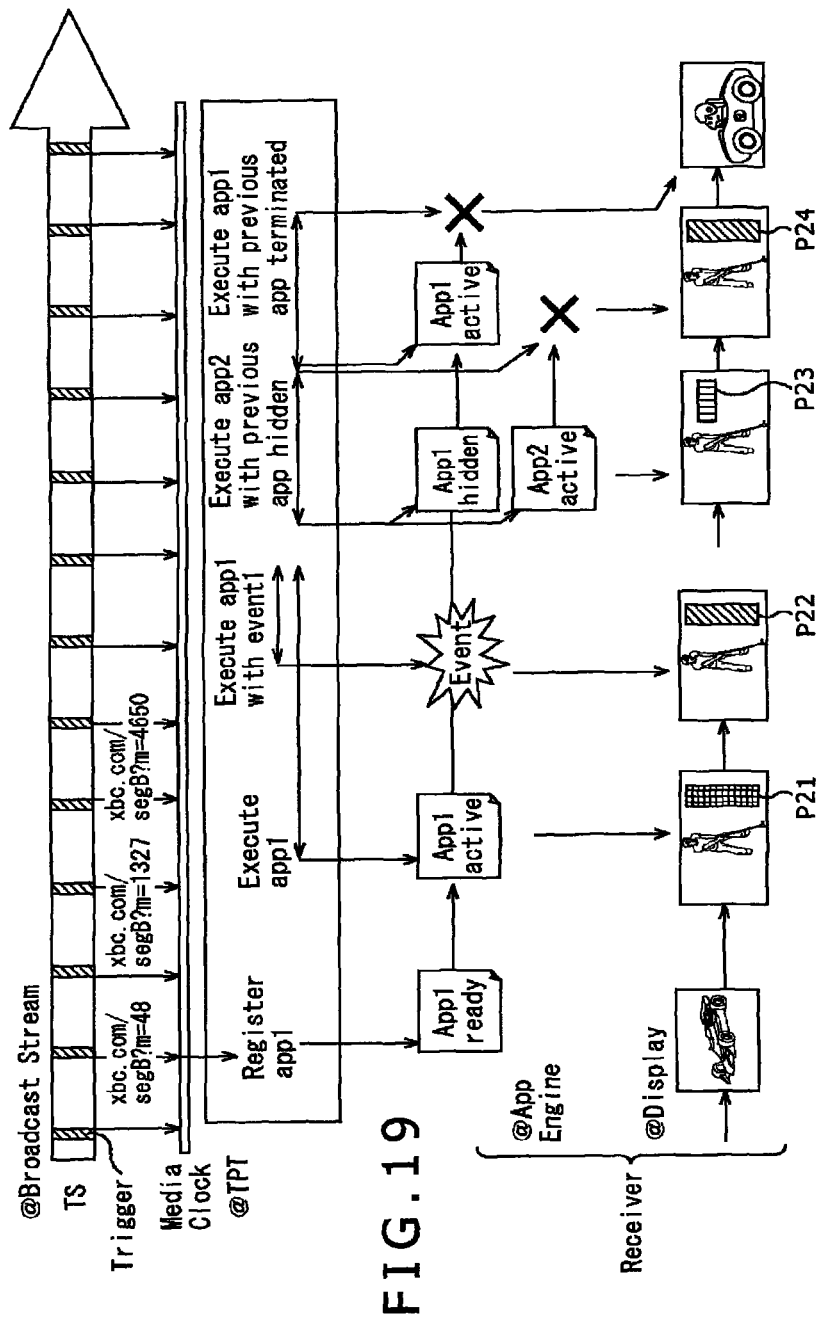
FIG. 19 is a diagram showing an example of an operation scenario 2.

In the receiving device 20, by identifying the command corresponding to the time indicated by the internal clock by the TPT and executing the identified command as described above, an operation of a conjunction application like those shown in FIG. 18 and FIG. 19 is enabled for example.
(Operation Scenario 1)

FIG. 18 is a diagram showing operation scenario 1.

In operation scenario 1, when the time indicated by the internal clock ("Media Clock" in the diagram) operating based on media_time included in trigger information first reaches the valid period of the command defined by the startTime attribute and the endTime attribute of the event element of a TPT, the command corresponding to this valid period is identified and a conjunction application operates. Thereby, a predetermined operation is carried out.

In FIG. 18, the receiving device 20 continuously extracts trigger information when it is displaying broadcast content corresponding to a broadcast signal from the transmitting device 10 on the display 219. Then, the receiving device 20 inquires a TPT of the TPT server 30 when domain_name, segment_id included in the trigger information change. Thereby, the receiving device 20 can acquire a TPT from the TPT server 30 and retain it.

Thereafter, in the receiving device 20, trigger information is continuously extracted and the internal clock set and calibrated by media_time included in the extracted trigger information operates. At the timing of the first reaching of the time timed by this internal clock to the valid period of a command described in a TPT, the receiving device 20 executes the corresponding command.

For example, in the case in which the receiving device 20 retains the TPT (for Segment B) in FIG. 15 as a TPT, if trigger information of "xbc.com/SegB?m=48" is extracted, the receiving device 20 sets media_time (m=48) in the internal clock. Because this internal clock has passed through the valid start time in the valid period of 0 to 1274, the receiving device 20 specifies the register command of the conjunction application App1, whose application ID is "1." Then, the receiving device 20 acquires the conjunction application App1 from the application server 40 and registers it in response to the register command. Thereby, the conjunction application App1 transitions to the ready state.

When the internal clock indicates 1275, the receiving device 20 specifies the execute command of the conjunction application App1. The receiving device 20 activates the conjunction application App1 in response to the execute command. Thereby, the conjunction application App1 transitions to the running state. As a result, video obtained by superimposing video P11 of the conjunction application App1 on the video of the broadcast content is displayed on the display 219.

When the internal clock indicates 4602, the receiving device 20 specifies the execute-with-event command of the conjunction application App1. The receiving device 20 fires an event for the running conjunction application App1 in response to the execute-with-event command. Thereby, for example, predetermined processing such as reading updated data and reflecting it in the displaying is executed. In the displaying on the display 219, the video P11 of the conjunction application App1, which is so displayed as to be superimposed on the video of the broadcast content, is switched to video P12.

When the execute-with-suspend command (or suspend-execute command) is specified in the case in which the internal clock first reaches a predetermined valid period, the receiving device 20 makes the conjunction application App1 pause in response to this command. The receiving device 20 activates the conjunction application App2 in response to the additional information of this command. Thereby, the conjunction application App1 transitions to the pause state whereas the conjunction application App2 transitions to the running state.

When the execute-with-terminate command (or terminate-execute command) is specified in the case in which the time indicated by the internal clock first reaches a predetermined valid period, the receiving device 20 stops the conjunction application App2 in response to the additional information of this command. The receiving device 20 resumes the conjunction application App1 in the pause in response to this command. Thereby, the conjunction application App1 transitions to the running state whereas the conjunction application App2 transitions to the ready state.

Here, for example, supposing the case in which a television show is suspended to insert a CM and the television show is resumed after the end of this CM, it can be deemed that the conjunction application App1 is the application for the television show and the conjunction application App2 is the application for the CM. That is, the conjunction application App1 transitions to the pause state to pause when the television show is suspended, and the conjunction application App2 transitions to the running state to be activated when the CM is started. The conjunction application App2 transitions to the ready state to be stopped when the CM ends, and the conjunction application App1 transitions to the running state to be resumed when the television show is resumed.

Thereby, simultaneously with the switch from the television show to the CM, in the displaying on the display 219, a switch is made from the video P12 of the conjunction application App1, which is so displayed as to be superimposed on the video of the television show, to video P13 of the conjunction application App2, which is so displayed as to be superimposed on the video of the CM. When a switch is made from the CM to the television show, the displaying on the display 219 is switched from the video P13 of the conjunction application App2 to video P14 of the conjunction application App1.

When the terminate command of the conjunction application App1 is specified in the case in which the time indicated by the internal clock first reaches a predetermined valid period, the receiving device 20 stops the conjunction application App1 in response to this command. Thereby, the conjunction application App1 transitions to the ready state. As a result, for example, when the certain television show ends and another television show is started, the video P14 of the conjunction application App1 is also stopped.

As described above, the receiving device 20 retains the TPT depending on domain_name and segment_id included in trigger information from the transmitting device 10. Thereby, if the time indicated by the internal clock timed based on media_time included in the trigger information first reaches a predetermined valid period, the receiving device 20 can identify the command corresponding to this valid period. Therefore, operation scenario 1 shown in FIG. 18 can be realized.

(Operation Scenario 2)

FIG. 19 is a diagram showing an example of operation scenario 2.

In operation scenario 2, similarly to the above-described operation scenario 1, if the time indicated by the internal clock operating based on media_time included in trigger information first reaches the valid period of a command, the command corresponding to this valid period is identified and a conjunction application operates. Thereby, a predetermined operation is carried out. Due to this, the register command, the execute command, and the execute-withevent command for the conjunction application App1 are sequentially specified, and the operation of the conjunction application App1 is controlled in response to these commands.

The receiving device 20 continuously extracts trigger information and the internal clock set and calibrated by media_time included in the extracted trigger information operates. When the execute-with-hide command (or hide-execute command) is specified in the case in which the time indicated by this internal clock first reaches a predetermined valid period, the receiving device 20 sets the display state of the conjunction application App1 to the non-displayed state in response to this command. The receiving device 20 activates the conjunction application App2 in response to this command. Thereby, the conjunction application App1 transitions to the hidden state whereas the conjunction application App2 transitions to the running state.

When the execute-with-terminate command (or terminate-execute command) is specified in the case in which the time indicated by the internal clock first reaches a predetermined valid period, the receiving device 20 stops the conjunction application App2 in response to this command. The receiving device 20 displays the hidden conjunction application App1 which is in the non-displayed state, in response to this command. Thereby, the conjunction application App1 transitions to the running state whereas the conjunction application App2 transitions to the ready state.

Here, similarly to the above-described operation scenario 1 of FIG. 18, description will be made by using the example of the conjunction application App1 for a television show and the conjunction application App2 for a CM. The conjunction application App1 transitions to the hidden state to be hidden when the television show is suspended and the conjunction application App2 transitions to the running state to be activated when the CM is started. The conjunction application App2 transitions to the ready state to be stopped when the CM ends and the conjunction application App1 transitions to the running state to be displayed when the television show is resumed.

Due to this, the displaying on the display 219 is switched from video P22 of the conjunction application App1 to video P23 of the conjunction application App2 when a switch is made from the television show to the CM. In response to a switch from the CM to the television show, a switch is made from the video P23 of the conjunction application App2 to video P24 of the conjunction application App1.

Thereafter, in the receiving device 20, the conjunction application App1 is stopped when the terminate command of the conjunction application App1 is specified. Thereby, the conjunction application App1 transitions to the ready state. As a result, for example, when the certain television show ends and another television show is started, the video P24 of the conjunction application App1 is also stopped.

The operation scenarios are explained above.

Another Example of Method for Identifying Command

In the above description, the following is explained. Specifically, based on the internal clock that is set and calibrated to the time indicated by media_time included in trigger information and operates in the receiving device 20, in the case of the first reaching to the valid period defined by the startTime attribute and the endTime attribute of the event element of a TPT, the command corresponding to this valid period is identified. However, the command can also be identified by a method other than it. Specifically, for example, also by sending trigger information in which event_id or event_time is included instead of media_time, the command associated with this trigger information can be identified by a TPT.

Figure 20:
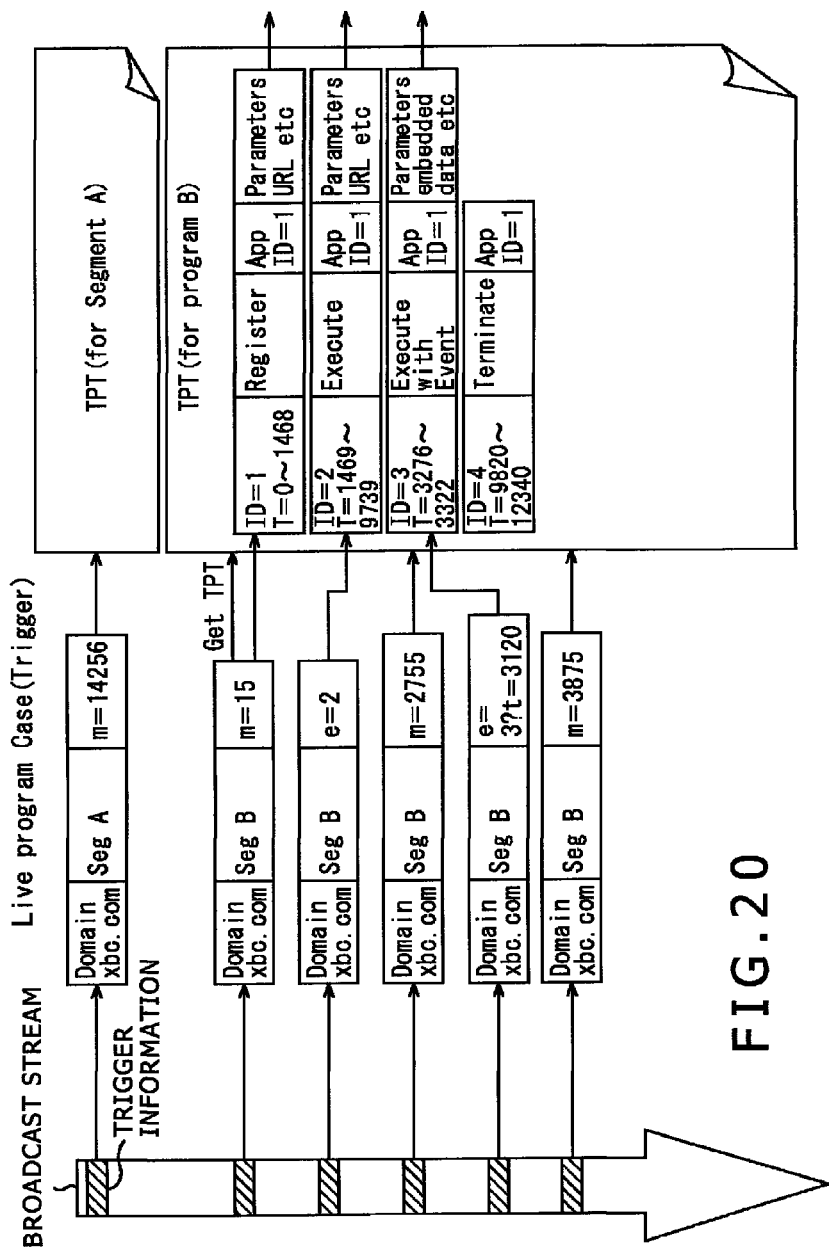
FIG. 20 is a diagram showing an example of the correspondence relationship between the trigger information and the command.

FIG. 20 is a diagram showing an example of the correspondence relationship between the trigger information and the command. The TPT in FIG. 20 corresponds to the TPT of FIG. 11 or FIG. 13 similarly to the TPT in FIG. 15. Specifically, in the receiving device 20, segment_id included in the trigger information changes from "SegA" to "SegB" after the TPT for Segment A is retained, and thus the TPT for Segment B is acquired and retained.

In the receiving device 20, the internal clock in which media_time (m=15) included in the first trigger information ("xbc.com/SegB?m=15") is set starts to operate. In addition, the time thereof falls within the valid period of 0 to 1468. Thus, the register command (eventID=1) is specified by the TPT. The receiving device 20 acquires the conjunction application whose application ID is "1" and registers it in response to the register command.

Subsequently, in the receiving device 20, by event_id (e=2) included in the second trigger information ("xbc.com/SegB?e=2"), the execute command having eventID of the same value (eventID=2) in the TPT is specified. The receiving device 20 activates the conjunction application that has been acquired in response to the execute command.

In the receiving device 20, media_time (m=2755) included in the third trigger information ("xbc.com/SegB?m=2755") is used for calibration of the internal clock.

Subsequently, in the receiving device 20, by event_id (e=3) included in the fourth trigger information ("xbc.com/SegB?e=3?t=3120"), the execute-with-event command having eventID of the same value (eventID=3) in the TPT is specified. Although the valid period of this eventID is 3276 to 3322, it is changed to event_time (t=3120) included in the trigger information. That is, when the time indicated by the internal clock becomes event_time (t=3120), the receiving device 20 fires an event for the running conjunction application (appID=1) in response to the execute-with-event command.

In the receiving device 20, media_time (m=3875) included in the fifth trigger information ("xbc.com/SegB?m=3875") is used for calibration of the internal clock.

Thereafter, as shown in FIG. 20, for example, in the receiving device 20, the terminate command (eventID=4) is specified when the time indicated by the internal clock becomes 9820, and the running conjunction application (appID=1) is stopped.

As described above, in the receiving device 20, if trigger information is extracted from a broadcast signal, the internal clock is set and calibrated by media_time included in the extracted trigger information or the command corresponding to event_id is identified based on the retained TPT. The operation of the conjunction application is controlled due to the first reaching of the time indicated by the internal clock to the valid period or in response to the command identified by event_id.

In the command identifying method shown in FIG. 20, the command is identified by event_id irrespective of the valid period of the command. The time when this command is executed can be changed by event_time. Thus, when the broadcast content is on live broadcast, the business operator such as the broadcaster can execute the command (e.g. execute-with-event command) at desired timing.

Contents of Specific Processing Executed in Respective Devices

Next, with reference to flowcharts of FIG. 21 to FIG. 28, the contents of specific processing executed in the respective devices configuring the broadcast-communication cooperative system 1 of FIG. 1 will be described.

(Transmission Processing)

Figure 21:
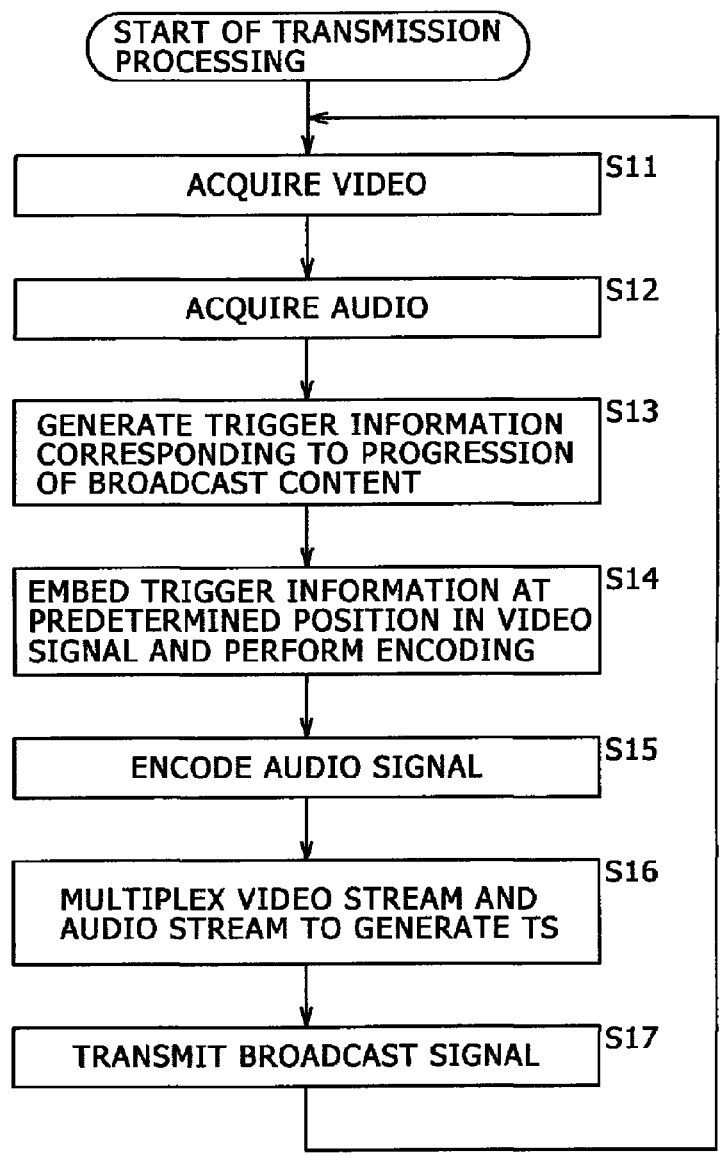
FIG. 21 is a flowchart explaining transmission processing.

First, with reference to the flowchart of FIG. 21, transmission processing executed by the transmitting device 10 will be described.

In a step S11, the video acquirer 111 acquires a video signal corresponding to video of broadcast content from an external server or so forth. In a step S12, the audio acquirer 114 acquires an audio signal corresponding to audio of the broadcast content from the external server or so forth.

In a step S13, the trigger information generator 112 generates trigger information in association with the progression of the video of the broadcast content corresponding to the video signal acquired by the video acquirer 111.

In a step S14, the video encoder 113 embeds the trigger information generated by the trigger information generator 112 at a predetermined position in the video signal acquired by the video acquirer 111 and performs encoding.

In a step S15, the audio encoder 115 encodes the audio signal acquired by the audio acquirer 114.

In a step S16, the multiplexer 116 multiplexes a video stream encoded by the video encoder 113 and an audio stream encoded by the audio encoder 115 to generate a TS.

In a step S17, the transmitter 117 transmits the TS generated by the multiplexer 116 as a broadcast signal by the antenna 118.

The transmission processing is explained above. In the transmission processing of FIG. 21, a case in which the trigger information is embedded in the video signal is explained as one example for simplification of explanation.

(Reception Processing)

Figure 22:
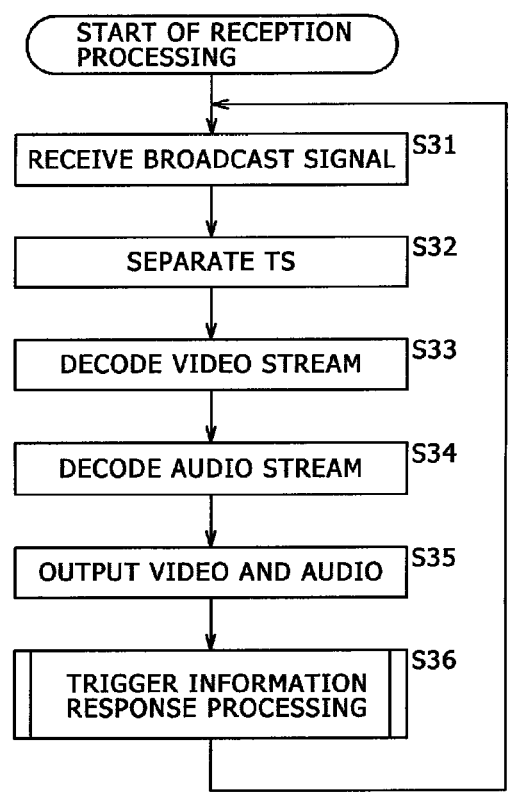
FIG. 22 is a flowchart explaining reception processing.

Next, with reference to the flowchart of FIG. 22, reception processing executed by the receiving device 20 will be described.

In a step S31, the tuner 212 receives a broadcast signal via the antenna 211 and demodulates it.

In a step S32, the demultiplexer 213 separates the TS demodulated by the tuner 212 into an audio stream and a video stream.

In a step S33, the video decoder 217 decodes the video stream separated by the demultiplexer 213 to generate a video signal.

In a step S34, the audio decoder 214 decodes the audio stream separated by the demultiplexer 213 to generate an audio signal.

In a step S35, the display 219 displays video corresponding to the video signal and the speaker 216 outputs audio corresponding to the audio signal. Thereby, video of broadcast content such as a television show is displayed on the display 219 and audio corresponding to the video is output from the speaker 216.

In a step S36, trigger information response processing is executed by the components from the trigger information extractor 220 to the application memory 228. Details of the trigger information response processing will be described later with reference to the flowcharts of FIG. 23 to FIG. 27.

Upon the end of the processing of the step S36, the processing returns to the step S31 and this and subsequent processing is repeated.

The reception processing is explained above.

(Trigger Information Response Processing)

Next, with reference to the flowchart of FIG. 23, the trigger information response processing corresponding to the step S36 in FIG. 22 will be described.

In a step S51, the trigger information extractor 220 determines whether or not trigger information is extracted from the video signal from the video decoder 217. If the trigger information included in the broadcast signal is received by the receiving device 20 and the trigger information is extracted from the video signal, the processing is forwarded to a step S52.

In the step S52, the trigger information extractor 220 acquires the trigger information extracted from the broadcast signal. If media_time is included in the trigger information, the control section 221 makes the internal clock operate depending on this media_time.

If it is determined in the step S51 that the trigger information is not extracted, the processing is forwarded to a step S60. In the step S60, the control section 221 determines whether or not a command having the valid period in which the time (media_time) indicated by the internal clock falls exists. If it is determined in the step S60 that the relevant command exists, the processing is forwarded to a step S59.

In a step S53, the control section 221 analyzes the trigger information acquired by the trigger information extractor 220 and determines whether or not either one or both of domain_name and segment_id included in this trigger information have changed. If it is determined in the step S53 that domain_name and segment_id have changed, the processing is forwarded to a step S54.

In the step S54, the TPT analyzer 225 acquires a TPT provided from the TPT server 30.

Specifically, the control section 221 controls the communication I/F 224 to access the TPT server 30 identified by the URL (e.g. http://xbc.com/SegB?m=48) obtained by adding "http://" to the beginning of the trigger information and request a TPT. The TPT server 30 manages the TPT of each piece of broadcast content and specifies the TPT for broadcast content identified by segment_id and so forth included in a request for the TPT from the receiving device 20 to provide the specified TPT to the receiving device 20.

The communication I/F 224 receives the TPT provided from the TPT server 30 in accordance with control from the control section 221. This allows the TPT analyzer 225 to acquire the TPT received by the communication I/F 224.

In a step S55, the TPT analyzer 225 analyzes the acquired TPT and determines whether or not a TPT with the same id and version has been acquired. It is to be noted that id and version are specified by the id attribute and the tptVersion attribute of the tpt element for example. If it is determined in the step S55 that a TPT with the same id and version has not been acquired, the processing is forwarded to a step S56.

In the step S56, the TPT analyzer 225 retains the acquired TPT, and the processing is forwarded to a step S58.

If it is determined in the step S53 that domain_name and segment_id have not changed, the processing is forwarded to a step S57.

In the step S57, the TPT analyzer 225 determines whether or not the update period indicated by the updatingTime attribute described in the retained TPT has elapsed. If it is determined in the step S57 that the update period has elapsed, the processing is forwarded to the step S54. Then, a new TPT is acquired from the TPT server 30 by the TPT analyzer 225 and is retained if a TPT with the same id and version as those of this new TPT has not been acquired.

If it is determined in the step S55 that a TPT with the same id and version has been acquired or it is determined in the step S57 that the update period has not elapsed, the processing is forwarded to the step S58.

In the step S58, the control section 221 determines whether or not an unexecuted command having the valid period in which the time (media_time) indicated by the internal clock falls exists. If it is determined in the step S58 that an unexecuted command having the valid period in which the time indicated by the internal clock falls exists, the processing is forwarded to the step S59.

In the step S59, the control section 221 controls the application engine 226 to execute conjunction application control processing.

In this conjunction application control processing, a valid command having the valid period in which the time indicated by the internal clock falls is identified. In response to the identified command, acquisition or registration, acquisition or activation, event firing, pause or resumption, hiding or displaying, stop, or so forth of a conjunction application is controlled. Furthermore, if another conjunction application that is already running exists, the operation of another conjunction application is also controlled.

Figure 24:
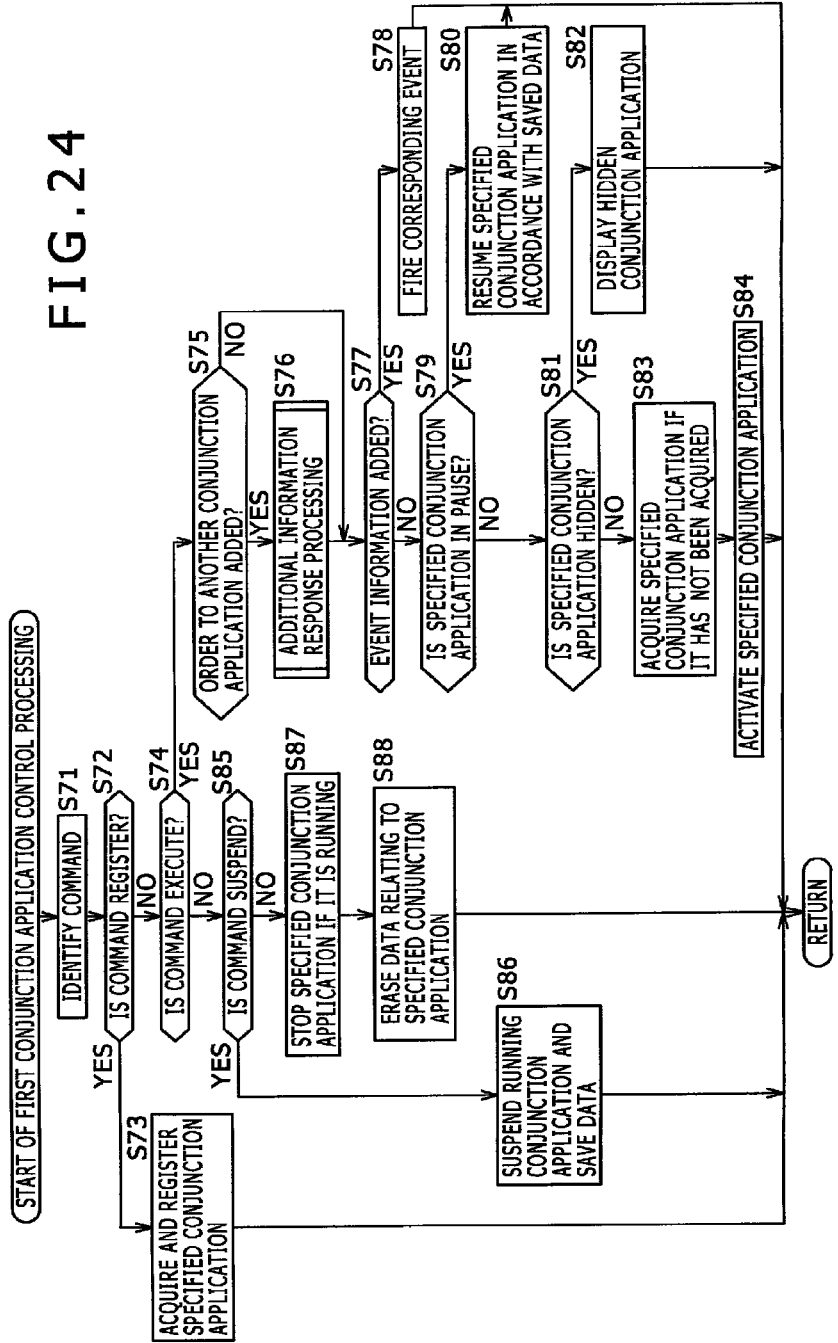
FIG. 24 is a flowchart explaining first conjunction application control processing.
Figure 25:
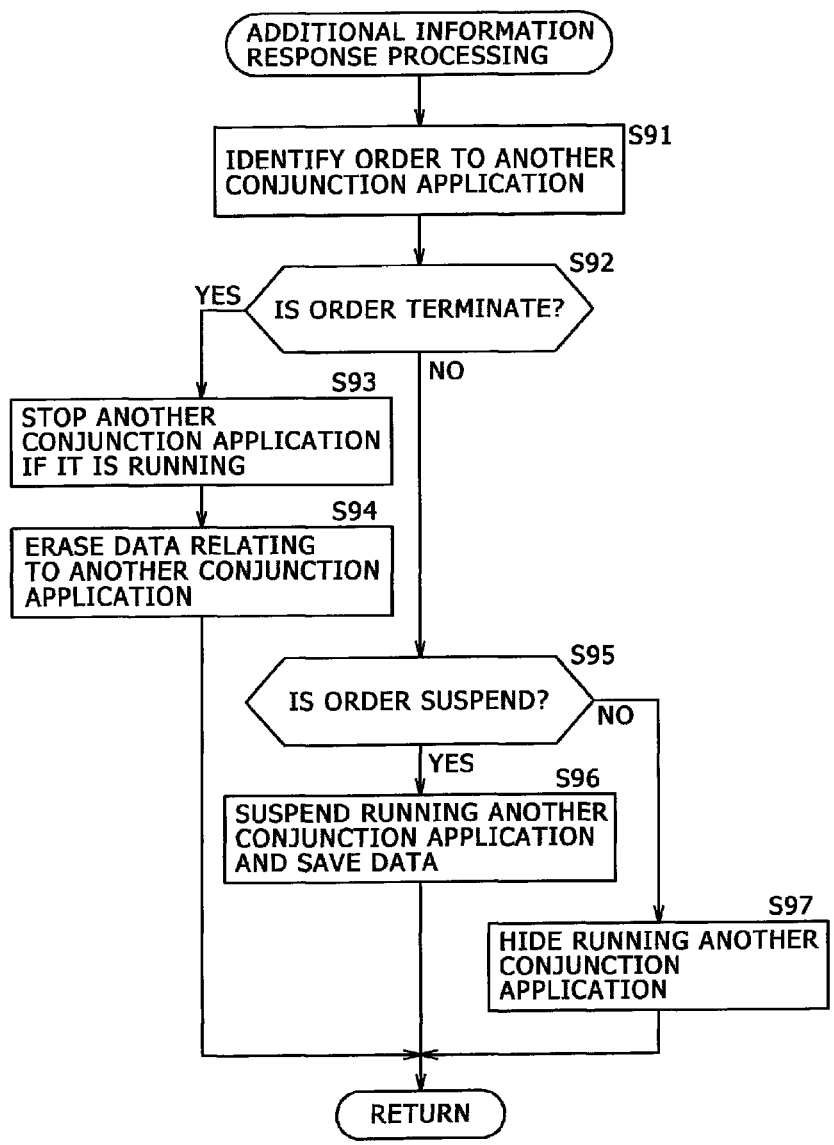
FIG. 25 is a flowchart explaining additional information response processing.
Figure 26:
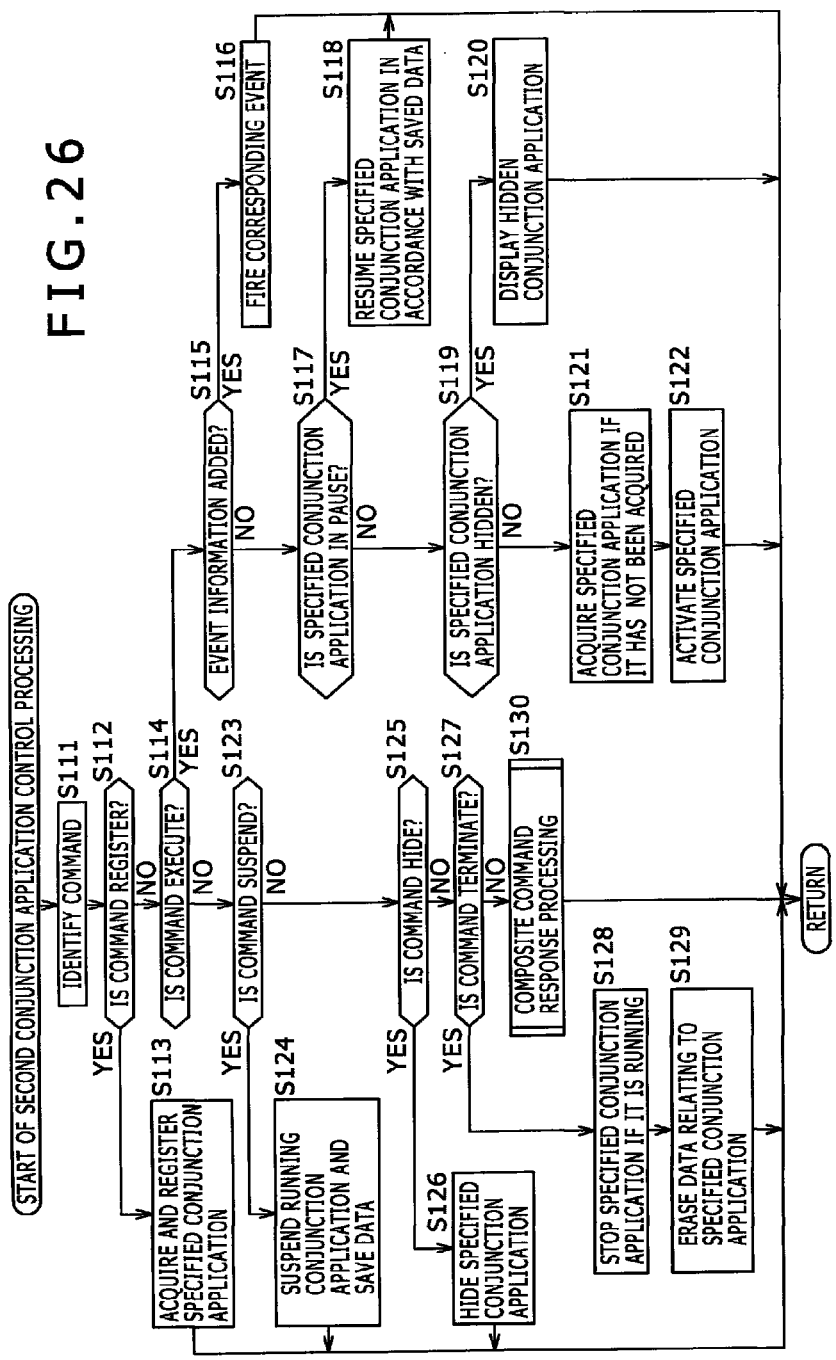
FIG. 26 is a flowchart explaining second conjunction application control processing.

It is to be noted that, as the conjunction application control processing, first conjunction application control processing of FIG. 24 or second conjunction application control processing of FIG. 26 is executed for example. Details of these kinds of processing will be described later with reference to the flowcharts of FIG. 24 to FIG. 27.

If the conjunction application control processing ends or it is determined in the step S58 that a command having the valid period in which media_time falls does not exist, the processing returns to the step S51 and this and subsequent processing is repeated.

The trigger information response processing is explained above.

(First Conjunction Application Control Processing)

Next, with reference to the flowchart of FIG. 24, details of the first conjunction application control processing corresponding to the step S59 in FIG. 23 will be described. It is to be noted that, as the premise in execution of the first conjunction application control processing, the TPT acquired in the step S54 in FIG. 23 has the format of the TPT shown in FIG. 11.

In a step S71, based on the TPT, the control section 221 identifies which of the following commands the valid command having the valid period in which the time indicated by the internal clock falls is: register, execute, terminate, and suspend.

However, here, in identifying the command, the control section 221 compares the value of domain_name and segment_id included in the trigger information extracted by the trigger information extractor 220 with the value of the id attribute of the tpt element in the TPT from the TPT analyzer 225, and executes processing of identifying the command corresponding to the trigger information only when these values correspond with each other. If these values do not correspond with each other, the TPT analyzer 225 accesses the TPT server 30 again and acquires the TPT corresponding to the broadcast content currently selected in accordance with control from the control section 221. Due to this, in the receiving device 20, the supposed command can be surely identified even when the proper TPT is not retained because of radio interference or so forth.

In a step S72, the control section 221 determines whether or not the identification result of the step S71 is the register. If it is determined to be the register, the processing is forwarded to a step S73.

In the step S73, the control section 221 controls the communication I/F 224 to access the application server 40 corresponding to the application URL specified by the TPT and make the specified subject conjunction application be acquired. The subject conjunction application acquired by the communication I/F 224 is retained in the cache memory 227.

In association with the acquired subject conjunction application, the control section 221 stores the expiration date and retention priority of this conjunction application in the memory 222. Due to this, the conjunction application retained in the cache memory 227 is managed by the control section 221 in accordance with the expiration date and the retention priority. Thereafter, the processing returns to the step S59 in FIG. 23, and the subsequent processing is repeated.

If it is determined in the step S72 that the identification result of the step S71 is not the register, the processing is forwarded to a step S74. In the step S74, the control section 221 determines whether or not the identification result of the step S71 is the execute. If it is determined to be the execute, the processing is forwarded to a step S75.

In the step S75, the control section 221 determines whether or not an order to running another conjunction application is added to the identified execute command. Specifically, in this determination processing, it is determined whether or not additional information indicating the terminate, the suspend, or the hide is added to the previousApp attribute of the event element of the tpt element in the TPT.

If it is determined in the step S75 that an order to another conjunction application is added, the processing is forwarded to a step S76. In the step S76, the control section 221 controls the application engine 226 to execute additional information response processing.

In this additional information response processing, stop, pause, or hiding of another conjunction application is controlled depending on the additional information added to the execute command. Details of the additional information response processing will be described later with reference to the flowchart of FIG. 25.

Upon the end of the additional information response processing of the step S76, the processing is forwarded to a step S77. If it is determined in the step S75 that an order to another conjunction application is not added, the step S76 is skipped and the processing is forwarded to the step S77.

In the step S77, the control section 221 determines whether or not event information is added to the identified execute command.

If it is determined in the step S77 that the event information is added, the processing is forwarded to a step S78. In the step S78, the application engine 226 fires the event for the subject conjunction application specified by the application ID in accordance with control from the control section 221.

If it is determined in the step S77 that the event information is not added to the identified execute command, the processing is forwarded to a step S79. In the step S79, the control section 221 controls the application engine 226 to determine whether or not the subject conjunction application specified by the application ID is in a pause (pause state). Specifically, it is determined that the specified subject conjunction application is in a pause if data indicating the pause state of the application is saved in the save memory 228B.

If it is determined in the step S79 that the subject conjunction application is in a pause, the processing is forwarded to a step S80. In the step S80, the application engine 226 moves the data in the save memory 228B to the work memory 228A and activates the specified subject conjunction application in accordance with control from the control section 221. Thereby, the subject conjunction application in a pause is resumed from the pause state.

If it is determined in the step S79 that the subject conjunction application is not in a pause, the processing is forwarded to a step S81. In the step S81, the control section 221 controls the application engine 226 to determine whether or not the subject conjunction application specified by the application ID is hidden (hidden state).

If it is determined in the step S81 that the subject conjunction application is hidden, the processing is forwarded to a step S82. In the step S82, the application engine 226 displays the hidden conjunction application in accordance with control from the control section 221.

If it is determined in the step S81 that the subject conjunction application is not hidden, the processing is forwarded to a step S83. In this case, the command is a normal execute command. Therefore, in the step S83, if the specified subject conjunction application has not been acquired (does not exist in the cache memory 227), the application engine 226 acquires the application in accordance with control from the control section 221.

In a step S84, the application engine 226 activates the specified subject conjunction application in accordance with control from the control section 221.

Figure 23:
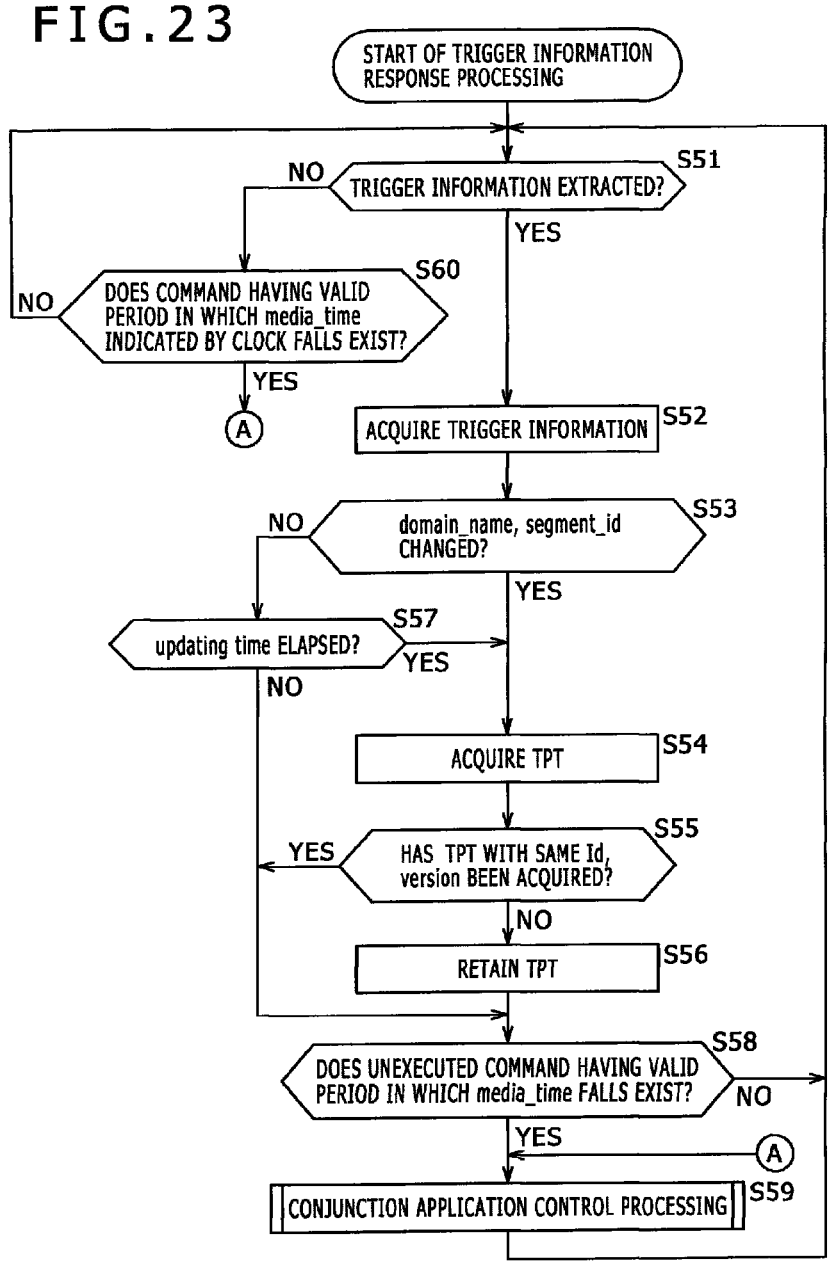
FIG. 23 is a flowchart explaining trigger information response processing.

Upon the end of the processing of the steps S78, S80, S82 and S84, the processing returns to the step S59 in FIG. 23 and the subsequent processing is repeated.

If it is determined in the step S74 that the identification result of the step S71 is not the execute, the processing is forwarded to a step S85. In the step S85, the control section 221 determines whether or not the identification result of the step S71 is the suspend. If it is determined to be the suspend, the processing is forwarded to a step S86.

In the step S86, the application engine 226 saves data indicating the state of the conjunction application that is currently running in the save memory 228B in accordance with control from the control section 221.

If it is determined in the step S85 that the identification result of the step S71 is not the suspend, the identification result of the step S71 is the terminate. Therefore, the processing is forwarded to a step S87.

In the step S87, if the specified subject conjunction application is running, the application engine 226 stops the application in accordance with control from the control section 221. In a step S88, the application engine 226 erases data relating to the specified subject conjunction application from the work memory 228A and the save memory 228B and erases the conjunction application from the cache memory 227 in accordance with control from the control section 221.

Upon the end of the processing of the steps S86 and S88, the processing returns to the step S59 in FIG. 23 and the subsequent processing is repeated.

The first conjunction application control processing is explained above.

(Additional Information Response Processing)

Next, with reference to the flowchart of FIG. 25, details of the additional information response processing corresponding to the step S76 in FIG. 24 will be described.

In a step S91, the control section 221 analyzes the information added to the execute command identified in the step S71 in FIG. 24 (i.e. value of the previousApp attribute of the event element) and identifies the order to another conjunction application.

In a step S92, the control section 221 determines whether or not the identification result of the step S91 is the terminate. If it is determined to be the terminate, the processing is forwarded to a step S93.

In the step S93, if another conjunction application is running, the application engine 226 stops this application in accordance with control from the control section 221. In a step S94, the application engine 226 erases data relating to another conjunction application from the work memory 228A and the save memory 228B and erases another conjunction application from the cache memory 227 in accordance with control from the control section 221.

If it is determined in the step S92 that the identification result of the step S91 is not the terminate, the processing is forwarded to a step S95. In the step S95, the control section 221 determines whether or not the identification result of the step S91 is the suspend. If it is determined to be the suspend, the processing is forwarded to a step S96.

In the step S96, the application engine 226 suspends another conjunction application that is currently running and saves the data thereof in the save memory 228B in accordance with control from the control section 221.

If it is determined in the step S95 that the identification result of the step S91 is not the suspend, the identification result of the step S91 is the hide. Thus, the processing is forwarded to a step S97.

In the step S97, the application engine 226 sets the display state of another conjunction application that is currently running to the non-displayed state, with data relating to this another conjunction application retained in the work memory 228A, in accordance with control from the control section 221.

Upon the end of the processing of the steps S94, S96 and S97, the processing returns to the step S76 in FIG. 24 and the subsequent processing is repeated.

The additional information response processing is explained above.

As described above, according to the first conjunction application control processing, a conjunction application can be activated in conjunction with e.g. a television show, a CM, etc. and an event can be fired and stopped. A conjunction application can be made to pause with the running state kept and another conjunction application can be run and stopped, and thereafter the conjunction application in the pause can be resumed from the pause state.

Information relating to an order to another conjunction application is added to the execute command. Therefore, in response to this additional information, stop, pause, hiding, or so forth of another conjunction application can be controlled.

(Second Conjunction Application Control Processing)

Next, with reference to the flowchart of FIG. 26, details of the second conjunction application control processing corresponding to the step S59 in FIG. 23 will be described. As the premise in execution of the second conjunction application control processing, the TPT acquired in the step S54 in FIG. 23 has the format of the TPT shown in FIG. 13.

In a step S111, similarly to the step S71 in FIG. 24, any command of register, execute, terminate, suspend, or hide is identified as the valid command by the control section 221.

In steps S112 and S113, similarly to the steps S72 and S73 in FIG. 24, the specified subject conjunction application is acquired and retained in the cache memory 227 if the identification result of the step S111 is the register.

In a step S114, the control section 221 determines whether or not the identification result of the step S111 is the execute. If it is determined to be the execute, the processing is forwarded to a step S115.

In steps S115 and S116, similarly to the steps S77 and S78 in FIG. 24, an event for the specified subject conjunction application is fired if event information is added to the identified execute command.

In steps S117 and S118, similarly to the steps S79 and S80 in FIG. 24, if the specified subject conjunction application is in a pause, the conjunction application in the pause is activated and resumed.

In steps S119 and S120, similarly to the steps S81 and S82 in FIG. 24, if the specified subject conjunction application is hidden, the hidden conjunction application is displayed.

In steps S121 and S122, similarly to the steps S83 and S84 in FIG. 24, if the specified subject conjunction application has not been acquired, this conjunction application is acquired and then activated.

In steps S123 and S124, similarly to the steps S85 and S86 in FIG. 24, the specified subject conjunction application is suspended if the identification result of the step S111 is the suspend.

In a step S125, the control section 221 determines whether or not the identification result of the step S111 is the hide. If it is determined to be the hide, the processing is forwarded to a step S126. In the step S126, the application engine 226 hides the specified subject conjunction application in accordance with control from the control section 221.

In a step S127, the control section 221 determines whether or not the identification result of the step S111 is the terminate. If it is determined to be the terminate, the processing is forwarded to a step S128. In the steps S128 and S129, similarly to the steps S87 and S88 in FIG. 24, if the specified subject conjunction application is running, it is stopped and then data relating to this conjunction application is erased.

If it is determined in the step S127 that the identification result of the step S111 is not the terminate, this command is a composite command. Thus, the processing is forwarded to a step S130. In the step S130, the control section 221 controls the application engine 226 to execute composite command response processing.

In this composite command response processing, not only the operation of the specified subject conjunction application but also the operation of stop, pause, hiding, or so forth of another conjunction application is controlled in response to the composite command. Details of the composite command response processing will be described later with reference to the flowchart of FIG. 27.

Upon the end of the processing of the steps S113, S116, S118, S120, S122, S124, S126, S129 and S130, the processing returns to the step S59 in FIG. 23 and the subsequent processing is repeated.

The second conjunction application control processing is explained above.

(Composite Command Response Processing)

Figure 27:
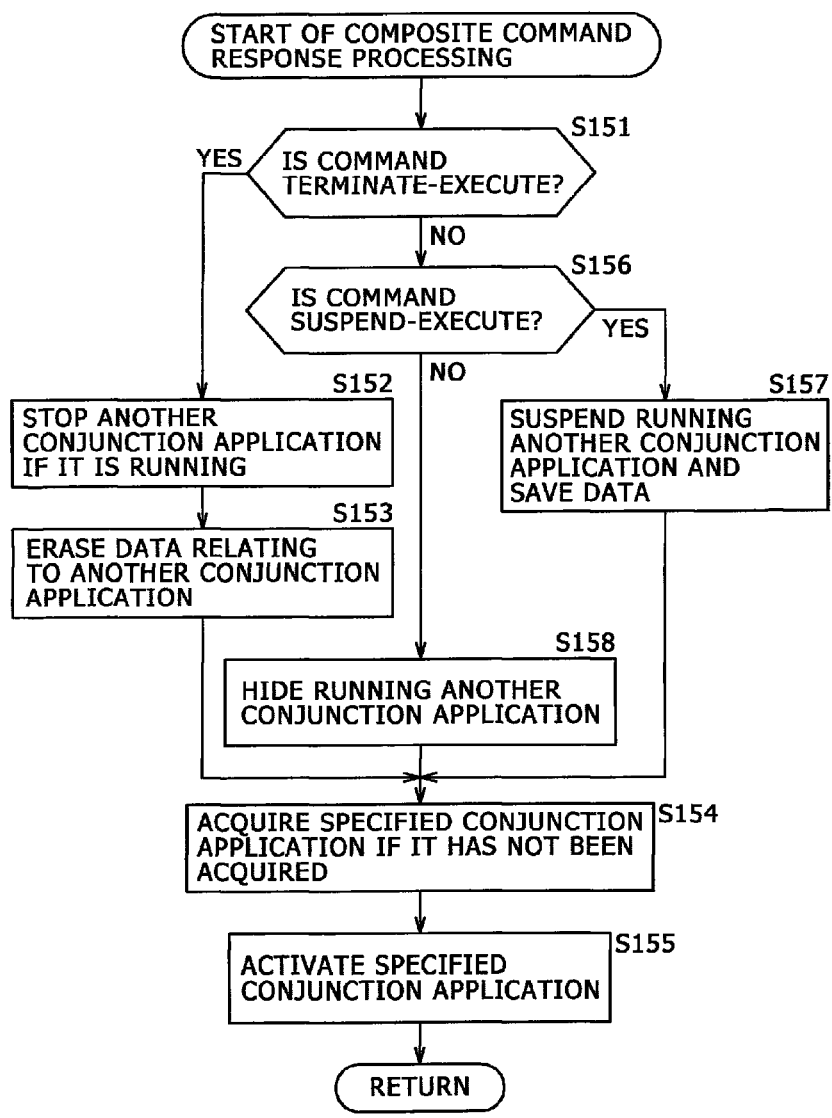
FIG. 27 is a flowchart explaining composite command response processing.

Next, with reference to the flowchart of FIG. 27, details of the composite command response processing corresponding to the step S130 in FIG. 26 will be described.

In a step S151, the control section 221 determines whether or not the identification result of the step S111 is the terminate-execute. If it is determined to be the terminate-execute, the processing is forwarded to a step S152.

In the step S152, if another conjunction application is running, the application engine 226 stops this application in accordance with control from the control section 221. In a step S153, the application engine 226 erases data relating to another conjunction application from the work memory 228A and the save memory 228B and erases another conjunction application from the cache memory 227 in accordance with control from the control section 221.

In a step S154, if the specified subject conjunction application has not been acquired, the application engine 226 acquires this application in accordance with control from the control section 221. In a step S155, the application engine 226 activates the specified subject conjunction application in accordance with control from the control section 221.

If it is determined in the step S151 that the identification result of the step S111 is not the terminate-execute, the processing is forwarded to a step S156. In the step S156, the control section 221 determines whether or not the identification result of the step S111 is the suspend-execute. If it is determined to be the suspend-execute, the processing is forwarded to a step S157.

In the step S157, the application engine 226 saves data relating to running another conjunction application in the save memory 228B in accordance with control from the control section 221. Upon the end of the step S157, the processing is forwarded to the step S154. If the specified subject conjunction application has not been acquired, this conjunction application is acquired by the application engine 226 and then activated (steps S154 and S155).

If it is determined in the step S156 that the identification result of the step S111 is not the suspend-execute, the identification result of the step S111 is the hide-execute. Thus, the processing is forwarded to a step S158.

In the step S158, the application engine 226 hides running another conjunction application in accordance with control from the control section 221. Upon the end of the step S158, the processing is forwarded to the step S154. If the specified subject conjunction application has not been acquired, this conjunction application is acquired by the application engine 226 and then activated (steps S154 and S155).

Upon the end of the processing of the step S155, the processing returns to the step S130 in FIG. 26 and the subsequent processing is executed.

The composite command response processing is explained above.

As described above, according to the second conjunction application control processing, a conjunction application can be activated in conjunction with e.g. a television show, a CM, etc. and an event can be fired and stopped. A conjunction application can be made to pause with the running state kept and another conjunction application can be run and stopped, and thereafter the conjunction application in the pause can be resumed from the pause state.

As a composite command capable of control also about the operation of another conjunction application, the terminate-execute command, the suspend-execute command, or the hide-execute command can be specified. Therefore, end, pause, hiding, or so forth of another conjunction application can be controlled in response to this composite command.

(Trigger Information Response Processing for Live Pattern)

Figure 28:
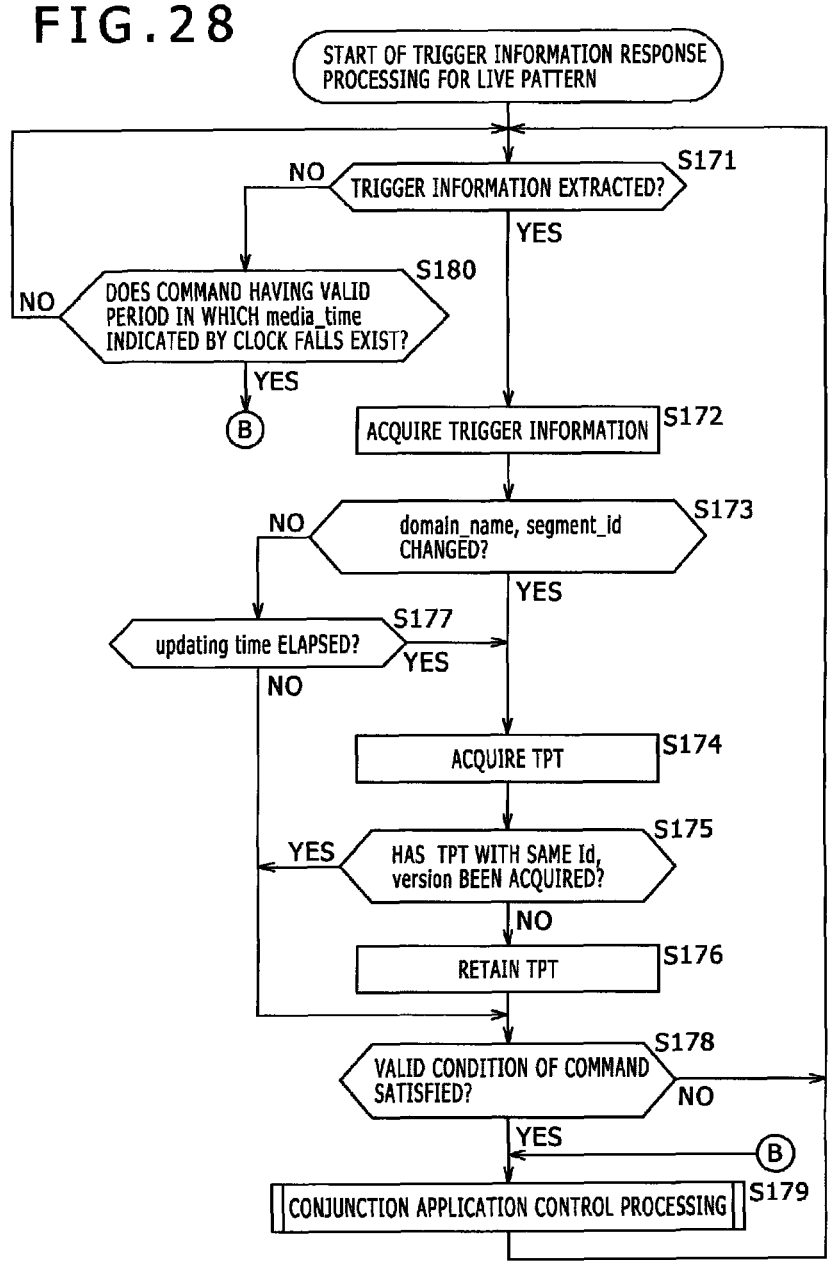
FIG. 28 is a flowchart explaining the trigger information response processing for a live pattern.

Next, with reference to the flowchart of FIG. 28, the trigger information response processing for a live pattern will be described as another example of the trigger information response processing corresponding to the step S36 in FIG. 22. The trigger information response processing for the live pattern is to allow a command to be executed at desired timing in the case in which broadcast content is on live broadcast as shown in the above-described FIG. 20.

In steps S171 to S177, similarly to the steps S51 to S57 in FIG. 23, a TPT is acquired from the TPT server 30 if domain_name and segment_id included in trigger information acquired from a broadcast signal has changed, and the acquired TPT is retained if it has not been acquired. In a step S180, similarly to the step S60 in FIG. 23, if a command having the valid period in which the time indicated by the internal clock falls exists, the processing is forwarded to a step S179.

In a step S178, the control section 221 determines whether or not the valid condition of the command is satisfied based on the trigger information and the TPT. Here, the valid condition of the command is e.g. a condition defined in advance in order to identify the command, such as whether the time indicated by the internal clock is in the valid period or whether the time has passed through the valid start time.

However, this valid condition is not defined only by the time axis such as the period and the time. For example, as described above, it is also possible that trigger information in which event_id is included instead of media_time is sent and the valid command is identified through matching between event_id and the eventID of the TPT. Inclusion of event_time in the trigger information also makes it possible to change the valid period of the command and so forth and shift the time when a predetermined command becomes valid.

Various valid conditions can be defined as above and the processing is forwarded to the step S179 if it is determined that this valid condition is satisfied ("YES" in the step S178). In the step S179, the control section 221 controls the application engine 226 to execute conjunction application control processing. As this conjunction application control processing, the first conjunction application control processing of FIG. 24 or the second conjunction application control processing of FIG. 26 is executed as described above.

By setting the desired valid condition in this manner, for example, the command is identified by event_id irrespective of the valid period of the command. Moreover, the time when this command is executed can be changed by event_time. Therefore, when the broadcast content is on live broadcast, the business operator such as the broadcaster can execute the command (e.g. execute-with-event command) at desired timing.

The trigger information response processing for the live pattern is explained above.

This is the end of the explanation of the first embodiment.

Second Embodiment

Configuration Example of
Broadcast-Communication Cooperative System

Figure 29:
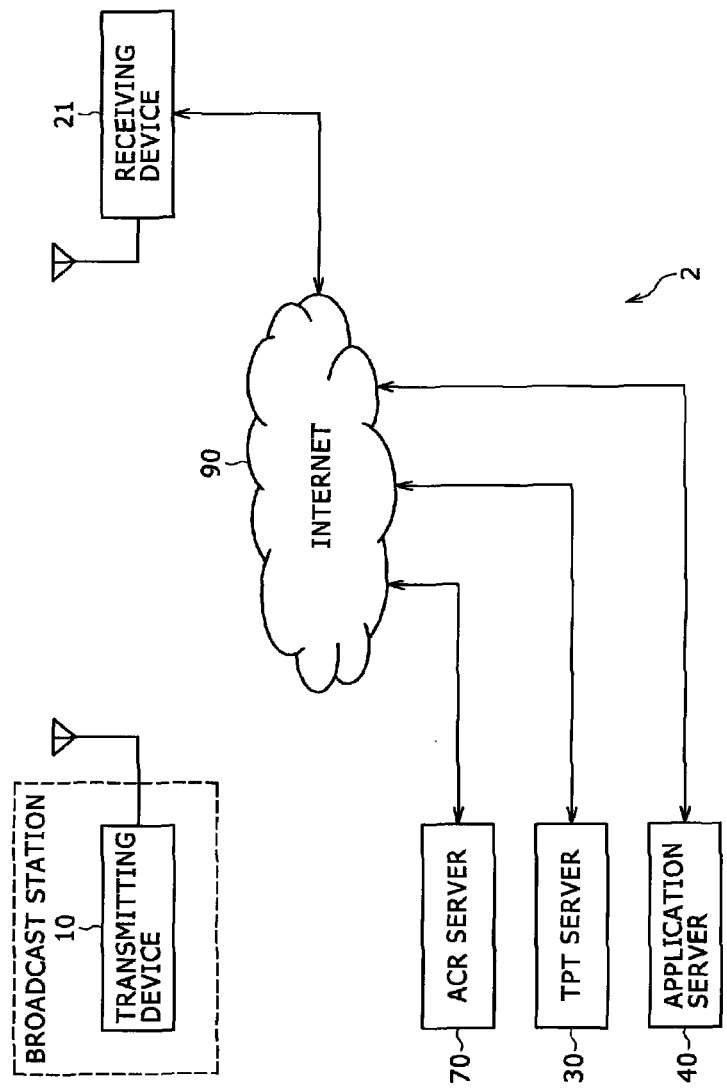
FIG. 29 is a diagram showing a configuration example of a broadcast-communication cooperative system.

FIG. 29 shows a broadcast-communication cooperative system 2 that is a second embodiment. This broadcast-communication cooperative system 2 includes the transmitting device 10, the TPT server 30, the application server 40, an ACR server 70, and a receiving device 21. The TPT server 30, the application server 40, the ACR server 70, and the receiving device 21 are connected to each other via the Internet 90.

That is, in the broadcast-communication cooperative system 2 of FIG. 29, compared with the broadcast-communication cooperative system 1 of FIG. 1, the ACR server 70 is newly provided and the receiving device 21 is provided instead of the receiving device 20. The configuration other than that is the same as that in FIG. 1 and therefore description thereof is accordingly omitted.

The receiving device 21 periodically accesses the ACR server 70 via the Internet 90 to inquire trigger information. At this time, a feature (hereinafter, referred to also as fingerprint information (Finger Print)) extracted from either one or both of a video signal and an audio signal of broadcast content such as a television show and a CM is transmitted to the ACR server 70.

The ACR server 70 is provided by the broadcaster that carries out the broadcast of broadcast content by the transmitting device 10 or another business operator for example.

The ACR server 70 has a database in which the feature extracted from a video signal and an audio signal of arbitrary broadcast content is registered, and identifies broadcast content by using an ACR technique in response to a query from the arbitrary receiving device 21 connected to the Internet 90.

Specifically, the ACR server 70 checks fingerprint information from the receiving device 21 against the database to thereby identify broadcast content and generate trigger information depending on this identification result. The ACR server 70 transmits the generated trigger information to the receiving device 21 via the Internet 90.

In response to the trigger information received from the ACR server 70, the receiving device 21 accesses the TPT server 30 via the Internet 90 to acquire a TPT. The receiving device 21 identifies a command based on the trigger information from the ACR server 70 and the TPT acquired from the TPT server 30. Then, the receiving device 21 controls the operation of a conjunction application in response to the identified command.

The broadcast-communication cooperative system 2 is configured in the above-described manner.

Configuration Example of Receiving Device

Figure 30:
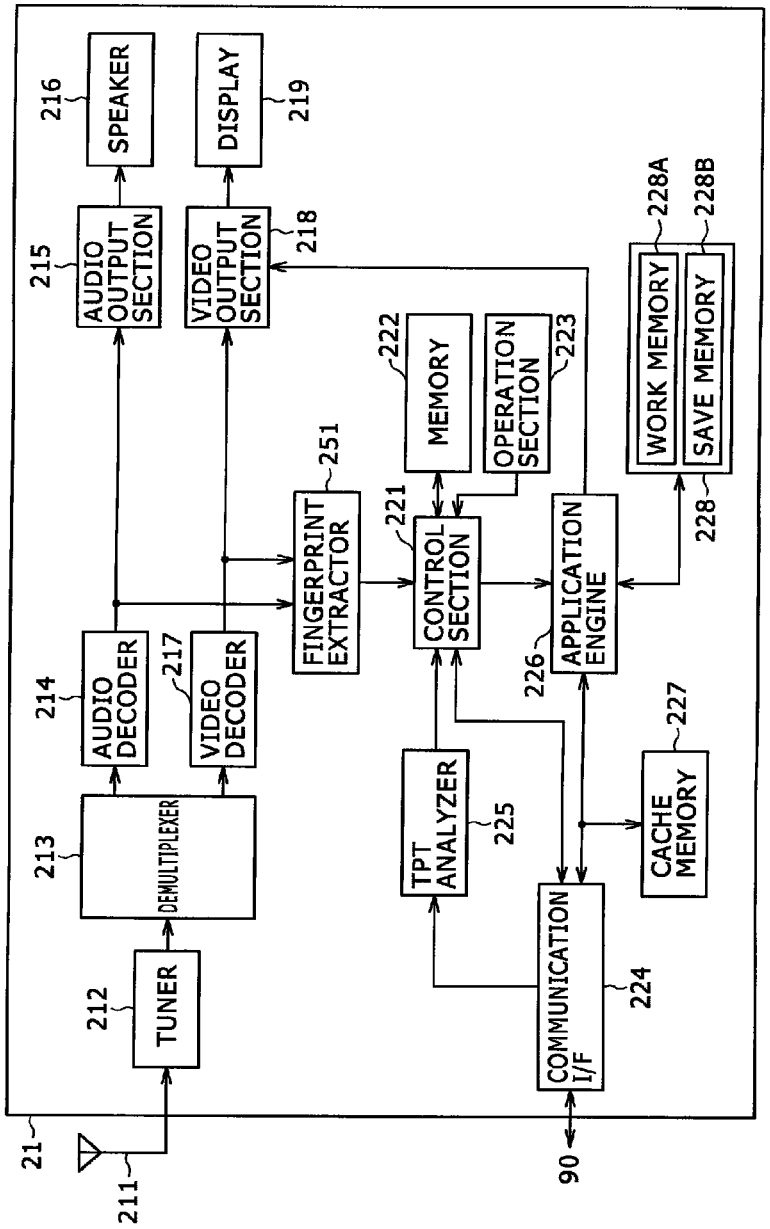
FIG. 30 is a diagram showing a configuration example of a receiving device.

FIG. 30 shows a configuration example of the receiving device 21 in FIG. 29.

The receiving device 21 has the components from the tuner 212 to the application memory 228 similarly to the receiving device 20 of FIG. 3 but is different from the receiving device 20 of FIG. 3 in that a fingerprint extractor 251 is provided instead of the trigger information extractor 220. In the receiving device 21, the same components as those in the receiving device 20 of FIG. 3 are given the same symbols and description thereof is accordingly omitted.

To the fingerprint extractor 251, an audio signal from the audio decoder 214 and a video signal from the video decoder 217 are output. The fingerprint extractor 251 extracts a feature from either one or both of the audio signal and the video signal and supplies it as fingerprint information to the control section 221.

The communication I/F 224 transmits the fingerprint information to the ACR server 70 via the Internet 90 in accordance with control from the control section 221. Furthermore, the communication I/F 224 receives trigger information transmitted from the ACR server 70 and supplies it to the control section 221.

In response to the trigger information supplied from the communication I/F 224, the control section 221 controls the communication I/F 224 to access the TPT server 30 via the Internet 90 and request a TPT. The communication I/F 224 receives the TPT transmitted from the TPT server 30 via the Internet 90 and supplies it to the TPT analyzer 225. Thereby, the TPT analyzer 225 retains the TPT in a memory (not shown) included inside and supplies the TPT retained in the memory in response to a request from the control section 221.

The control section 221 sets an internal clock for timing the time indicating the progression of broadcast content based on the trigger information from the communication I/F 224. Based on the analysis result of the TPT from the TPT analyzer 225, if the time timed by this internal clock satisfies a predetermined valid condition based on the valid period and so forth, the control section 221 identifies the command associated with this valid period and so forth. In response to the identified command, the control section 221 controls the application engine 226 to control acquisition or registration, acquisition or activation, event firing, pause or resumption, hiding or displaying, stop, or so forth of a conjunction application.

The receiving device 21 is configured in the above-described manner.

Operation of Respective Devices of
Broadcast-Communication Cooperative System

Next, with reference to FIG. 31, an outline of the operation of the respective devices configuring the broadcast-communication cooperative system 2 of FIG. 29 will be described.

Figure 31:
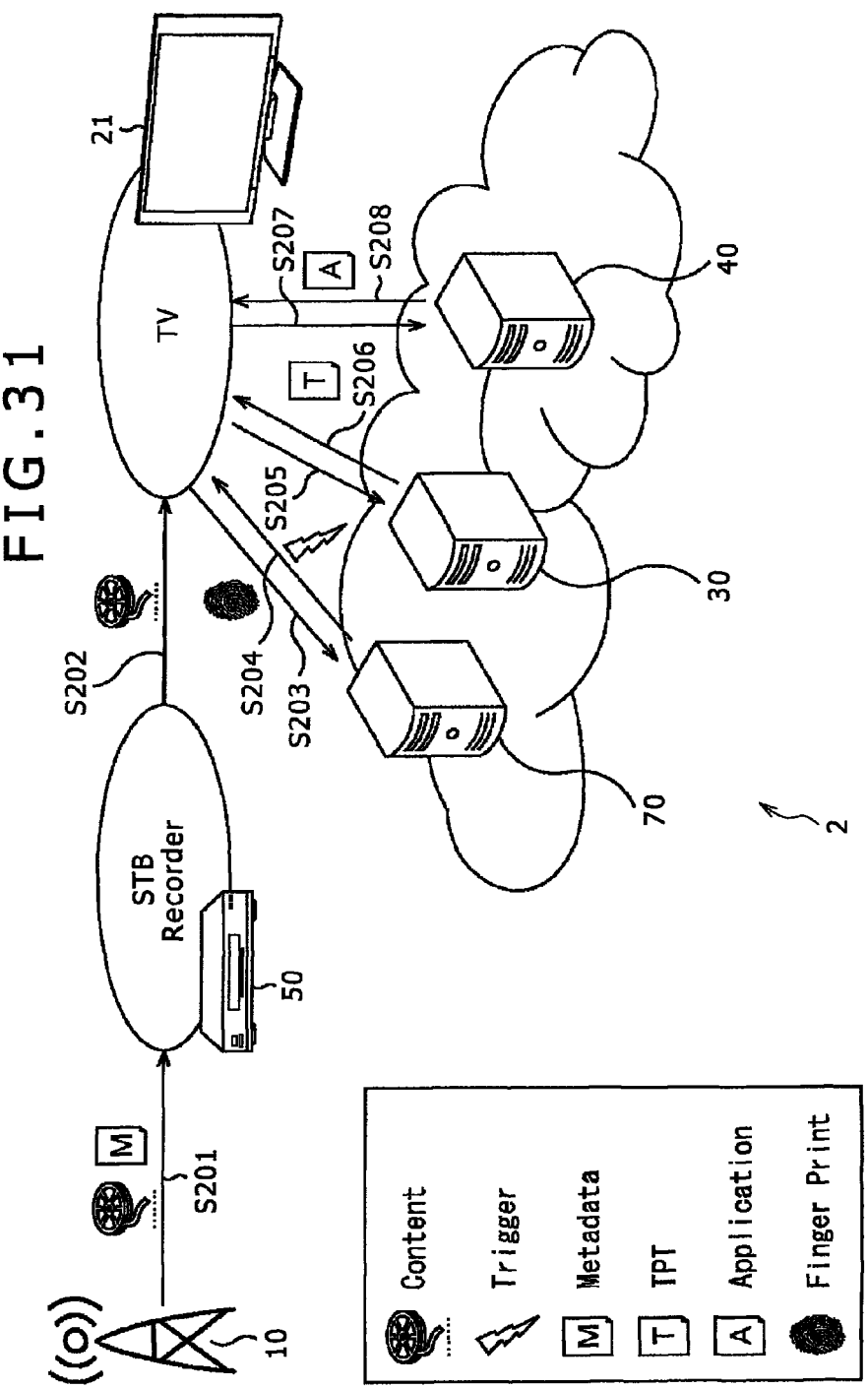
FIG. 31 is a diagram for explaining an operation of each device configuring the broadcast-communication cooperative system.

In the broadcast-communication cooperative system 2 of FIG. 31, a broadcast signal of broadcast content is transmitted by the transmitting device 10 (S201). Furthermore, metadata relating to this broadcast content is included in the broadcast signal.

In a case of receiving the broadcast signal from the transmitting device 10 via a CATV network, a satellite communication network, or so forth, the receiving device 21 receives a signal resulting from conversion by a dedicated terminal such as the set-top box 50 via an HDMI (S202). In this case, the output from the set-top box 50 is only the broadcast content and the metadata cannot be utilized in the receiving device 21.

Besides the case of directly receiving the broadcast signal (S201), also in the case of receiving it via the set-top box 50 (S202), the receiving device 21 transmits, to the ACR server 70, the feature extracted from the video signal and the audio signal of the broadcast content as the fingerprint information and requests trigger information (S203).

Figure 32:
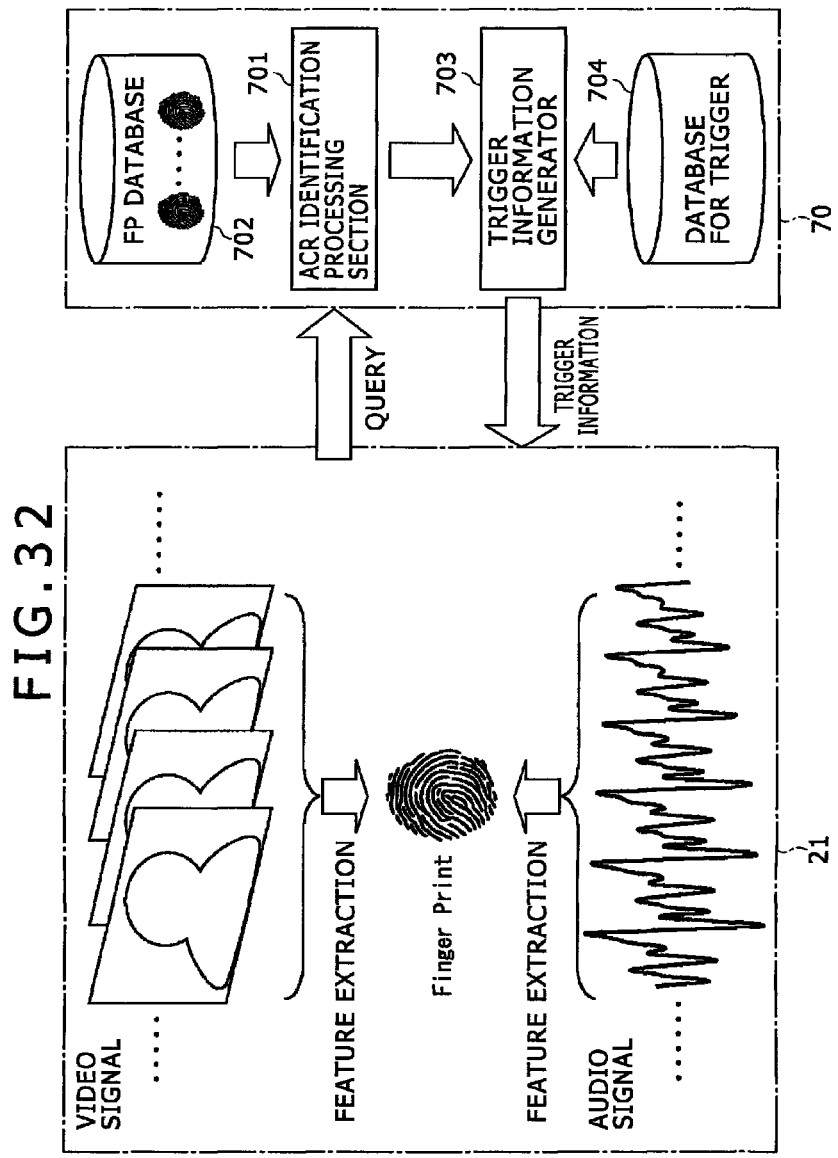
FIG. 32 is a diagram explaining a concept of an ACR (automatic content recognition) technique.

The ACR server 70 executes ACR identification processing and checks the fingerprint information from the receiving device 21 against the database to thereby identify a show currently selected in the receiving device 21. Specifically, as shown in FIG. 32, in the ACR server 70, when a query by the fingerprint information is received from the receiving device 21, the fingerprint information is checked against a FP (fingerprint) database 702 prepared in advance by an ACR identification processing section 701 and broadcast content currently selected in the receiving device 21 is identified.

The fingerprint information (feature) is e.g. specific information of the whole or a partial constituent element of broadcast content, and the specific information of a large number of pieces of broadcast content is registered in the FP database 702 in advance. In the ACR identification processing, e.g. the degree of similarity or the degree of matching of these pieces of specific information is determined. As a method for determining the degree of similarity or the degree of matching, a publicly-known technique disclosed by various kinds of documents and so forth can be used. By using the ACR technique, broadcast content can be identified from the feature of the video signal and the audio signal without depending on information such as the resolution, the aspect ratio, the bit rate, or the format of the broadcast content.

By this ACR identification processing, information for identifying a channel number of broadcast content (hereinafter, referred to as the channel identification information) and information indicating a time position at which the fingerprint information is extracted when the period from the start to the end of the broadcast content is represented on the time axis (hereinafter, referred to as the time position information) are obtained. These identification results are supplied to a trigger information generator 703.

The trigger information generator 703 generates trigger information based on the identification result from the ACR identification processing section 701 and various kinds of information registered in a database 704 for the trigger. Specifically, in the database 704 for the trigger, server specifying information and content identification information are registered in advance corresponding to the channel identification information for example.

The trigger information generator 703 refers to the database 704 for the trigger and acquires the server specifying information and the content identification information corresponding to the channel identification information from the ACR identification processing section 701. Then, the trigger information generator 703 generates trigger information in such a manner as to employ the server specifying information and the content identification information acquired from the database 704 for the trigger as domain_name and segment_id, respectively, and employ the time position information from the ACR identification processing section 701 as media_time.

Referring back to FIG. 31, the trigger information generator 703 transmits the generated trigger information to the receiving device 21 as the query source (S204). The receiving device 21 determines whether or not to acquire a TPT based on domain_name and segment_id included in the trigger information from the ACR server 70. If determining to acquire a TPT, the receiving device 21 accesses the TPT server 30 via the Internet 90 and requests a TPT (S205).

In response to the query from the receiving device 21, the TPT server 30 identifies a TPT and transmits the identified TPT to the receiving device 21 via the Internet 90 (S206). The receiving device 21 receives the TPT from the TPT server 30 via the Internet 90 and retains it.

When acquiring the trigger information from the ACR server 70 depending on the fingerprint information periodically extracted, the receiving device 21 sets and calibrates the internal clock based on media_time included in the trigger information. The receiving device 21 identifies the valid command if the time indicated by the internal clock is in the valid period of the command. In accordance with the identification result of the command, the receiving device 21 accesses the application server 40 via the Internet 90 and requests a conjunction application run in conjunction with the broadcast content currently selected (S207).

The application server 40 transmits a conjunction application to the receiving device 21 via the Internet 90 in response to the query from the receiving device 21 (S208). The receiving device 21 acquires the conjunction application from the application server 40 via the Internet 90 and activates it.

As described above, in the broadcast-communication cooperative system 2, the receiving device 21 carries out cooperative operation with the TPT server 30 and the application server 40 in response to the trigger information obtained by periodically sending the fingerprint information to the ACR server 70. Thereby, the conjunction application run in conjunction with the broadcast content currently selected is acquired and run in the receiving device 21.

The trigger information from the ACR server 70 is notified to the receiving device 21 irrespective of a dedicated terminal such as the set-top box 50. Therefore, in the broadcast-communication cooperative system 2, the conjunction application can be provided without involving works of modifying facilities of the broadcast transmission path such as a CATV network and the dedicated terminal and obtaining permission of a broadcaster that carries out the broadcast.

Correspondence Relationship Between Trigger Information and Command

Figure 33:
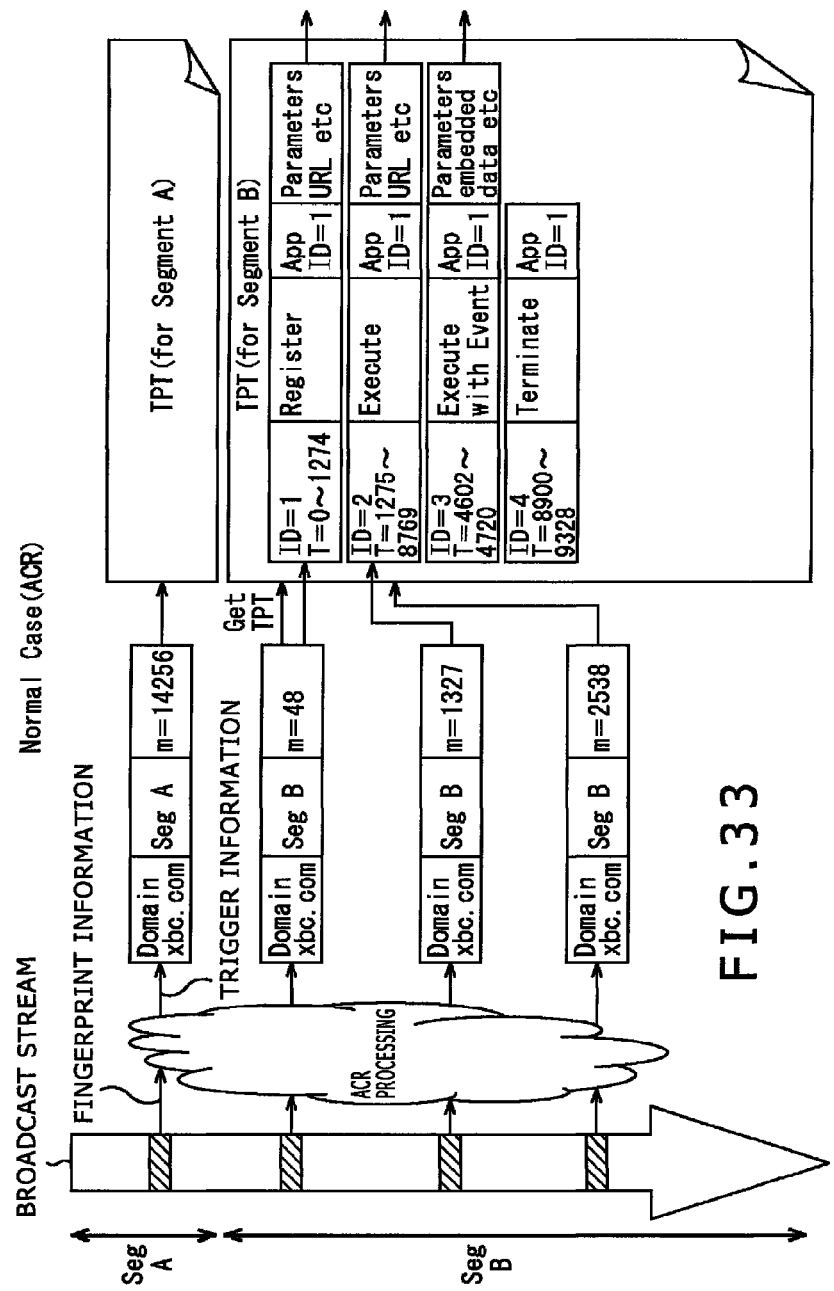
FIG. 33 is a diagram showing an example of the correspondence relationship between the trigger information and the command.

Next, an example of processing of identifying, by the TPT, the command associated with the trigger information acquired depending on the fingerprint information will be described. FIG. 33 is a diagram showing an example of the correspondence relationship between the trigger information and the command.

As shown in FIG. 33, in the receiving device 21, when fingerprint information obtained from a TS is periodically extracted, this fingerprint information is transmitted to the ACR server 70 ("ACR processing" in the diagram). In the ACR server 70, trigger information is generated based on the fingerprint information from the receiving device 21 and transmitted to the receiving device 21.

When acquiring the trigger information depending on the fingerprint information periodically extracted, the receiving device 21 determines whether or not to acquire a TPT from the TPT server 30 based on domain_name and segment_id included in the trigger information. For example, when the value of segment_id included in the acquired trigger information has changed in a case in which the receiving device 21 retains a TPT (for Segment A) for Segment A, the receiving device 21 accesses the TPT server 30 and acquires the TPT. Thereby, the TPT (for Segment B) in the diagram is retained in the receiving device 21.

Processing of executing the respective commands described in the TPT based on the clock set and calibrated by the trigger information acquired depending on the fingerprint information is the same as the processing explained with reference to FIG. 15. Specifically, for example, media_time included in the trigger information periodically acquired in response to extraction of the fingerprint information is set to the internal clock. Whether or not the time has first reached the valid period of the respective commands stored in the TPT (for Segment B) is determined based on the internal clock maintained by being calibrated by media_time, so that the valid command is identified.

For example, when the register command is valid, the receiving device 21 acquires and registers a conjunction application in response to the register command. When the execute command is valid, the receiving device 21 activates the conjunction application that has been acquired in response to the execute command.

In this manner, if the time indicating the progression of broadcast content in the internal clock operating based on the trigger information acquired depending on the fingerprint information periodically extracted satisfies a predetermined valid condition based on the valid period and so forth, the receiving device 21 controls the operation of the conjunction application in response to the command associated with this valid period and so forth.

Another Configuration Example of Broadcast-Communication Cooperative System

By the way, it is envisaged that the ACR server 70 is provided by a general business operator having no relation to a broadcaster, a creator, etc. of broadcast content. In the broadcast-communication cooperative system 2, trigger information depending on the ACR identification result is generated by the ACR server 70 and provided to the receiving device 21. Thus, the broadcaster and so forth cannot control the trigger information in some cases.

Therefore, the broadcaster and so forth has a desire to send the trigger information to the receiving device 21 at desired timing to control the operation of the conjunction application. So, next, with reference to FIG. 34, a configuration for allowing a specific business operator to control the trigger information will be described.

Figure 34:
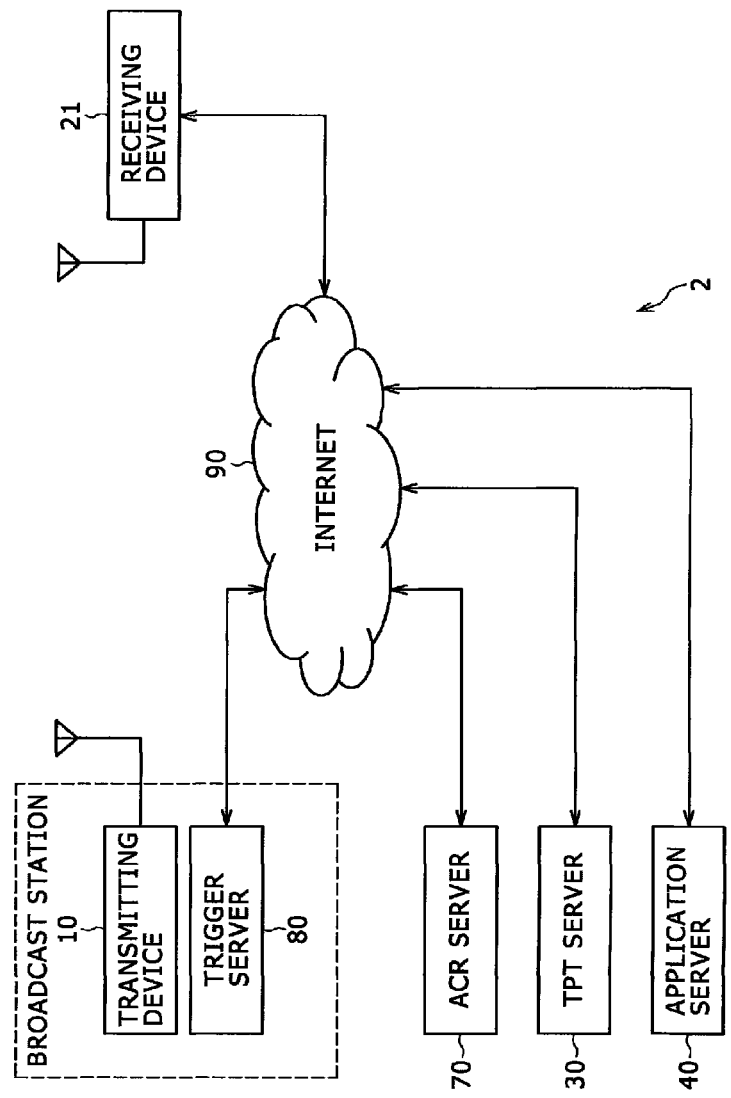
FIG. 34 is a diagram showing a configuration example of the broadcast-communication cooperative system.

FIG. 34 is a diagram showing another configuration example of the broadcast-communication cooperative system 2. This broadcast-communication cooperative system 2 includes the transmitting device 10, the TPT server 30, the application server 40, the ACR server 70, a trigger server 80, and the receiving device 21.

That is, in the broadcast-communication cooperative system 2 of FIG. 34, compared with the broadcast-communication cooperative system 2 of FIG. 29, the trigger server 80 is newly provided. The configuration other than that is the same as that in FIG. 29 and therefore description thereof is accordingly omitted.

The trigger server 80 manages live trigger information. The trigger server 80 provides the managed live trigger information to the receiving device 21 via the Internet 90 in response to a query from the receiving device 21. The trigger server 80 is provided by a business operator such as a broadcaster or a creator of broadcast content and is disposed in the same broadcast station as that of the transmitting device 10 for example.

The receiving device 21 accesses the trigger server 80 via the Internet 90 and acquires the live trigger information based on the liveTrigger element described in the TPT.

Specifically, the URL of the trigger server 80 is specified in the liveTriggerURL attribute of the liveTrigger element. Thus, the receiving device 21 accesses the trigger server 80 in accordance with this URL. Information indicating a polling interval is specified in the pollPeriod attribute of the liveTrigger element. Thus, the receiving device 21 inquires the live trigger information of the trigger server 80 depending on this polling interval.

The broadcast-communication cooperative system 2 is configured in the above-described manner.

Another Example of Method for Identifying Command

Also in a case of acquiring trigger information by using the ACR identification processing, trigger information in which event_id and event_time are included instead of media_time may be acquired similarly to the case of acquiring the trigger information that is so sent as to be included in the above-described broadcast signal.

Figure 35:
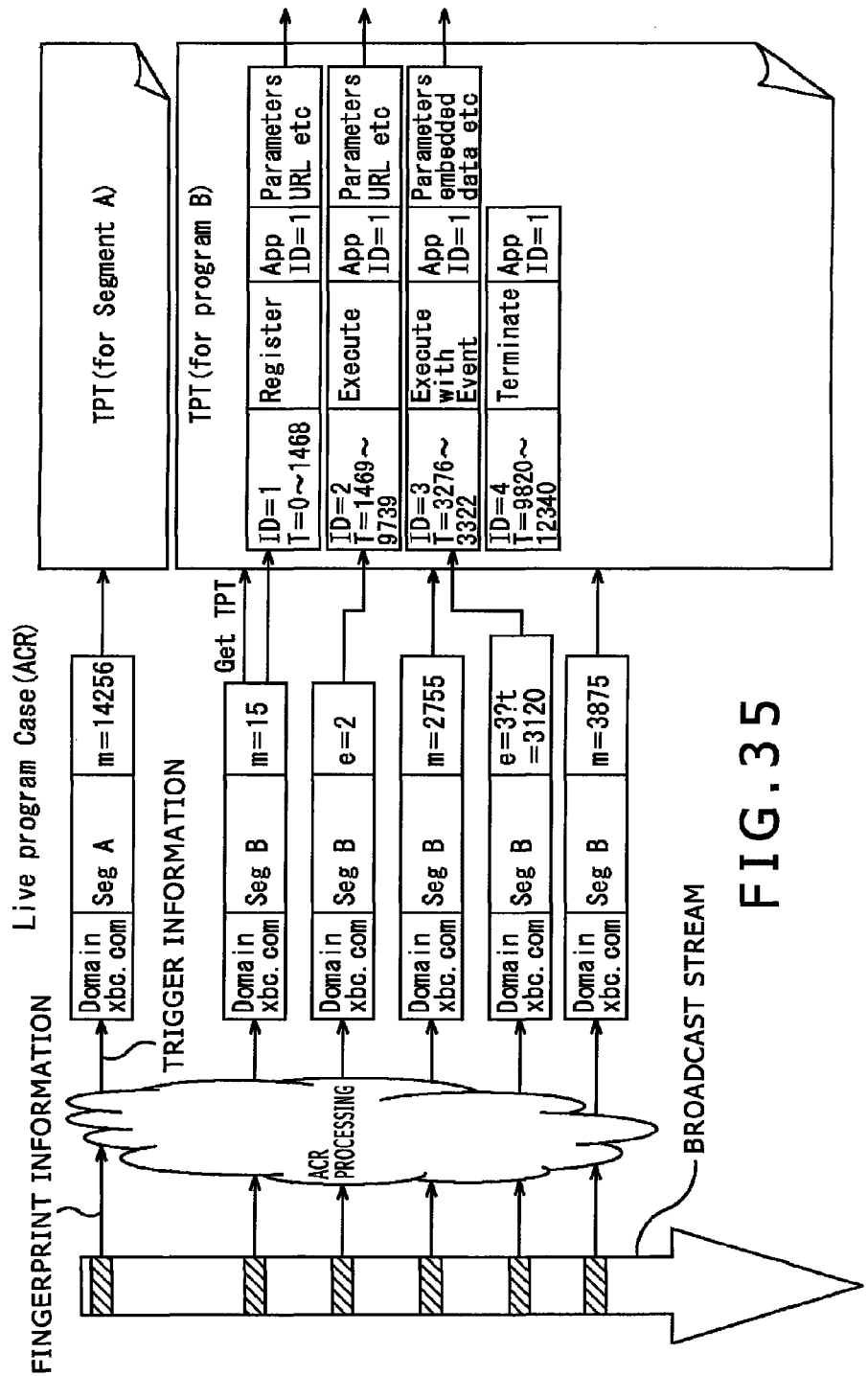
FIG. 35 is a diagram showing an example of the correspondence relationship between the trigger information and the command.

In FIG. 35, an example of the correspondence relationship between the trigger information and the command is shown similarly to FIG. 20. The same contents are described in FIG. 35 and FIG. 20 except for that the acquisition path of the trigger information is different. That is, in FIG. 35, similarly to FIG. 20, the command is identified by event_id irrespective of the valid period of the command. The time when this command is executed can be changed by event_time. Therefore, when the broadcast content is on live broadcast, the business operator such as a broadcaster can execute the command (e.g. execute-with-event command) at desired timing.

Contents of Specific Processing Executed in Respective Devices

Next, with reference to flowcharts of FIG. 36 and FIG. 37, specific processing executed in the respective devices configuring the broadcast-communication cooperative system 2 of FIG. 29 or FIG. 34 will be described. The transmission processing executed in the transmitting device 10 is the same as the transmission processing of FIG. 21, and the reception processing executed in the receiving device 21 is the same as the reception processing of FIG. 22. Therefore, description thereof is omitted.

(Trigger Information Response Processing Depending on ACR Identification Result)

First, with reference to the flowchart of FIG. 36, the trigger information response processing depending on the ACR identification result will be described. That is, this trigger information response processing corresponds to the step S36 in FIG. 22.

In a step S211, the fingerprint extractor 251 determines whether or not a predetermined time has elapsed. Then, if the predetermined time has elapsed, the processing is forwarded to a step S212.

In the step S212, the fingerprint extractor 251 extracts a feature (fingerprint information) from either one or both of an audio signal and a video signal.

In a step S213, the control section 221 controls the communication I/F 224 to transmit the fingerprint information acquired by the fingerprint extractor 251 to the ACR server 70 via the Internet 90 to thereby inquire trigger information.

In a step S214, the control section 221 controls the communication I/F 224 to determine whether or not the trigger information is received from the ACR server 70. If it is determined in the step S214 that the trigger information is not received, the processing returns to the step S111 and this and subsequent processing is repeated. On the other hand, if it is determined in the step S214 that the trigger information is received, the processing is forwarded to a step S215.

In the steps S215 to S223, similarly to the steps S52 to S60 in FIG. 23, a TPT is acquired by the TPT analyzer 225 if domain_name and segment_id included in the trigger information received from the ACR server 70 change, and the acquired TPT is retained if it has not been acquired. If it is determined by the control section 221 that the time (media_time) indicated by the internal clock is in the valid period, the operation of a conjunction application is controlled in response to this valid command.

As the conjunction application control processing, e.g. the first conjunction application control processing of FIG. 24 or the second conjunction application control processing of FIG. 26 is executed. Thereby, stop, pause or hiding of another conjunction application can be controlled.

The trigger information response processing depending on the ACR identification result is explained above.

(Trigger Information Response Processing for Live Pattern Depending on ACR Identification Result)

Next, with reference to the flowchart of FIG. 37, the trigger information response processing for a live pattern depending on the ACR identification result will be described. That is, this trigger information response processing corresponds to the step S36 in FIG. 22.

Figure 36:
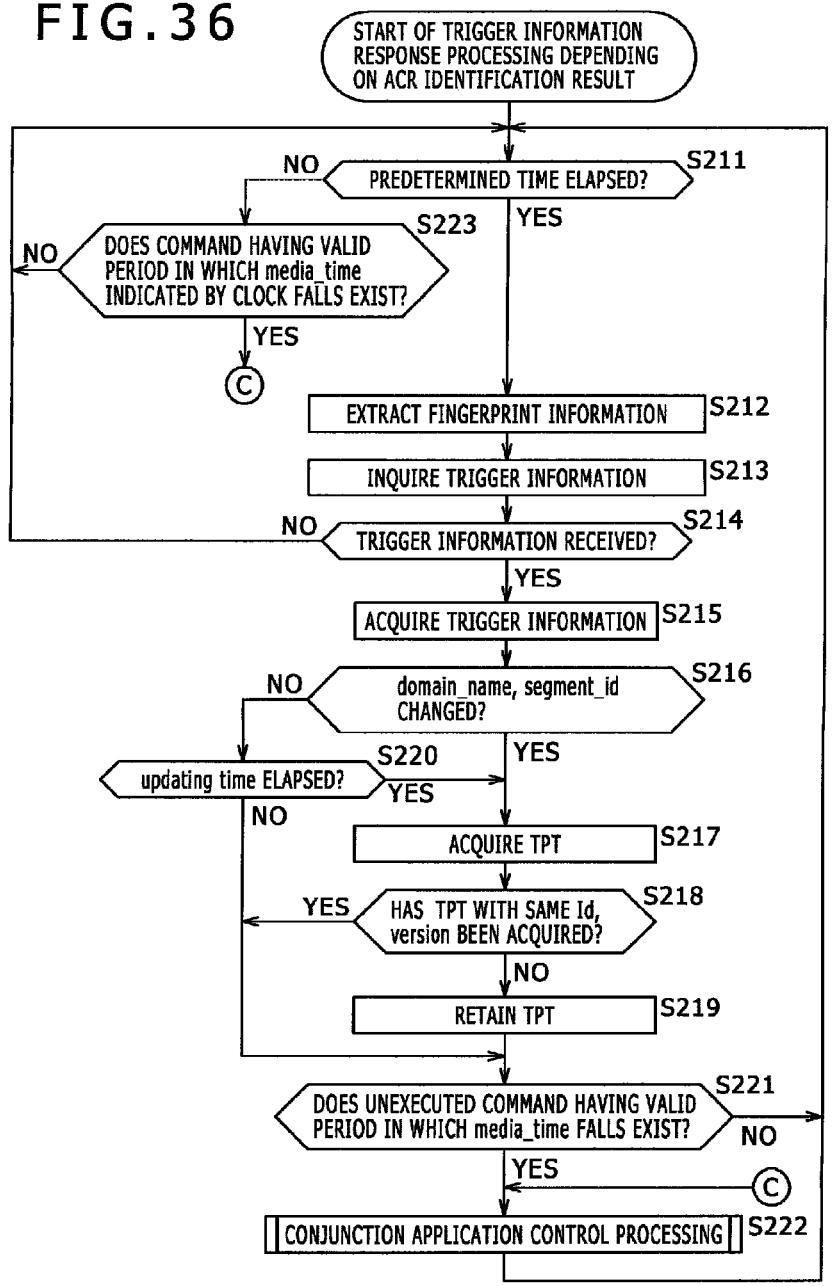
FIG. 36 is a flowchart explaining the trigger information response processing depending on an ACR identification result.
Figure 37:
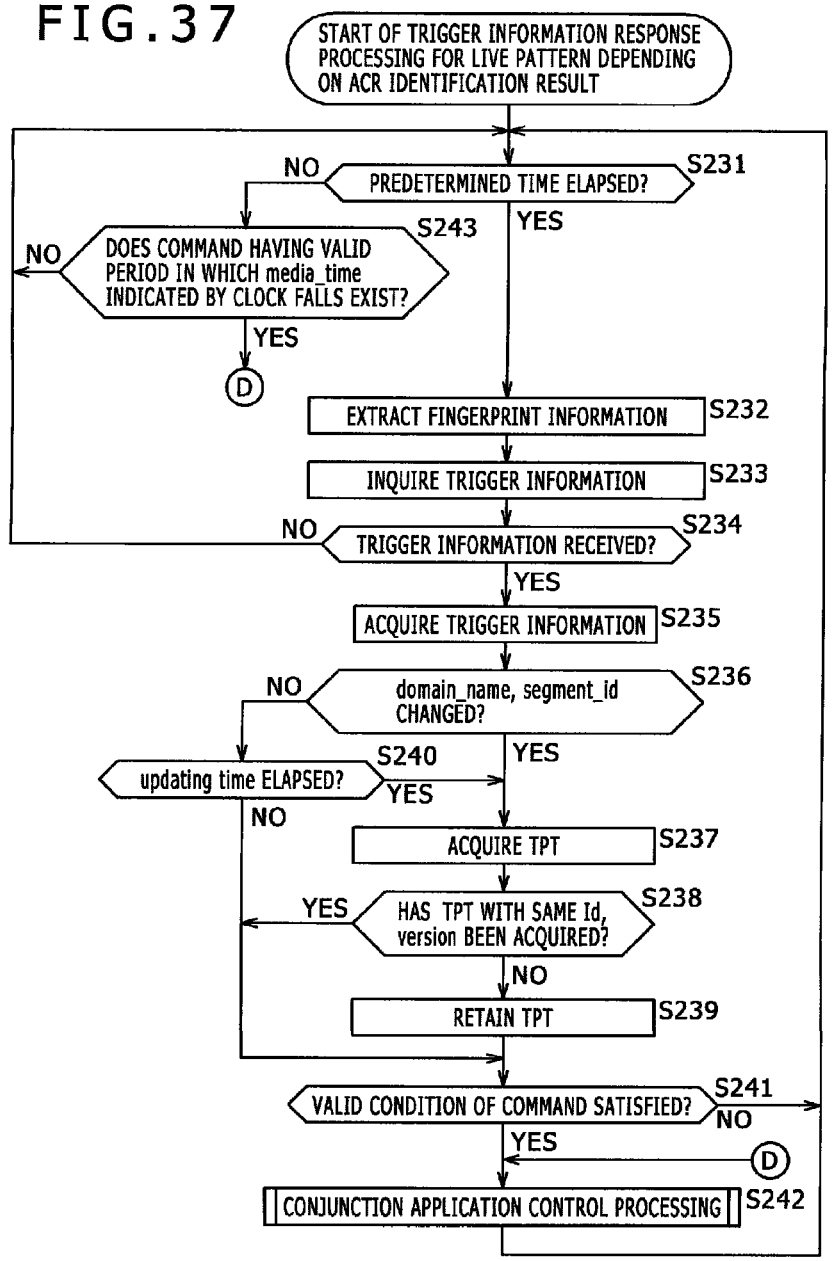
FIG. 37 is a flowchart explaining the trigger information response processing for a live pattern depending on the ACR identification result.

In steps S231 to S240, similarly to the steps S211 to S220 in FIG. 36, a TPT is acquired if domain_name and segment_id included in trigger information received from the ACR server 70 depending on fingerprint information periodically extracted change, and the acquired TPT is retained if it has not been acquired. Furthermore, in steps S241 and S242, similarly to the steps S221 and S222 in FIG. 36, if it is determined that the time indicated by the internal clock is in the valid period, the operation of a conjunction application is controlled in response to this valid command. Furthermore, in a step S243, similarly to the step S223 in FIG. 36, if a command having the valid period in which the time indicated by the internal clock falls exists, the processing is forwarded to the step S242.

In the step S241, whether or not the valid condition of the command is satisfied is determined based on the trigger information and the TPT. Here, the valid condition of the command is e.g. a condition defined in advance in order to identify the command, such as whether the time indicated by the internal clock is in the valid period or whether the time has passed through the valid start time.

However, this valid condition is not defined only by the time axis such as the period and the time. For example, as described above, it is also possible that trigger information in which event_id is included instead of media_time is sent and the valid command is identified through matching between event_id and the eventID of the TPT. Inclusion of event_time in the trigger information also makes it possible to change the valid period of the command and so forth and shift the time when a predetermined command becomes valid.

The trigger information response processing for the live pattern depending on the ACR identification result is explained above.

This is the end of the explanation of the second embodiment.

Figure 38:
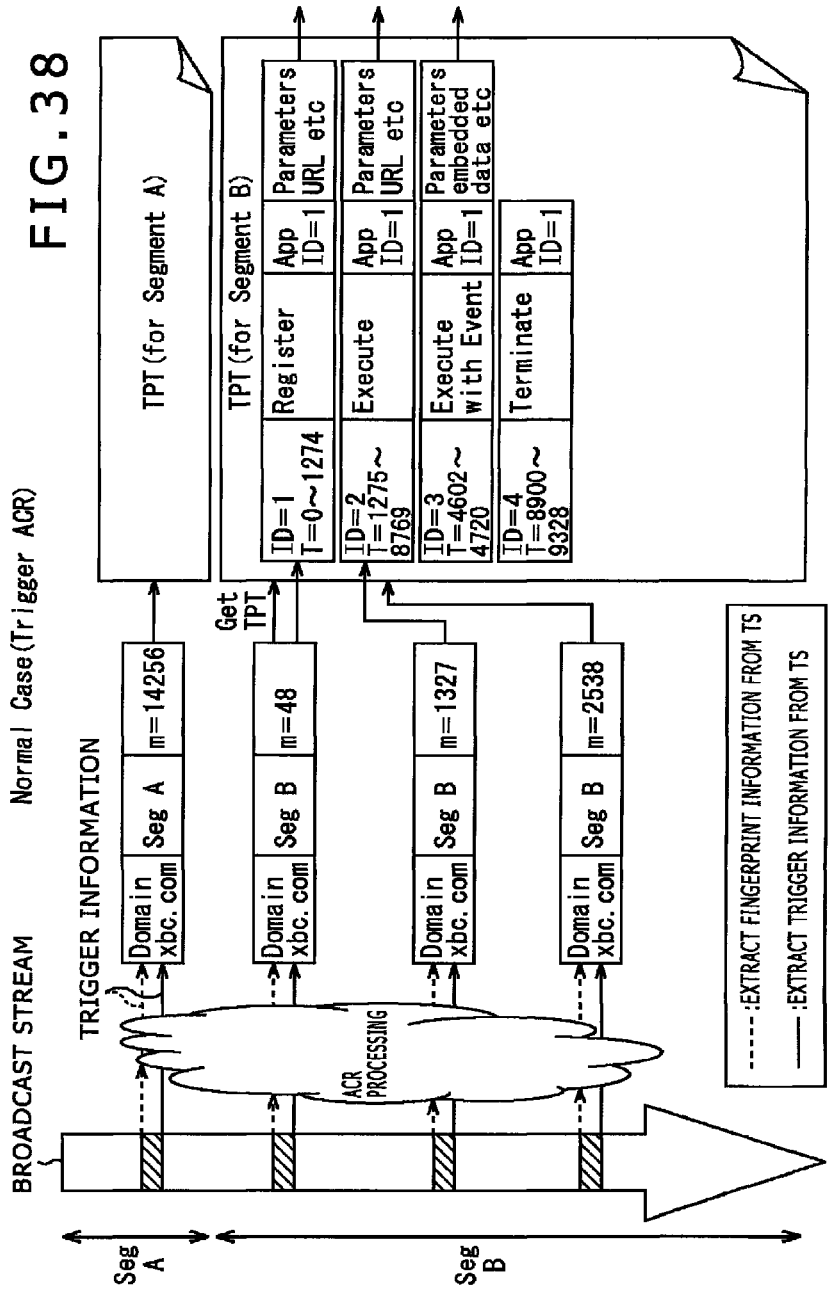
FIG. 38 is a diagram showing an example of the correspondence relationship between the trigger information and the command.

In the first embodiment and the second embodiment, the forms of the trigger information and the TPT acquired in the receiving devices 20 and 21 are the same although the acquisition path of the trigger information is different. Therefore, it is also possible to simultaneously put these embodiments into practice as shown in FIG. 38.

Third Embodiment

Configuration Example of Delivery System

In the above description, the example in which the receiving device 20 or the receiving device 21 receives a broadcast signal of broadcast content transmitted from the transmitting device 10 is explained. However, communication content may be delivered based on VOD (Video on Demand) via the Internet 90.

Figure 39:
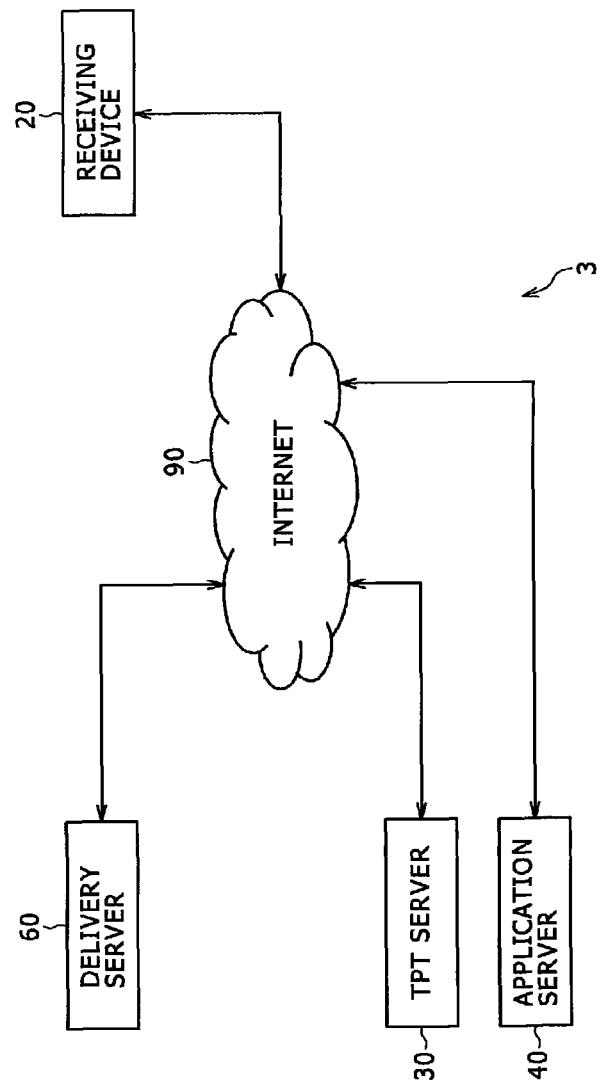
FIG. 39 is a diagram showing a configuration example of a delivery system.

FIG. 39 shows a delivery system 3 that is a third embodiment. In FIG. 39, the components corresponding to FIG. 1 are given the same numerals and description thereof is accordingly omitted.

Specifically, in FIG. 39, compared with FIG. 1, a delivery server 60 connected to the Internet 90 is provided instead of the transmitting device 10. The delivery server 60 delivers communication content such as VOD content to the receiving device 20 via the Internet 90 in response to a request from the receiving device 20. The delivery server 60 transmits trigger information to the receiving device 20 together with the VOD content.

The receiving device 20 extracts the trigger information transmitted from the delivery server 60 together with the VOD content and acquires the TPT depending on domain_name and segment_id included in the trigger information from the TPT server 30. Then, the receiving device 20 identifies a command based on the trigger information from the delivery server 60 and the TPT from the TPT server 30 and controls the operation of a conjunction application run in conjunction with the VOD content in response to the identified command.

As above, the receiving device 20 does not only receive broadcast content via a broadcast network but also can receive communication content via a communication network. Whether content is received from the broadcast network or the communication network, the receiving device 20 can acquire the TPT depending on domain_name and segment_id included in the trigger information transmitted together with this content. As a result, the receiving device 20 can identify a command based on the trigger information and the TPT.

Although the delivery system 3 of FIG. 39 is given a configuration corresponding to the broadcast-communication cooperative system 1 of FIG. 1, the configuration in which the delivery server 60 is provided instead of the transmitting device 10 can be employed similarly also for the broadcast-communication cooperative system 2 of FIG. 29 or FIG. 34, i.e. the configuration in which the ACR server 70 is provided.

This is the end of the explanation of the third embodiment.

In the above description, the example in which plural servers such as the TPT server 30, the application server 40, the ACR server 70, and the delivery server 60 are provided for each of provided functions is explained. However, the whole or part of these functions may be collectively provided by one or plural servers.

Explanation of Computer to which Embodiments of Present Technique are Applied

The above-described series of processing can be executed by hardware and can also be executed by software. In the case of executing the series of processing by software, a program configuring the software is installed in a computer. Here, in the computer, a computer incorporated in dedicated hardware, e.g. a general-purpose personal computer capable of carrying out various kinds of functions through installation of various kinds of programs, and so forth are included.

FIG. 40 is a block diagram showing a configuration example of the hardware of the computer that executes the above-described series of processing by a program.

In a computer 900, a CPU 901, a ROM 902, and a RAM 903 are connected to each other by a bus 904.

An input/output interface 905 is connected to the bus 904. To the input/output interface 905, an input section 906, an output section 907, a recording section 908, a communication section 909, and a drive 910 are connected.

The input section 906 includes a keyboard, a mouse, a microphone, etc. The output section 907 includes a display, a speaker, etc. The recording section 908 includes a hard disc, a non-volatile memory, etc. The communication section 909 includes a network interface etc. The drive 910 drives removable media 911 such as an optical disc or a semiconductor memory.

In the computer 900 configured in the above-described manner, the CPU 901 loads a program stored in the recording section 908 into the RAM 903 via the input/output interface 905 and the bus 904 to execute the program for example, and thereby the above-described series of processing is executed.

The program run by the computer 900 (CPU 901) can be recorded in the removable media 911 as package media or so forth and be provided for example. The program can be provided via a wired or wireless transmission medium such as a local area network, the Internet, or digital satellite broadcast.

In the computer 900, the program can be installed into the recording section 908 via the input/output interface 905 by loading the removable media 911 in the drive 910. The program can be received by the communication section 909 via a wired or wireless transmission medium and be installed into the recording section 908. The program can be installed in the ROM 902 or the recording section 908 in advance.

The program run by the computer 900 may be a program processed in a time-series manner along the order explained in the present specification or may be a program processed in parallel or at a necessary timing such as when calling is performed.

Here, in the present specification, the processing steps that describe the program for making the computer 900 execute various kinds of processing do not necessarily need to be processed in a time-series manner along the order described as the flowchart and include also processing executed in parallel or individually (e.g. parallel processing or processing by an object).

The program may be one processed by one computer or may be one subjected to dispersion processing by plural computers. The program may be one transferred to a distant computer and be run.

In the present specification, a system means a collection of plural constituent elements (devices, modules (parts), etc.) and is irrespective of whether or not all constituent elements exist in the same chassis. Therefore, both of plural devices that are housed in separate chassis and are connected via a network and one device in which plural modules are housed in one chassis are a system.

Embodiments of the present technique are not limited to the above-described embodiments and various changes are possible in such a range as not to depart from the gist of the present technique.

For example, the present technique can employ a configuration of cloud computing to process one function by plural devices via a network in a sharing and cooperative manner.

The respective steps explained in the above-described flowcharts can be carried out by plural devices in a sharing manner besides being carried out by one device.

If plural kinds of processing are included in one step, the plural kinds of processing included in this one step can be executed by plural devices in a sharing manner besides being carried out by one device.

The present technique can employ the following configurations.

(1)

A receiving device including:
a receiver configured to receive broadcast content;
a trigger information acquirer configured to acquire trigger information for identifying a command to control an operation of an application program that is run in conjunction with the broadcast content and is delivered via a network;
a correspondence table acquirer configured to acquire a correspondence table in which the command is associated with information for identifying the command; and
a control section configured to control operations of a subject application program and another application program other than the subject application program in response to the command identified by the trigger information and the correspondence table.

(2)

The receiving device according to (1),
in which the command is to control the operation of the subject application program and is associated with additional information for controlling the operation of the another application program, and the control section controls the operation of the subject application program in response to the command and controls the operation of the another application program in response to the additional information.

(3)

The receiving device according to (2), in which the command is to activate the subject application program and is associated with additional information for ordering stop, pause, or hiding of the another application program.

(4)

The receiving device according to (2) or (3), in which additional information for ordering event firing of the subject application program that is running is further associated with the command.

(5)

The receiving device according to any of (1) to (3), in which the command is to control the operations of both of the subject application program and the another application program, and the control section controls the operations of both of the subject application program and the another application program in response to the command.

(6)

The receiving device according to (5), in which the command is to control activation of the subject application program and stop, pause, or hiding of the another application program.

(7)

The receiving device according to (5) or (6), in which additional information for ordering event firing of the subject application program that is running is associated with the command.

(8)

The receiving device according to any of (1) to (7), in which the trigger information is transmitted together with the broadcast content, and the trigger information acquirer extracts the trigger information from data of the broadcast content.

(9)

The receiving device according to any of (1) to (7), further including a feature extractor configured to extract a feature from data of the broadcast content, in which the trigger information acquirer acquires the trigger information corresponding to an identification result of the broadcast content identified by using the feature.

(10)

The receiving device according to any of (1) to (9), in which the command and a valid period of the command are associated with each other in the correspondence table, and if time that is timed based on the trigger information and that indicates progression of the broadcast content satisfies a predetermined valid condition based on the valid period, the control section controls the operations of the subject application program and the another application program in response to a command associated with the valid period.

(11)

The receiving device according to (10), in which an identifier of the command is further associated in the correspondence table, and if the identifier of the command obtained from the trigger information corresponds with the identifier of the command associated in the correspondence table, the control section controls the operations of the subject application program and the another application program in response to a command associated with the identifier.

(12)

A receiving method of a receiving device, the method executed by the receiving device, including:

receiving broadcast content;

acquiring trigger information for identifying a command to control an operation of an application program that is run in conjunction with the broadcast content and is delivered via a network;

acquiring a correspondence table in which the command is associated with information for identifying the command; and controlling operations of a subject application program and another application program other than the subject application program in response to the command identified by the trigger information and the correspondence table.

(13)

A transmitting device including:

a trigger information generator configured to generate trigger information for identifying a command to simultaneously control operations of a plurality of application programs that are run in conjunction with broadcast content and are delivered via a network; and a transmitter configured to transmit the trigger information together with the broadcast content.

(14)

A transmitting method of a transmitting device, the method executed by the transmitting device, including:

generating trigger information for identifying a command to simultaneously control operations of a plurality of application programs that are run in conjunction with broadcast content and are delivered via a network; and transmitting the trigger information together with the broadcast content.

What is claimed is:

1. A receiving device comprising:
   a receiver configured to receive broadcast content; and
   circuitry configured to
      acquire trigger information for identifying a command to control an operation of an application program that is run in conjunction with the broadcast content;
      acquire a correspondence table in which the command is associated with information for identifying the command; and
      control operations of a subject application program and another application program other than the subject application program in response to the command identified by the correspondence table, wherein the correspondence table for the subject application program includes control information indicating a time period of the subject application program and control information indicating termination of the other application program; and
   wherein the control information indicating termination of the other application program does not identify the other application program, and the other application program is an application program that is being executed when the trigger information is acquired.

2. The receiving device according to claim 1,
   wherein the command is to activate the subject application program and the same command causes stop, pause, or hiding of the another application program.

3. The receiving device according to claim 1, wherein the circuitry is configured to extract a feature from the broadcast content, and
acquire the trigger information corresponding to the broadcast content identified by the feature.

4. The receiving device according to claim 1,
wherein the command and the control information indicating the time period are associated with each other in the correspondence table, and
when a time that is determined based on the trigger information and that indicates progression of the broadcast content is within the time period indicated by the control information, the circuitry controls the operations of the subject application program and the another application program in response to the command associated with the control information indicating the time period.

5. The receiving device according to claim 1,
wherein an identifier of the command is further associated in the correspondence table, and
when the identifier of the command obtained from the trigger information corresponds with the identifier of the command associated in the correspondence table, the circuitry controls the operations of the subject application program and the another application program in response to the command associated with the identifier.

6. The receiving device according to claim 1, wherein the circuitry is further configured to acquire the subject application program separately from the broadcast content and the correspondence table.

7. A receiving method of a receiving device, the method executed by the receiving device, comprising:
receiving broadcast content; and
acquiring trigger information for identifying a command to control an operation of an application program that is run in conjunction with die broadcast content;
acquiring a correspondence table in which the command is associated with information for identifying the command; and
controlling operations of a subject application program and another application program other than the subject application program in response to the command identified by the correspondence table,
wherein the correspondence table for the subject application program includes control information indicating a time period of the subject application program and control information indicating termination of the other application program; and
wherein the control information indicating termination of the other application program does not identify the other application program, and the other application program is an application program that is being executed when the trigger information is acquired.

8. The receiving method according to claim 7,
wherein the command is to activate the subject application program and the same command causes stop, pause, or hiding of the another application program.

9. The receiving method according to claim 7, further comprising
extracting a feature from the broadcast content, and
acquiring the trigger information corresponding to the broadcast content identified by the feature.

10. The receiving method according to claim 7,
wherein the command and the control information indicating the time period are associated with each other in the correspondence table, and
the method further comprises, when a time that is determined based on the trigger information and that indicates progression of the broadcast content is within the time period indicated by the control information, controlling the operations of the subject application program and the another application program in response to the command associated with the control information indicating the time period.

11. The receiving method according to claim 7,
wherein an identifier of the command is further associated in the correspondence table, and
the method further comprises, when the identifier of the command obtained from the trigger information corresponds with the identifier of the command associated in the correspondence table, controlling the operations of the subject application program and the another application program in response to the command associated with the identifier.

12. The receiving method according to claim 7, wherein the method further comprises acquiring the subject application program separately from the broadcast content and the correspondence table.

13. A non-transitory computer-readable storage medium storing computer-readable instructions thereon, which, when executed by a receiving device, cause the receiving device to perform a method comprising:
receiving broadcast content; and
acquiring trigger information for identifying a command to control an operation of an application program that is run in conjunction with the broadcast content;
acquiring a correspondence table in which the command is associated with information for identifying the command; and
controlling operations of a subject application program and another application program other than the subject application program in response to the command identified by the correspondence table,
wherein the correspondence table for the subject application program includes control information indicating a time period of the subject application program and control information indicating termination of the other application program; and
wherein the control information indicating termination of the other application program does not identify the other application program, and the other application program is an application program that is being executed when the trigger information is acquired.

14. The non-transitory computer-readable storage medium according to claim 13,
wherein the command is to activate the subject application program and the same command causes stop, pause, or hiding of the another application program.

15. The non-transitory computer-readable storage medium according to claim 13, further comprising
extracting a feature from the broadcast content, and
acquiring the trigger information corresponding to the broadcast content identified by the feature.

16. The non-transitory computer-readable storage medium according to claim 13,
wherein the command and the control information indicating the time period are associated with each other in the correspondence table, and
the method further comprises, when a time that is determined based on the trigger information and that indicates progression of the broadcast content is within the time period indicated by the control information, controlling the operations of the subject application program and the another application program in response to the command associated with the control information indicating the time period.

17. The non-transitory computer-readable storage medium according to claim 13, wherein an identifier of the command is further associated in the correspondence table, and the method further comprises, when the identifier of the command obtained from die trigger information corresponds with the identifier of the command associated in the correspondence table, controlling the operations of the subject application program and the another application program in response to the command associated with the identifier.

18. The non-transitory computer-readable storage medium according to claim 13, wherein the method further comprises acquiring the subject application program separately from die broadcast content and the correspondence table.

* * * * *